US012760882B2

(12) United States Patent
Zhang

(10) Patent No.: US 12,760,882 B2
(45) Date of Patent: Oct. 13, 2026

(54) ELECTRONIC MODULE GROUP

(71) Applicant: Lumien Enterprise, Inc., Marietta, GA (US)

(72) Inventor: Haicheng Zhang, Marietta, GA (US)

(73) Assignee: Lumien Enterprise, Inc., Marietta, GA (US)

( * ) Notice: Subject to any disclaimer, the term of this patent is extended or adjusted under 35 U.S.C. 154(b) by 0 days.

(21) Appl. No.: 19/042,415

(22) Filed: Jan. 31, 2025

(65) Prior Publication Data

US 2025/0180200 A1 Jun. 5, 2025

Related U.S. Application Data

(63) Continuation of application No. 18/201,631, filed on May 24, 2023, now Pat. No. 12,281,783, which is a
(Continued)

(30) Foreign Application Priority Data

Dec. 31, 2019 (CN) ......................... 201911420142.2

(51) Int. Cl.
*F21V 23/06* (2006.01)
*F21V 19/00* (2006.01)
(Continued)

(52) U.S. Cl.
CPC .......... *F21V 23/06* (2013.01); *F21V 19/0055* (2013.01); *F21V 23/002* (2013.01);
(Continued)

(58) Field of Classification Search
CPC ........ F21S 2/005; F21V 17/12; F21V 23/003; F21V 23/06; F21V 29/56; F21V 31/005;
(Continued)

(56) References Cited

U.S. PATENT DOCUMENTS 1,180,658 A 4/1916 Kratz
2,163,673 A 6/1939 Garlock
(Continued)

FOREIGN PATENT DOCUMENTS

AT 445810 T 10/2009
CH 607571 A5 8/1978
(Continued)

OTHER PUBLICATIONS

US 12,191,647 B2, 01/2025, Zhang (withdrawn)
(Continued)

*Primary Examiner* — Tsion Tumebo
(74) *Attorney, Agent, or Firm* — Buchalter LLP

(57) ABSTRACT

A lamp module including a housing including a light holder portion and a shaft portion, the light holder portion configured to tilt relative to the shaft portion; an LED lamp board positioned within the light holder portion; a power supply driving module connected in electrical communication with the LED lamp board; and a first concentric terminal positioned at least partially within the shaft portion, the first concentric terminal connected in electrical communication with the power supply driving module, the first concentric terminal configured to rotatably connect in electrical communication with a second concentric terminal to supply power to the power supply driving module.

20 Claims, 44 Drawing Sheets

Related U.S. Application Data continuation-in-part of application No. 18/100,300, filed on Jan. 23, 2023, now Pat. No. 12,018,828, which is a continuation of application No. 17/389,019, filed on Jul. 29, 2021, now Pat. No. 11,598,517, which is a continuation-in-part of application No. 16/645,458, filed as application No. PCT/CN2020/070502 on Jan. 6, 2020, now Pat. No. 11,162,651.

(51) Int. Cl.
*F21V 23/00* (2015.01)
*F21V 29/60* (2015.01)
*F21V 31/00* (2006.01)
*H04R 1/02* (2006.01)
*H04R 1/06* (2006.01)

(52) U.S. Cl.
CPC ............ *F21V 29/60* (2015.01); *F21V 31/005* (2013.01); *H04R 1/028* (2013.01); *H04R 1/06* (2013.01); *H04R 2420/09* (2013.01)

(58) Field of Classification Search
CPC .......... F21V 3/00; F21V 5/04; F21V 19/0055; F21V 29/67; F21V 31/04; F21V 3/02; F21V 7/00; F21V 15/01; F21V 23/002; F21Y 2115/10; F21K 9/20
See application file for complete search history.

(56) References Cited

U.S. PATENT DOCUMENTS 2,668,901 A 2/1954 Austin, Jr.
2,738,756 A 3/1956 Doane
2,965,751 A 12/1960 Stiffel
3,104,064 A 9/1963 Bellek
3,792,753 A 2/1974 Smith
4,153,149 A 5/1979 Weber
4,164,136 A 8/1979 Wiggins et al.
4,186,851 A 2/1980 Cantor
4,495,463 A 1/1985 Milkovic
4,530,039 A 7/1985 Shin-Shi
4,596,449 A 6/1986 Iwata et al.
4,739,457 A 4/1988 Orr
4,831,664 A 5/1989 Suda
4,853,722 A 8/1989 Gell, Jr.
4,963,798 A 10/1990 McDermott
4,996,635 A 2/1991 Olsson et al.
5,133,018 A 7/1992 Miyazaki
5,161,883 A 11/1992 Gordin et al.
5,249,109 A 9/1993 Denison et al.
5,260,858 A 11/1993 Maglica
5,319,959 A 6/1994 Cooper et al.
5,331,523 A 7/1994 Delzer
5,373,427 A 12/1994 McLean
5,420,766 A 5/1995 Hollis
5,454,611 A 10/1995 Wanat
5,513,085 A 4/1996 Bourne
5,570,949 A 11/1996 Chiang
5,571,278 A 11/1996 Chiang
5,584,568 A 12/1996 Corbasson et al.
5,690,424 A 11/1997 Warshauer et al.
5,825,308 A 10/1998 Rosenberg
5,826,971 A 10/1998 Kibler
5,904,417 A 5/1999 Hewett
5,941,629 A 8/1999 Tuscher
5,982,103 A 11/1999 Mosebrook et al.
6,013,988 A 1/2000 Bucks et al.
D424,731 S 5/2000 Landefeld
6,084,476 A 7/2000 Hamanishi et al.
6,092,914 A 7/2000 Esakoff et al.
6,113,252 A 9/2000 Arlitt et al.
6,147,458 A 11/2000 Bucks et al.
6,155,693 A 12/2000 Spiegel et al.
6,161,948 A * 12/2000 Hagen .................... F21V 31/00
362/267
6,250,774 B1 6/2001 Begemann et al.
6,290,368 B1 9/2001 Lehrer
6,361,183 B1 3/2002 Maglica
6,390,647 B1 5/2002 Shaefer
6,525,414 B2 2/2003 Shiraishi et al.
6,527,402 B1 3/2003 Borri
6,586,890 B2 7/2003 Min et al.
6,612,720 B1 9/2003 Beadle
6,633,110 B2 10/2003 McGuire et al.
6,641,283 B1 11/2003 Bohler
6,652,113 B2 11/2003 Tant
6,655,819 B2 12/2003 Loga et al.
6,676,270 B2 1/2004 Kostal et al.
6,679,315 B2 1/2004 Cosley et al.
6,748,096 B2 6/2004 Chuang
6,756,663 B2 6/2004 Shiraishi et al.
6,764,197 B1 7/2004 Zemar
6,806,659 B1 10/2004 Mueller et al.
6,874,910 B2 4/2005 Sugimoto et al.
6,883,941 B2 4/2005 Cutting
7,015,825 B2 3/2006 Callahan
7,038,399 B2 5/2006 Lys et al.
7,041,901 B2 5/2006 Case
7,063,553 B1 6/2006 Mullen
7,084,353 B1 8/2006 Downes
7,109,668 B2 9/2006 Pogodayev et al.
7,160,001 B2 1/2007 Bartlett
7,163,313 B2 1/2007 Rosenberg
7,178,937 B2 2/2007 McDermott
7,192,162 B2 3/2007 Tanaka et al.
7,204,608 B2 4/2007 Beeman et al.
7,233,115 B2 6/2007 Lys
7,249,871 B2 7/2007 Chen
7,262,559 B2 8/2007 Tripathi et al.
7,326,179 B1 2/2008 Cienfuegos
7,358,679 B2 4/2008 Lys et al.
7,422,356 B2 9/2008 Hama et al.
7,445,365 B1 11/2008 Hsu
7,452,099 B2 11/2008 Evans et al.
7,513,661 B2 4/2009 Hamada et al.
7,534,975 B1 5/2009 Sharrah et al.
7,547,113 B2 6/2009 Lee
7,549,766 B2 6/2009 Sharrah et al.
7,625,101 B2 12/2009 Alessio
7,722,213 B2 5/2010 Inoue et al.
7,722,216 B2 5/2010 Amor et al.
7,733,659 B2 6/2010 Snider et al.
7,736,025 B2 6/2010 Hofmann et al.
7,738,235 B2 6/2010 Gloisten et al.
7,837,866 B2 11/2010 Burrows
7,847,486 B2 12/2010 Ng
7,872,259 B2 1/2011 Den et al.
7,874,717 B1 1/2011 Shaefer
7,896,524 B2 3/2011 Yoneda et al.
7,922,353 B2 4/2011 Isely
8,033,677 B1 10/2011 Olsson et al.
8,038,481 B1 10/2011 Creighton et al.
8,066,396 B2 11/2011 Hunt
8,070,328 B1 12/2011 Knoble et al.
8,096,674 B2 1/2012 Matthews et al.
8,138,690 B2 3/2012 Chemel et al.
8,148,912 B2 4/2012 Kim
8,162,502 B1 4/2012 Zadro
8,172,434 B1 5/2012 Olsson
8,220,970 B1 7/2012 Khazi et al.
8,235,539 B2 8/2012 Thomas et al.
8,337,049 B2 12/2012 Shida et al.
8,371,894 B1 2/2013 Rosen et al.
8,400,079 B2 3/2013 Kanamori et al.
8,403,530 B2 3/2013 Singer et al.
8,419,218 B2 4/2013 Dassanayake et al.
8,519,642 B2 8/2013 Ahn et al.
8,534,867 B1 9/2013 Beadle
8,575,641 B2 11/2013 Zimmerman et al.
8,598,793 B2 12/2013 Yan et al.
8,632,196 B2 1/2014 Tong et al.
8,651,704 B1 2/2014 Gordin et al.

(56) References Cited

U.S. PATENT DOCUMENTS 8,662,709 B2 3/2014 Chang
8,704,262 B2 4/2014 Livesay et al.
8,708,535 B2 4/2014 Dalsgaard
8,773,024 B2 7/2014 Yan et al.
8,810,141 B2 8/2014 Takeda et al.
8,827,512 B1 9/2014 Beadle
8,882,284 B2 11/2014 Tong et al.
8,905,587 B1 12/2014 Bouckaert
8,919,026 B2 12/2014 Hamilton
8,926,121 B2 1/2015 Wu
8,926,145 B2 1/2015 Lynch et al.
8,931,933 B2 1/2015 Tong et al.
8,936,472 B1 1/2015 Gibboney, Jr.
8,950,895 B2 2/2015 Vinther et al.
8,950,907 B2 2/2015 Packard et al.
8,967,497 B2 3/2015 Luettgen et al.
9,028,086 B2 5/2015 Woo et al.
9,062,830 B2 6/2015 Le et al.
9,115,857 B2 8/2015 Beausoleil
9,140,414 B1 9/2015 Beausoleil
9,140,431 B1 9/2015 Lee
9,168,495 B2 10/2015 Connors
9,169,997 B2 10/2015 Kurt et al.
9,175,814 B2 11/2015 Shida et al.
9,188,292 B2 11/2015 Armer et al.
9,204,519 B2 12/2015 Gan et al.
9,206,964 B2 12/2015 Marsh et al.
9,207,484 B2 12/2015 Hendren et al.
9,210,733 B2 12/2015 Russell et al.
9,234,655 B2 1/2016 Progl et al.
9,239,152 B2 1/2016 Ho
9,247,597 B2 1/2016 Miskin et al.
9,247,612 B2 1/2016 Koo
9,249,958 B2 2/2016 Schmuckle
9,285,103 B2 3/2016 Van De Ven et al.
9,285,109 B1 3/2016 Olsson et al.
9,306,139 B2 4/2016 Lee et al.
9,310,038 B2 4/2016 Athalye
9,310,059 B2 4/2016 Zhang
9,420,644 B1 8/2016 Shum
9,429,285 B2 8/2016 Chung et al.
9,431,182 B2 8/2016 Kim et al.
9,500,325 B2 11/2016 Tong et al.
9,574,760 B1 2/2017 Olsson et al.
9,595,402 B2 3/2017 Vansickle et al.
9,598,575 B2 3/2017 Bhagwagar et al.
9,599,292 B2 3/2017 Jagt et al.
9,603,226 B2 3/2017 Sagal et al.
9,614,322 B1 4/2017 Gibboney, Jr.
9,620,096 B2 4/2017 Ambrosino
9,657,930 B2 5/2017 Nolan et al.
9,719,658 B2 8/2017 Maglica et al.
9,730,282 B2 8/2017 Munday et al.
9,739,440 B1 8/2017 Deyaf et al.
9,746,170 B1 8/2017 Armer et al.
9,752,761 B2 9/2017 Lentine
9,777,915 B2 10/2017 Johnson
9,784,417 B1 10/2017 Springer
9,784,440 B2 10/2017 Erdener et al.
9,806,458 B1 10/2017 Chiu et al.
9,863,622 B1 1/2018 Armer et al.
9,915,419 B2 3/2018 Potucek et al.
9,964,286 B1 5/2018 Sooferian
9,995,463 B2 6/2018 Kjeldsen et al.
10,024,503 B2 7/2018 Li et al.
10,024,515 B2 7/2018 Min et al.
10,036,535 B2 7/2018 Catalano
10,041,635 B2 8/2018 Lam et al.
10,066,813 B2 9/2018 Poorter et al.
10,113,735 B2 10/2018 Emerson et al.
10,139,060 B1 11/2018 Erdener et al.
10,190,757 B2 1/2019 Erdener et al.
10,208,935 B2 2/2019 Erdener
10,240,758 B2 3/2019 Maglica
10,323,832 B2 6/2019 Erdener et al.
10,326,220 B1 6/2019 Most et al.
10,330,294 B2 6/2019 Erdener
10,357,146 B2 7/2019 Fiebel et al.
10,359,151 B2 7/2019 Tarsa et al.
10,465,864 B2 11/2019 Leichner
10,509,304 B2 12/2019 Chien
10,612,755 B2 4/2020 Schmuckle et al.
10,682,540 B2 6/2020 Mantione, III
10,704,745 B2 7/2020 Sherry et al.
10,760,773 B2 9/2020 Zhang et al.
10,869,733 B2 12/2020 Learn
10,871,269 B2 12/2020 Li
10,941,924 B2 3/2021 Yu et al.
11,022,298 B2 6/2021 Potucek et al.
11,029,015 B1 6/2021 Olsson et al.
11,035,564 B2 6/2021 Arpin et al.
11,041,615 B2 6/2021 Evans et al.
11,156,330 B2 10/2021 Grandadam
11,162,651 B2 11/2021 Zhang et al.
11,407,362 B1 8/2022 Jordan
11,421,837 B2 8/2022 Zhang et al.
11,466,821 B2 10/2022 Zhang et al.
11,549,674 B2 1/2023 Todaro
11,598,517 B2 3/2023 Zhang
11,959,601 B2 4/2024 Zhang et al.
12,018,828 B2 6/2024 Zhang
12,230,950 B2 2/2025 Zhang
12,270,535 B2 4/2025 Zhang
12,281,783 B2 4/2025 Zhang
12,435,846 B2 10/2025 Zhang
12,663,146 B2 6/2026 Zhang
12,716,558 B2 8/2026 Zhang et al.
2004/0163797 A1 8/2004 Cosley et al.
2005/0007777 A1 1/2005 Klipstein et al.
2005/0135101 A1 6/2005 Richmond
2005/0148241 A1 7/2005 Kohen
2005/0174782 A1 8/2005 Chapman
2005/0255718 A1 11/2005 McLeish
2006/0187653 A1 8/2006 Olsson
2006/0262542 A1 11/2006 Ibbitson et al.
2006/0279957 A1 12/2006 Kwon et al.
2007/0019415 A1 1/2007 LeBlanc et al.
2007/0076415 A1 4/2007 Chou et al.
2007/0139913 A1 6/2007 Savage
2008/0080187 A1 4/2008 Purinton
2008/0083360 A1 4/2008 Rowley
2008/0123340 A1 5/2008 McClellan
2008/0273331 A1 11/2008 Moss et al.
2009/0073696 A1 3/2009 Melzner
2009/0205935 A1 8/2009 Frick
2010/0091485 A1 4/2010 Matthews et al.
2010/0127626 A1 5/2010 Altonen et al.
2010/0176750 A1 7/2010 West
2010/0226133 A1 9/2010 Kawakubo et al.
2010/0226139 A1 9/2010 Lynch et al.
2010/0259200 A1 10/2010 Beausoleil
2011/0019409 A1 1/2011 Wronski
2011/0048793 A1 3/2011 Ljungren
2011/0075404 A1 3/2011 Allen et al.
2011/0080741 A1 4/2011 Noh
2011/0121752 A1 5/2011 Newman, Jr. et al.
2011/0204777 A1 8/2011 Lenk
2012/0081901 A1 4/2012 Tsang
2012/0091900 A1 4/2012 Fournier
2012/0091917 A1 4/2012 Vinther et al.
2012/0113654 A1 5/2012 Dai
2012/0139426 A1 6/2012 Ilyes et al.
2012/0182723 A1 7/2012 Sharrah et al.
2012/0223632 A1 9/2012 Hussell et al.
2012/0243213 A1 9/2012 Chen
2012/0243228 A1 9/2012 Olsson et al.
2013/0039055 A1 2/2013 Wilson et al.
2013/0088152 A1 4/2013 Hagen
2013/0114253 A1 5/2013 Segawa et al.
2013/0127356 A1 5/2013 Tanaka et al.
2013/0162139 A1 6/2013 Liu
2013/0208489 A1* 8/2013 Schmuckle ............ F21V 21/02
362/363
2013/0221872 A1 8/2013 Gan et al.

(56) References Cited

U.S. PATENT DOCUMENTS

| | | | |
|---|---|---|---|
| 2013/0249437 A1 | 9/2013 | Wang et al. | |
| 2013/0271981 A1 | 10/2013 | Hussell et al. | |
| 2013/0331657 A1 | 12/2013 | Basson et al. | |
| 2014/0022794 A1 | 1/2014 | Laukkanen | |
| 2014/0049967 A1 | 2/2014 | Zhou | |
| 2014/0092593 A1 | 4/2014 | Gordin et al. | |
| 2014/0119022 A1* | 5/2014 | Beausoleil | F21V 23/006 362/294 |
| 2014/0179139 A1 | 6/2014 | Tanaka et al. | |
| 2014/0198482 A1 | 7/2014 | Yue | |
| 2014/0218902 A1 | 8/2014 | Maglica | |
| 2014/0256163 A1 | 9/2014 | Kuo | |
| 2014/0300285 A1 | 10/2014 | Medak | |
| 2014/0334157 A1 | 11/2014 | Ferguson | |
| 2014/0375203 A1 | 12/2014 | Goscha et al. | |
| 2015/0003050 A1 | 1/2015 | Parsons | |
| 2015/0003072 A1 | 1/2015 | Chen et al. | |
| 2015/0022114 A1 | 1/2015 | Kim | |
| 2015/0028776 A1 | 1/2015 | McMillan | |
| 2015/0129398 A1 | 5/2015 | Wilkins et al. | |
| 2015/0131282 A1 | 5/2015 | Best et al. | |
| 2015/0131288 A1 | 5/2015 | Zhang | |
| 2015/0153025 A1 | 6/2015 | Wu et al. | |
| 2015/0159842 A1 | 6/2015 | Zhang | |
| 2015/0159852 A1 | 6/2015 | Dahlen et al. | |
| 2015/0167953 A1 | 6/2015 | Huang | |
| 2015/0212263 A1 | 7/2015 | Tzeng | |
| 2015/0247632 A1 | 9/2015 | McGilvray | |
| 2015/0260385 A1 | 9/2015 | Brynjolfsson | |
| 2015/0345733 A1 | 12/2015 | Bobbo et al. | |
| 2016/0025319 A1 | 1/2016 | Meyer | |
| 2016/0084490 A1* | 3/2016 | Davis | F21K 9/90 362/373 |
| 2016/0123563 A1 | 5/2016 | Ferguson et al. | |
| 2016/0153619 A1 | 6/2016 | Frohnapfel | |
| 2016/0201863 A1 | 7/2016 | Kwast et al. | |
| 2016/0375163 A1 | 12/2016 | Hawkins et al. | |
| 2016/0377280 A1 | 12/2016 | Acampora et al. | |
| 2017/0051910 A1* | 2/2017 | Woytowitz | F21K 9/233 |
| 2017/0072330 A1 | 3/2017 | Nelson et al. | |
| 2017/0085027 A1 | 3/2017 | Ishaug et al. | |
| 2017/0108204 A1 | 4/2017 | Wu et al. | |
| 2017/0130907 A1 | 5/2017 | Cho et al. | |
| 2017/0167695 A1 | 6/2017 | Erdener | |
| 2017/0167718 A1 | 6/2017 | Erdener et al. | |
| 2017/0171929 A1 | 6/2017 | Erdener et al. | |
| 2017/0171932 A1 | 6/2017 | Puvanakijjakorn | |
| 2017/0175963 A1 | 6/2017 | Lentine et al. | |
| 2017/0219188 A1 | 8/2017 | Veloskey | |
| 2017/0311062 A1 | 10/2017 | Garrett et al. | |
| 2017/0325311 A1 | 11/2017 | Athalye | |
| 2018/0017239 A1 | 1/2018 | Liu et al. | |
| 2018/0031215 A1 | 2/2018 | Erdener et al. | |
| 2018/0100638 A1* | 4/2018 | Lee | F21S 8/032 |
| 2018/0156423 A1 | 6/2018 | Murby | |
| 2018/0156445 A1 | 6/2018 | Chen | |
| 2018/0306430 A1 | 10/2018 | Weaver et al. | |
| 2018/0352121 A1 | 12/2018 | Chapman et al. | |
| 2019/0264899 A1 | 8/2019 | Erdener et al. | |
| 2020/0063951 A1 | 2/2020 | Yu et al. | |
| 2020/0072450 A1* | 3/2020 | Mullen | F21V 21/08 |
| 2020/0072453 A1 | 3/2020 | Mittal et al. | |
| 2020/0173630 A1 | 6/2020 | Zhang et al. | |
| 2021/0247038 A1 | 8/2021 | Zhang et al. | |
| 2021/0356110 A1 | 11/2021 | Zhang | |
| 2021/0396362 A1 | 12/2021 | Zhang et al. | |
| 2022/0060833 A1 | 2/2022 | Gunn | |
| 2022/0082223 A1 | 3/2022 | Zhang et al. | |
| 2022/0412517 A1 | 12/2022 | Zhang et al. | |
| 2023/0029871 A1 | 2/2023 | Zhang | |
| 2023/0160567 A1 | 5/2023 | Zhang | |
| 2023/0324037 A1 | 10/2023 | Zhang | |
| 2023/0417401 A1 | 12/2023 | Zhang | |
| 2024/0200736 A1 | 6/2024 | Zhang et al. | |
| 2025/0070538 A1 | 2/2025 | Zhang | |
| 2025/0084988 A1 | 3/2025 | Zhang | |
| 2025/0198609 A1 | 6/2025 | Zhang | |
| 2025/0383055 A1 | 12/2025 | Zhang et al. | |

FOREIGN PATENT DOCUMENTS

| | | |
|---|---|---|
| CN | 200996560 Y | 12/2007 |
| CN | 201428965 Y | 3/2010 |
| CN | 101832493 A | 9/2010 |
| CN | 201651985 U | 11/2010 |
| CN | 201661934 U | 12/2010 |
| CN | 201697032 U | 1/2011 |
| CN | 201795292 U | 4/2011 |
| CN | 201868044 U | 6/2011 |
| CN | 202001978 U | 10/2011 |
| CN | 202132720 U | 2/2012 |
| CN | 102537788 A | 7/2012 |
| CN | 202561568 U | 11/2012 |
| CN | 102818171 A | 12/2012 |
| CN | 202617421 U | 12/2012 |
| CN | 202946975 U | 5/2013 |
| CN | 202993068 U | 6/2013 |
| CN | 203099444 U | 7/2013 |
| CN | 203099944 U | 7/2013 |
| CN | 203115737 U | 8/2013 |
| CN | 203131451 U | 8/2013 |
| CN | 203215414 U | 9/2013 |
| CN | 103335219 A | 10/2013 |
| CN | 203223756 U | 10/2013 |
| CN | 203225915 U | 10/2013 |
| CN | 203375353 U | 1/2014 |
| CN | 203573985 U | 4/2014 |
| CN | 203757408 U | 8/2014 |
| CN | 303021758 S | 12/2014 |
| CN | 104315460 A | 1/2015 |
| CN | 204285351 U | 4/2015 |
| CN | 104595757 A | 5/2015 |
| CN | 204313074 U | 5/2015 |
| CN | 105114878 A | 12/2015 |
| CN | 204973611 U | 1/2016 |
| CN | 105526521 A | 4/2016 |
| CN | 205226959 U | 5/2016 |
| CN | 105889771 A | 8/2016 |
| CN | 205979248 U | 2/2017 |
| CN | 206207184 U | 5/2017 |
| CN | 206429994 U | 8/2017 |
| CN | 206582672 U | 10/2017 |
| CN | 206817297 U | 12/2017 |
| CN | 207486634 U | 6/2018 |
| CN | 109140397 A | 1/2019 |
| CN | 109578834 A | 4/2019 |
| CN | 110056825 A | 7/2019 |
| CN | 110332485 A | 10/2019 |
| CN | 209587772 U | 11/2019 |
| CN | 209726016 U | 12/2019 |
| CN | 209762834 U | 12/2019 |
| CN | 210319700 U | 4/2020 |
| DE | 19620209 A1 | 11/1997 |
| DE | 10006410 A1 | 8/2001 |
| DE | 202006006481 U1 | 6/2006 |
| DE | 202014008377 U1 | 10/2014 |
| EP | 1034690 B1 | 10/2003 |
| EP | 0929993 B1 | 10/2004 |
| GB | 2418979 A | 4/2006 |
| GB | 2523802 A | 9/2015 |
| HK | 1198615 A2 | 4/2015 |
| JP | 3673943 B2 | 7/2005 |
| JP | 3875392 B2 | 1/2007 |
| JP | 4590283 B2 | 12/2010 |
| JP | 2011165394 A | 8/2011 |
| JP | 2012014980 A | 1/2012 |
| JP | 4894688 B2 | 3/2012 |
| JP | 5124978 B2 | 1/2013 |
| JP | 5354209 B2 | 11/2013 |
| JP | 2013254665 A | 12/2013 |
| JP | 2014157795 A | 8/2014 |
| JP | 2015076304 A | 4/2015 |
| JP | 6182417 B2 | 8/2017 |
| JP | 6473927 B2 | 2/2019 |

(56) References Cited

FOREIGN PATENT DOCUMENTS

| | | | |
|---|---|---|---|
| KR | 20120135003 | A | 12/2012 |
| KR | 101420351 | B1 | 7/2014 |
| KR | 20150009880 | A | 1/2015 |
| KR | 20150021814 | A | 3/2015 |
| KR | 101676019 | B1 | 11/2016 |
| KR | 101677730 | B1 | 11/2016 |
| KR | 101937643 | B1 | 1/2019 |
| KR | 101957884 | B1 | 3/2019 |
| RU | 2358354 | C2 | 6/2009 |
| TW | 330233 | B | 4/1998 |
| TW | M295720 | U | 8/2006 |
| TW | 201205901 | A | 2/2012 |
| TW | I391600 | B | 4/2013 |
| TW | M481324 | U | 7/2014 |
| WO | 02084750 | A1 | 10/2002 |
| WO | 2008049405 | A1 | 5/2008 |
| WO | 2010021675 | A1 | 2/2010 |
| WO | 2011065047 | A1 | 6/2011 |
| WO | 2011143510 | A1 | 11/2011 |
| WO | 2013021940 | A1 | 2/2013 |
| WO | 2013024557 | A1 | 2/2013 |
| WO | 2013184166 | A1 | 12/2013 |
| WO | 2014108870 | A2 | 7/2014 |
| WO | 2015070150 | A2 | 5/2015 |
| WO | 2015162600 | A1 | 10/2015 |
| WO | 2019100448 | A1 | 5/2019 |
| WO | 2021134806 | A1 | 7/2021 |
| WO | 2021212541 | A1 | 10/2021 |
| WO | 2025122944 | A | 6/2025 |
| WO | 2025122944 | A1 | 6/2025 |

OTHER PUBLICATIONS

Notice of Allowance for U.S. Appl. No. 18/593,654, dated Jun. 3, 2025, 7 pages.
Office Action for Chinese Application No. 201711195058.6, dated Mar. 21, 2025, 15 pages.
Corrected Notice of Allowance for U.S. Appl. No. 18/593,654, dated Sep. 10, 2025, 7 pages.
Philips: "Installation Instructions: IL9 Inground", Copyright 2014, 2 pages.
Platt C., "Encyclopedia of Electronic Components", vol. 1, Copyright 2013, pp. 1-302.
Platt C., et al., "Encyclopedia of Electronic Components", vol. 2, Copyright 2015, pp. 1-316.
Requirement for Restriction/Election for U.S. Appl. No. 17/389,017, dated Sep. 19, 2023, 8 pages.
Search Report for Chinese patent application No. 201911420142.2, dated May 12, 2020, 2 pages.
Spectrol: "Spectrol Short Form Catalog", Copyright 1966, pp. 1-13.
Supplemental Notice of Allowance for U.S. Appl. No. 18/201,631, dated Dec. 27, 2024, 2 pages.
Supplemental Notice of Allowance for U.S. Appl. No. 18/201,631, dated Feb. 13, 2025, 2 pages.
Supplemental Notice of Allowance for U.S. Appl. No. 18/243,329, dated Dec. 27, 2024, 2 pages.
Zhang, Haicheng; Notice of Allowance for U.S. Appl. No. 18/100,300, filed Jan. 23, 2023, mailed Apr. 1, 2024, 12 pgs.
Zhang, Haicheng; Requirement for Restriction/Election for U.S. Appl. No. 18/210,631, filed May 24, 2023, mailed Mar. 5, 2024, 8 pgs.
Third Office Action for Chinese Application No. 201711195058.6, dated Jun. 28, 2025, 16 pages.
ANSI: "Degrees of Protection Provided by Enclosures (IP Code)", NEMA Standards Publication, Copyright 2004, pp. 1-27.
Corrected Notice of Allowance for U.S. Appl. No. 17/389,017, dated Dec. 4, 2024, 2 pages.
Corrected Notice of Allowance for U.S. Appl. No. 17/389,017, dated Jan. 16, 2025, 2 pages.
Corrected Notice of Allowance for U.S. Appl. No. 18/201,631, dated Mar. 20, 2025, 2 pages.
Corrected Notice of Allowance for U.S. Appl. No. 18/243,329, dated Mar. 12, 2025, 2 pages.
Final Office Action for U.S. Appl. No. 17/389,019, dated Aug. 5, 2022, 14 pages.
Final Office Action for U.S. Appl. No. 18/100,300, dated Dec. 7, 2023, 19 pages.
HADCO: "Installation Instructions: CP2, CP3, CP4 CP5 Accessories", Copyright 2018, 2 pages.
International Preliminary Report on Patentability for International Application No. PCT/CN2017/115006, dated Jun. 4, 2020, 11 pages.
International Preliminary Report on Patentability for International Application No. PCT/CN2020/070502, dated Jul. 14, 2022, 10 pages.
International Preliminary Report on Patentability for International Application No. PCT/CN2020/088127, dated Nov. 3, 2022, 11 pages.
International Search Report and Written Opinion for International Application No. PCT/CN2017/115006, mailed Aug. 17, 2018, 14 Pages.
International Search Report and Written Opinion for International Application No. PCT/CN2020/070502, mailed Aug. 27, 2020, 8 Pages.
International Search Report and Written Opinion for International Application No. PCT/CN2020/088127, mailed Jan. 4, 2021, 12 Pages.
International Search Report and Written Opinion for International Application No. PCT/US2024/058990, mailed Feb. 19, 2025, 11 Pages.
Keeping S., "LED Packaging and Efficacy Advances Boost Lumen Density", located at https://www.digikey.com/en/articles/led-packaging-and-efficacy-advances-boost-lumen-density, published on Jan. 14, 2014, pp. 1-5.
Keeping S., "The Rise of Chip-on-Board LED Modules", located at https://www.digikey.com/en/articles/the-rise-of-chip-on-board-led-modules, published on Mar. 11, 2014, pp. 1-5.
LEDS Magazine: "Controlling LED Lighting Systems: Introducing the LED Driver", located at https://www.ledsmagazine.com/architectural-lighting/retail-hospitality/article/16701402/controlling-led-lighting-systems-introducing-the-led-driver, published Dec. 10, 2004, pp. 1-11.
Linear Artwork Inc: "Brochure for LA8303 Driver", published Jun. 11, 2009, pp. 1-20.
NKK Switches: "Design Guide for the '90s", Catalog No. 9405, Published Jan. 1994, pp. 1-21.
NNO Innotech Co. Ltd: "LA8303 Driver Specification", published Mar. 7, 2013, pp. 1-20.
Non-Final Office Action for U.S. Appl. No. 17/389,017, dated May 30, 2024, 5 pages.
Non-Final Office Action for U.S. Appl. No. 17/389,019, dated Feb. 15, 2022, 17 pages.
Non-Final Office Action for U.S. Appl. No. 17/463,086, dated Feb. 15, 2022, 14 pages.
Non-Final Office Action for U.S. Appl. No. 17/895,557, dated Jun. 21, 2023, 64 pages.
Non-Final Office Action for U.S. Appl. No. 18/201,631, dated May 22, 2024, 66 pages.
Non-Final Office Action for U.S. Appl. No. 18/243,329, dated Jun. 17, 2024, 79 pages.
Non-Final Office Action for U.S. Appl. No. 18/593,654, dated Dec. 4, 2024, 12 pages.
Non-Final Office Action for U.S. Appl. No. 16/086,562, dated Mar. 18, 2020, 10 pgs.
Non-Final Office Action for U.S. Appl. No. 16/969,968, dated Jan. 19, 2022, 14 pgs.
Non-Final Office Action for U.S. Appl. No. 17/389,017, dated Dec. 19, 2023, 6 pgs.
Non-Final Office Action for U.S. Appl. No. 18/100,300, dated Jun. 21, 2023, 16 pgs.
Notice of Allowance for U.S. Appl. No. 16/086,562, dated Jul. 8, 2020, 8 pages.
Notice of Allowance for U.S. Appl. No. 16/645,458, dated Jun. 16, 2021, 8 pages.

(56) References Cited

OTHER PUBLICATIONS

Notice of Allowance for U.S. Appl. No. 16/645,458, dated Sep. 27, 2021, 7 pages.
Notice of Allowance for U.S. Appl. No. 16/969,968, dated Apr. 18, 2022, 8 pages.
Notice of Allowance for U.S. Appl. No. 17/389,017, dated Sep. 11, 2024, 12 pages.
Notice of Allowance for U.S. Appl. No. 17/389,019, dated Oct. 24, 2022, 7 pages.
Notice of Allowance for U.S. Appl. No. 17/463,086, dated Jun. 2, 2022, 7 pages.
Notice of Allowance for U.S. Appl. No. 17/895,557, dated Dec. 7, 2023, 16 pages.
Notice of Allowance for U.S. Appl. No. 18/201,631, dated Nov. 1, 2024, 8 Pages.
Notice of Allowance for U.S. Appl. No. 18/243,329, dated Nov. 27, 2024, 7 pages.
Office Action for Chinese Application No. 201711195058.6, dated Aug. 29, 2023, 9 pages.
Office Action for Chinese Application No. 20171195058.6, dated Apr. 29, 2024, 9 pages.
Office Action for Chinese Application No. 201911420142.2, dated May 20, 2020, 9 pages.
Philips: Brochure for "BL9 Flexscape LED Accent Landscape Luminaire", Copyright 2014, pp. 1-3.
Philips: "Brochure for Luminaire Smart Service Guide", Landscape, published Apr. 2014, 28 Pages.
"Philips CP5 Concrete Pour Kit ("CP5")", Low Voltage Inground Lighting, On Sale, Described in a Printed Publication, and/or in Public use at Least as Early as 2011, 1 page.
Philips Hadco: "Brochure for FlexScape LED", Published 2015, pp. 1-12.
Philips: "Installation Instructions: BL9 Accent", Copyright 2014, pp. 1-4.
Non-Final Office Action for U.S. Appl. No. 18/958,510, dated Dec. 1, 2025, 13 pages.
Non-Final Office Action for U.S. Appl. No. 19/315,007, dated Dec. 8, 2025, 9 pages.
Office Action for Chinese Application No. 201711195058.6, dated Nov. 19, 2025, 12 pages.
Corrected Notice of Allowability for U.S. Appl. No. 19/063,888, dated Mar. 24, 2026, 2 pages.
Final Office Action for U.S. Appl. No. 18/958,510, dated May 1, 2026, 19 pages.
Notice of Allowance for U.S. Appl. No. 19/063,888, dated Feb. 25, 2026, 74 pages.
Notice of Allowance for U.S. Appl. No. 19/315,007, dated Apr. 13, 2026, 13 pages.
Corrected Notice of Allowance for U.S. Appl. No. 19/063,888, dated May 27, 2026, 7 pages.
Corrected Notice of Allowance for U.S. Appl. No. 19/315,007, dated Jul. 28, 2026, 7 pages.
International Preliminary Report on Patentability for International Application No. PCT/US2024/058990, dated Jun. 18, 2026, 10 pages.
Corrected Notice of Allowance for U.S. Appl. No. 19/315,007, dated Jun. 10, 2026, 2 pages.
Notice of Allowance for U.S. Appl. No. 18/958,510, dated Jul. 14, 2026, 12 pages.

* cited by examiner

ELECTRONIC MODULE GROUP

CROSS REFERENCE TO THE RELATED APPLICATIONS

This application is a continuation of U.S. application Ser. No. 18/201,631, filed May 24, 2023, which is a continuation-in-part of U.S. application Ser. No. 18/100,300, filed Jan. 23, 2023, which issued into U.S. Pat. No. 12,018,828 on Jun. 25, 2024, which is a continuation of U.S. application Ser. No. 17/389,019, filed Jul. 29, 2021, which issued into U.S. Pat. No. 11,598,517 on Mar. 7, 2023, which is a continuation-in-part of U.S. application Ser. No. 16/645,458, filed Jan. 25, 2021, which issued into U.S. Pat. No. 11,162,651 on Nov. 2, 2021, which is the national phase entry of International Application No. PCT/CN2020/070502, filed on Jan. 6, 2020, which is based upon and claims priority to Chinese Patent Application No. 201911420142.2, filed on Dec. 31, 2019, each of which is herein incorporated by reference in its entirety.

TECHNICAL FIELD

The present disclosure relates to the technical field of integrated electronic module groups, and more specifically to a lamp module group or a speaker module group.

BACKGROUND

At present, LED lamps and speakers can be designed with a module group structure. This structure can facilitate maintenance and save costs. For example, the so-called lamp module group can be formed by integrating a light source and/or speaker and a power supply, which is assembled in a lamp housing to form a lamp. Once the lamp fails to work, the module group is damaged in most of the cases. Then, only the damaged module group needs to be replaced, which saves the cost of the lamp housing. However, in this way, when a module group without a waterproof function is installed in the lamp housing, it should be ensured that the lamp housing can waterproof, so that the LED lamp can meet the requirements of outdoor work.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is an electronic module comprising a first housing defining a threaded bore and a shaft; a power supply driving module positioned within the first housing; a speaker positioned within the first housing, the speaker connected in electrical communication with the power supply driving module; a first concentric terminal connected in electrical communication with the power supply driving module, the first concentric terminal extending at least partially through the shaft, the first concentric terminal configured to rotatably connect in electrical communication with a second concentric terminal to supply power to the power supply driving module; and an auxiliary concentric terminal connected in electrical communication with the first concentric terminal, the auxiliary concentric terminal positioned at least partially within the threaded bore to define a power receptacle, the power receptacle configured to connect with and supply power to a second electronic module.

Also disclosed is an electronic module comprising a first housing comprising an upper light holder portion, a lower shaft portion, and a fixing rod, the lower shaft portion configured to tilt relative to the upper light holder portion about the fixing rod, the upper light holder portion defining an upper housing cavity, the lower shaft portion defining a lower housing cavity, the lower shaft portion defining a shaft; an LED lamp board positioned within the upper housing cavity, the LED lamp board configured to emit light through a bore of the upper light holder portion; a power supply driving module positioned within the lower housing cavity; and a first concentric terminal connected in electrical communication with the power supply driving module, the first concentric terminal extending at least partially through the shaft, the first concentric terminal configured to rotatably connect in electrical communication with a second concentric terminal.

Also disclosed is a lamp module comprising a housing comprising a light holder portion and a shaft portion, the light holder portion configured to tilt relative to the shaft portion; an LED lamp board positioned within the light holder portion; a power supply driving module connected in electrical communication with the LED lamp board; and a first concentric terminal positioned at least partially within the shaft portion, the first concentric terminal connected in electrical communication with the power supply driving module, the first concentric terminal configured to rotatably connect in electrical communication with a second concentric terminal to supply power to the power supply driving module.

Also disclosed is a lamp module comprising a first housing comprising an light holder portion, a shaft portion, and a fixing rod, the shaft portion configured to tilt relative to the light holder portion about the fixing rod, the light holder portion defining a first housing cavity, the shaft portion defining a second housing cavity, the shaft portion defining a threaded shaft; an LED lamp board positioned within the first housing cavity, the LED lamp board configured to emit light through a bore of the light holder portion; a power supply driving module positioned within the second housing cavity; and a first concentric terminal connected in electrical communication with the power supply driving module, the first concentric terminal positioned at least partially within the shaft, the first concentric terminal configured to rotatably connect in electrical communication with a second concentric terminal.

Also disclosed is a lamp module comprising a housing comprising a light holder portion and a shaft portion, the light holder portion configured to tilt relative to the shaft portion, the light holder portion defining a first housing cavity, the light holder portion defining a first wire opening that is in communication with the first housing cavity, the first housing cavity being at least partially filled with a filler material, the shaft portion defining a second housing cavity, the shaft portion defining a second wire opening that is in communication with the second housing cavity, the light holder portion defining a first end and a second end, the first end connected to the shaft portion, the second end defining internal threading within the first cavity; an LED lamp board positioned within the light holder portion; a retention insert engaging the internal threading within the first cavity, the retention insert securing the LED lamp board within the first cavity; a lens positioned over an LED of the LED lamp board, the lens at least partially encircled by the retention insert; a power supply driving module connected in electrical communication with the LED lamp board; a first concentric terminal positioned at least partially within the shaft portion, the first concentric terminal connected in electrical communication with the power supply driving module, the first concentric terminal configured to rotatably connect in electrical communication with a second concentric terminal to supply power to the power supply driving module; and at least one wire connected in electrical communication with at least one of the LED lamp board, the power supply driving module, and the first concentric terminal, the at least one wire extending from the first housing cavity to the second housing cavity through the first wire opening and the second wire opening, the filler material forming a seal around the at least one wire.

In some aspects, sides of the LED lamp board and the fastener close to the upper open end of the first housing can be provided with a second sealing layer, a reflecting cup can be sleeved above the second sealing layer, a lens can be sleeved at a center of the reflecting cup, and the lens can be configured to be fastened on a light emitting part of the LED lamp board.

In some aspects, a first sealing layer can be provided between the LED lamp board and the power supply driving module, and the first sealing layer can be configured for sealing and fixing the LED lamp board, the power supply driving module, and the wires together in the first housing.

In some aspects, an insulating sheet defining a ring structure can be provided on an inner wall of an end of the first housing close to the shaft, a lower surface of the insulating sheet and an inner bottom of the first housing can be attached to each other, and an upper surface of the insulating sheet can be fixed inside the first housing via the first sealing layer.

In some aspects, the second concentric terminal can comprise: a first insulating casing, a conductive ring, a conductive spring, and a first insulating boss, wherein the second concentric terminal can comprise a columnar structure, a bore can be provided above the first insulating casing, a bottom of the bore can be provided with the first insulating boss, a center of the first insulating boss can be embedded with a conductive post, an inner wall of the bore can be provided with the conductive ring, the conductive spring protruding toward an axial centerline direction of the conductive ring can be provided on an annular inner wall of the conductive ring, an outer wall of the conductive ring can be connected to a wire, and a lower portion of the conductive post can extend downward from a center of the first insulating boss and can be connected to the wire; the conductive ring can be configured to insert the first concentric terminal; a first limiting boss protruding outward can be provided on a circumferential outer wall of an end of the first insulating casing close to the bore, and the first limiting boss and the bore end can face the first concentric terminal, and can be configured to cooperate with the first concentric terminal.

In some aspects, the first concentric terminal can comprise: a second insulating casing, a second insulating boss, an outer conductive sleeve, and a first inner conductive sleeve, wherein the second insulating casing can comprise a columnar structure, a lower surface of the columnar structure can be provided with a bore, a second insulating boss can be provided in the bore, a side of the second insulating boss close to the bore can be provided with a third insulating sleeve, and a diameter of the third insulating sleeve can be smaller than a diameter of the second insulating boss; an outer conductive sleeve can be provided between the third insulating sleeve and the second insulating casing, the first insulating boss and the second insulating boss can be embedded with a second inner conductive sleeve, one end of the second inner conductive sleeve close to a bottom of the groove can be provided with a wire, and the wire can be at one end away from the second inner conductive sleeve penetrates and can extend out of the second insulating casing, a wire can also be connected to an outer wall of the outer conductive sleeve, and the wire at one end away from the outer conductive sleeve can penetrate and extend out of the second insulating casing; and the second inner conductive sleeve can be further embedded with a first inner conductive sleeve, a lower end of the first inner conductive sleeve can be provided with an opening having a circular structure, and the opening can be configured for installing the second concentric terminal; a circumferential outer wall of an end of the second insulating casing close to the opening of a circular groove can be provided with a second limiting boss, the second limiting boss and the second insulating casing can each be configured to be inserted into and fixed in the shaft, an end of the shaft away from the first housing can be further provided with a first limiting groove, and a diameter of a notch of the first limiting groove can be larger than a diameter of a central through hole of the shaft; and the first limiting groove can be configured for embedding the second limiting boss.

In some aspects, a circumferential outer wall of the shaft can be provided with an external thread, the external thread can be configured for installing the second housing, the second housing can comprise a tubular structure, an installing table having a tapered structure can be provided below the tubular structure, an end of the installing table away from the second housing can be provided with a through hole, the through hole can be configured for installing the first limiting boss of the second concentric terminal, a lower surface of the first limiting boss can be connected to an inner bottom surface of the installing table, and an upper surface of the first limiting boss can be provided with a seal.

In some aspects, a circumferential outer wall of an end of the first housing away from the shaft can be provided with an external thread, the external thread can be configured for installing a cover, a center of the cover can be provided with a through installing hole, an inner bottom of one end of the installing hole away from the first housing can be embedded with a sealing lens, a side of the sealing lens away from an inner ground of the installing hole can be provided with a gasket having a ring structure, and the gasket can be sleeved on a circumferential outer wall of an end of the external thread of the first housing.

In some aspects, the cover can be any one selected from the group consisting of a flat lid, a curved lid, a round beveled cover, a vertical lamp cover, a long tube cover, and a square beveled cover.

In some aspects, an end of the second housing away from the first housing can be fixed on a lamp holder, the lamp holder can be fixed on a base by a fixing rod, an inner wall of the lamp holder can be spirally embedded with a cooling pipeline, and both ends of the cooling pipe can extend from an end of the lamp holder close to the fixing rod onto the base; a water storage cavity can be provided in the base, an upper surface of the water storage cavity can be provided with a water inlet and a water outlet, the water inlet can be connected to a water inlet pipe, the water outlet can be connected to a water outlet pipe, and the water inlet pipe and the water outlet pipe can be connected to two open ends of the cooling pipeline, respectively; one end of the lamp holder close to the second housing can be provided with a ventilation plate, one end of the ventilation plate away from the second housing can be provided with a fan and a water pressure adjusting device, the fan can be provided to be close to the ventilation plate, one end of the water pressure adjusting device can be connected to a driving device, and the other end can be connected to an end of the cooling pipeline close to the water outlet pipe; and a circumferential outer wall of the water storage cavity can be further provided on a water injecting port.

The electronic module group can optionally achieve heat conduction and heat dissipation, waterproofing, and rotational coaxial connection power extraction by the provided first housing, second housing, first concentric terminal, and second concentric terminal, and can realize the waterproofing between the first housing and the second housing by the first housing causing a second housing where the first concentric terminal and the second concentric terminal can be located to squeeze a seal.

The first housing and the second housing can be connected into one body by a thread, which may conduct the heat of the power supply driving module and the LED lamp board. Specifically, the heat of the power supply driving module and the LED lamp board can be conducted to the second housing where the second concentric terminal can be located through the connection between the first housing and the second housing, thereby achieving the purpose of dissipating the heat of the power supply driving module and the LED lamp board.

By the provided second concentric terminal and first concentric terminal, the coaxial rotational connection can be formed and maintained and power transmission can occur during thread installation of the first housing and the second housing are achieved.

The lamp module group can comprise a structure that can conduct heat, be waterproof, and provide rotational coaxial connection power transmission. Meanwhile, the external thread provided on the first housing, the external thread provided on the shaft, and the first concentric terminal in conjunction with the second concentric terminal can be combined with other accessories or extension accessories to form a variety of lamps, thereby improving the use range of the lamp module group.

During use, the first concentric terminal and the second concentric terminal are each provided with a waterproof structure. The power supply driving module can be filled with glue between the first concentric terminal and the LED lamp board, thereby forming a first sealing layer in the first housing so that the power supply driving module can be completely sealed in the first sealing layer. A side of the LED lamp board away from the power supply driving module can also be fixed in the first housing by a fastener. An upper surface of the fastener can be provided with a second sealing layer. The second sealing layer can be configured to seal a gap between the fastener and the LED lamp board. Thus, the LED lamp board and the first concentric terminal can waterproof the first housing. The power supply driving module, the power terminal of the LED lamp board, and the first concentric terminal can each be enabled to achieve the purpose of waterproofing and modularization. During use, the first concentric terminal and the second concentric terminal can be plugged into each other to achieve electrical conduction, such as power transmission. An end of the second concentric terminal that is positioned away from the first concentric terminal can receive power, so that the electrical conduction, or transmission, of the first concentric terminal can be achieved. The power supply driving module can be energized. After the power supply driving module is energized, the LED lamp board can light.

When the lamp module fails to work, the lamp module group installed in the lamp cover can be directly detached and replaced, thereby reducing the waste caused by the direct replacement of the entire lamp cover. The lamp module group can be sealed and waterproofed by the first sealing layer, the second sealing layer, and the first concentric terminal and second concentric terminal with sealing and waterproofing capability, which can facilitate replacement of the lamp module group after failure. Meanwhile, after the LED lamp fails, the lamp module group can be directly replaced rather than replacing both the lamp housing and the lamp module group together.

The first housing and the second housing can each be made of a metal material. The first housing can tightly contact each of the first concentric terminal, the power supply driving module and the LED lamp board through the first sealing layer, and thus the thermal energy generated by the power supply driving module and the LED lamp board can be conducted through the first housing and the second housing. Therefore, the heat dissipation efficiency of the power supply driving module and the LED lamp board can be improved, the probability of failure of the power supply driving module, and the LED lamp board due to overheating can be reduced, and the service life of the power supply driving module and the LED lamp board can be improved. Meanwhile, the aging of the first concentric terminal, the second concentric terminal, and the wire can be reduced, effectively extending the service life of the lamp module group.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

Figure 1:
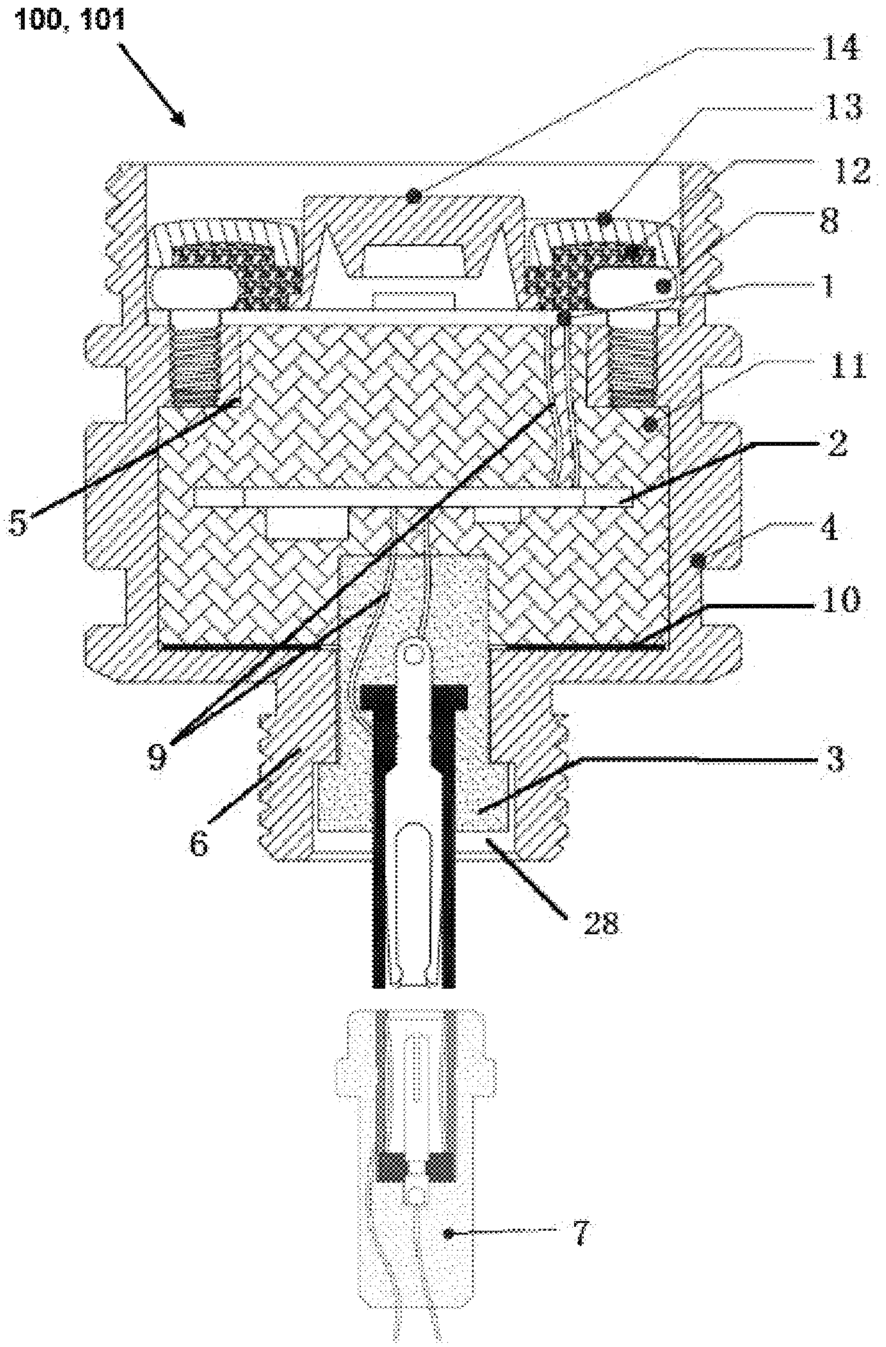
FIG. 1 is a schematic structural diagram of an electronic module group, which is a lamp module group in accordance with one aspect of the present disclosure.

Among them, 1—light-emitting diode (hereinafter "LED") lamp board, 2—power supply driving module, 3—first concentric terminal, 4—first housing, 5—inner rib, 6—shaft, 7—second concentric terminal, 8—fastener, 9—wire, 10—insulating sheet, 11—first sealing layer, 12—second sealing layer, 13—reflecting cup, 14—lens, 15—first insulating casing, 16—conductive ring, 17—conductive spring, 18—first insulating boss, 19—second insulating boss, 20—conductive post, 21—second insulating casing, 22—outer conductive sleeve, 23—first inner conductive sleeve, 24—first limiting boss, 25—second inner conductive sleeve, 26—third insulating sleeve, 27—second limiting boss, 28—first limiting groove, 29—second housing, 30—sealing ring, 31—installing table, 32—gasket, 33—sealing lens, 34—cover, 35—lamp holder, 36—base, 37—fixing rod, 38—cooling pipeline, 39—ventilation plate, 40—first gear, 41—second gear, 42—first rotating shaft, 43—fourth protruding column, 44—fixed disc, 45—first connecting rod, 46—third shaft sleeve, 47—blade, 48—third rotating shaft, 49—motor, 50—fourth rotating shaft, 51—bearing, 52—slideway, 53—sliding rod, 54—first connecting plate, 55—second connecting plate, 56—fourth shaft sleeve, 57—fourth connecting plate, 58—first shaft sleeve, 59—fifth rotating shaft, 60—fifth connecting plate, 61—second connecting rod, 63—third connecting rod, 64—third protruding column, 65—second shaft sleeve, 66—water storage cavity, 67—water outlet, 68—water inlet, 69—water outlet pipe, 70—water inlet pipe, 71—water injecting port, 72—piston pipe, 73—plunger rod, 74—movable plug, 75—first check valve, and 76—second check valve.

DETAILED DESCRIPTION OF THE DRAWINGS

Preferred aspects of the present invention are described below with reference to the accompanying drawings. It should be understood that the preferred aspects described herein are only used to illustrate and explain the present invention, and are not intended to limit the present invention. The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed, that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is an electronic module group and associated methods, systems, devices, and various apparatus. The electronic module group can comprise an LED lamp board and/or a speaker, a power supply driving module, a first concentric terminal, a first housing, and various accessories, which can be attached thereto. It would be understood by one of skill in the art that the disclosed electronic module group is described in but a few exemplary aspects among many. No particular terminology or description should be considered limiting on the disclosure or the scope of any claims issuing therefrom.

As shown in FIGS. 1-6, an aspect of the present invention discloses an electronic module group 100, which can be referred to as a "lamp module group 100" for the aspects of FIGS. 1-6 and some other aspects of the present disclosure. The lamp module group 100 can comprise a lamp module 101. In some aspects, such as those shown in FIGS. 31-32, the electronic module group 100 can be a "speaker module group 100," and the speaker module group 100 can comprise a speaker module 3101. In some aspects, it is contemplated that the electronic module group 100 can comprise one or more lamp modules 101 and one or more speaker modules 3101.

Returning to the aspects of FIGS. 1-6, the lamp module group 100 can comprise the LED lamp board 1, the power supply driving module 2, the first concentric terminal 3, and the first housing 4. In some usages, the LED lamp board 1, the power supply driving module 2, the first concentric terminal 3, and the first housing 4 can be referred to as a lamp module 101 of the lamp module group 100; however, the lamp module 101 can include additional components of the lamp module group 100, as well. The lamp module group 100 can be modular. The lamp module 101 can be waterproof. For example, in the present aspect, the lamp module 101 can be IP68 rated, or better, under International Electrotechnical Commission ("IEC") standard 60529. The lamp module group 100 can optionally comprise an assortment of accessories, which can be coupled to other components of the lamp module group 100, such as the first housing 4 or other components, to configure the lamp module group 100 for various different uses. For example, various configurations disclosed in different aspects of the present disclosure comprise recessed lights, spotlights, bollard lights, path lights, pendant lights, and sconces. These applications should not be viewed as limiting.

The first housing 4 can be a cylindrical structure. The inner rib 5 can be a ring structure, which can be provided on an inner wall of the first housing 4 close to an upper open end. In some aspects, the inner rib 5 can be a convex ring. An upper surface of the inner rib 5 can be installed on, or coupled to, the LED lamp board 1 by the fastener 8. The power supply driving module 2 can be provided below the LED lamp board 1 with a space, or interval, defined between the power supply driving module 2 and the LED lamp board 1. An output end of the power supply driving module 2 can be connected to a power supply input end of the LED lamp board 1 through the wire 9. An input end of the power supply driving module 2 can be connected to an output end of the first concentric terminal 3 through the wire 9. A lower surface of the first housing 4 can be provided with the shaft 6. The shaft 6 can be a protruding column. The shaft 6 can be a ring structure. The shaft 6 and the first housing 4 can be in communication with each other. One end of the first concentric terminal 3 close to the power supply driving module 2 can be fixed in the first housing 4, and the other end of the first concentric terminal 3 can extend out of an inner cavity of the shaft 6 and can be connected to the second concentric terminal 7. The first concentric terminal 3 and the second concentric terminal 7 can be one aspect of a concentric electrical connector assembly. In the present aspect, the first concentric terminal 3 can be a male concentric terminal, and the second concentric terminal 7 can be a female concentric terminal. In some aspects, the first concentric terminal 3 can be a female concentric terminal, and the second concentric terminal 7 can be a male concentric terminal. An end of the second concentric terminal 7, which can be positioned away from the first concentric terminal 3, can be installed in the second housing 29. The sealing ring 30 can be provided between the first housing 4 and the second housing 29. In some aspects, the sealing ring 30 can be an O-ring. The sealing ring 30 can comprise a material such as rubber, polymer, wax, for example and without limitation.

The lamp module group 100 can be configured to provide heat conduction and heat dissipation, waterproofing, and rotational coaxial connection power transmission by the provided first housing 4, second housing 29, first concentric terminal 3 and second concentric terminal 7. A waterproof seal can be formed between the first housing 4 and the second housing 29 by squeezing the sealing ring 30 between the first housing 4 and the second housing 29. The first concentric terminal 3 and the second concentric terminal 7 can be located between the first housing 4 and the second housing 29.

The first housing 4 and the second housing 29 can be coupled together by a threaded connection, which can conduct the heat of the power supply driving module 2 and the LED lamp board 1. Specifically, the heat of the power supply driving module 2 and the LED lamp board 1 can be conducted to the second housing 29 where the second concentric terminal 7 can be located through the connection between the first housing 4 and the second housing 29, thereby dissipating the heat of the power supply driving module 2 and the LED lamp board 1.

Threaded installation of the second housing 29 on the first housing 4 can form the coaxial rotational connected between the second concentric terminal 7 and first concentric terminal 3, and power can be transmitted between the second concentric terminal 7 and first concentric terminal 3.

The lamp module group 100 can be structurally configured to conduct heat, be waterproof, and transmit power through the rotational coaxial connection. Meanwhile, the external thread provided on the first housing 4, the external thread provided on the shaft 6, and the first concentric terminal 3 in conjunction with the second concentric terminal 7 can be combined with other accessories or extension accessories to form a variety of lamps, for example and without limitation, thereby providing a flexible range of uses for the lamp module group 100.

The first concentric terminal 3 and the second concentric terminal 7 can each be provided with a waterproof structure. The first housing 4 can be filled with glue between the first concentric terminal 3 and the LED lamp board 1, thereby forming the first sealing layer 11 in the first housing 4 so that the power supply driving module 2 can be completely sealed, or embedded, in the first sealing layer 11. A side of the LED lamp board 1 positioned away from the power supply driving module 2 can also be fixed in the first housing 4 by the fastener 8. An upper surface of the fastener 8 can be covered with the second sealing layer 12. The second sealing layer 12 can be configured to seal a gap between the fastener 8 and the LED lamp board 1. Thus, the LED lamp board 1 and the first concentric terminal 3 can be sealed, such as waterproofed, in the first housing 4. The power supply driving module 2, the power terminal of the LED lamp board 1, and the first concentric terminal 3 can be sealed, such as waterproofed, while providing modular capabilities. When in use, the first concentric terminal 3 and the second concentric terminal 7 are plugged into each other to achieve conduction. An end of the second concentric terminal 7 away from the first concentric terminal 3 can be configured to conduct power, so that electricity can be conducted, or transmitted, to the first concentric terminal 3. The power supply driving module 2 can be energized. After the power supply driving module 2 is energized, the LED lamp board 1 can be lit, and the lamp module group 100 can emit light.

When the lamp module 101 fails to work, the lamp module 101 that is installed in the lamp cover can be directly detached and replaced, thereby reducing the waste that would be caused by the direct replacement of the entire lamp cover. Meanwhile, the lamp module 101 can be sealed and/or waterproofed by the first sealing layer 11, the second sealing layer 12, and the first concentric terminal 3 and second concentric terminal 7 which can facilitate easy replacement of the lamp module 101 after failure. Meanwhile, after the LED lamp fails, the lamp module 101 can be directly replaced rather than replacing the lamp housing and the lamp module 101 together.

The lamp module 101 can comprise the first concentric terminal 3, the LED lamp board 1, the power supply driving module 2 and the first housing 4 together, and the lamp module 101 can be configured to electrically connect to the power supply by engaging with the second concentric terminal 7. The lamp module group 100 can comprise the first concentric terminal 3, the LED lamp board 1, the power supply driving module 2, and the second concentric terminal 7 together. The lamp module 101 can receive power through one end of the second concentric terminal 7, which can be connected to a power supply. The first concentric terminal 3 can be connected to the second concentric terminal 7 and can conduct the electricity to the power supply driving module 2, thereby supplying electrical power to the power supply driving module 2 and the LED lamp board 1.

The first housing 4 and the second housing 29 can each be made of a metal material. The first housing 4 can be in thermal communication with each of the first concentric terminal 3, the power supply driving module 2 and the LED lamp board 1 through the first sealing layer 11, and the thermal energy generated by the power supply driving module 2 and the LED lamp board 1 can be conducted through the first housing 4 and the second housing 29. Heat can be conducted away from the power supply driving module 2 and the LED lamp board 1 and dissipated, which can reduce the probability of failure of the power supply driving module 2 and the LED lamp board 1 due to overheating, and extend the service life of the power supply driving module 2 and the LED lamp board 1. Meanwhile, the aging of the first concentric terminal 3, the second concentric terminal 7, and the wire 9 can be reduced, effectively extending the service life of the lamp module group 100.

Figure 2:
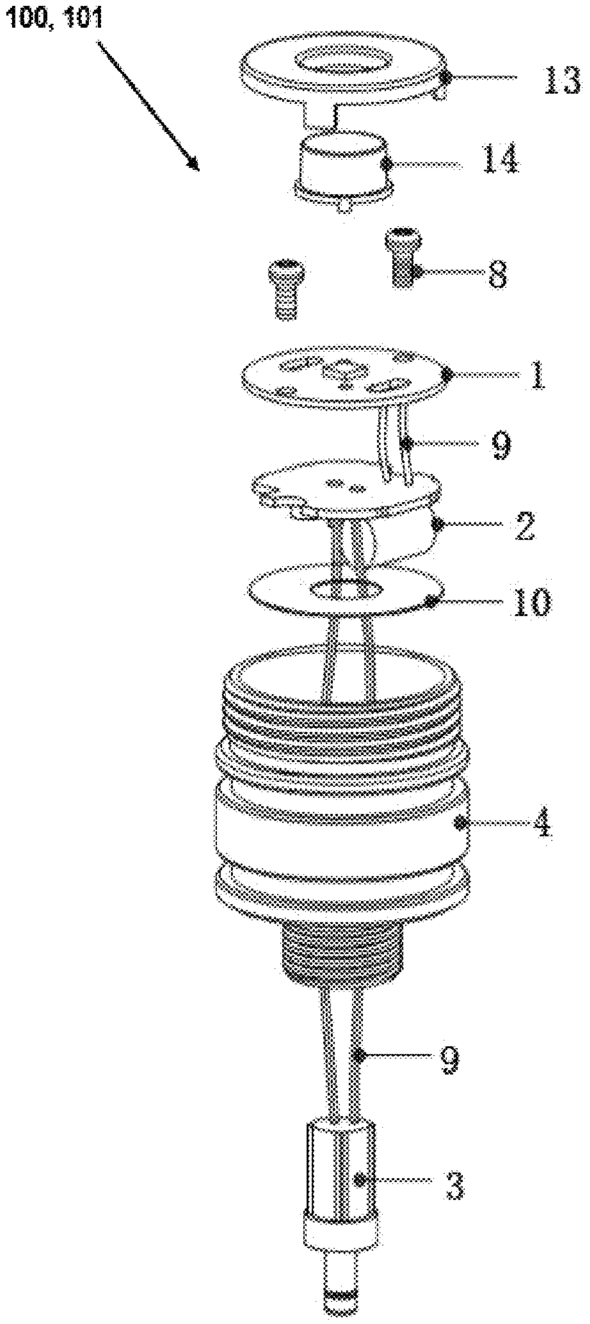
FIG. 2 is a schematic diagram of an exploded structure of the lamp module group of FIG. 1.

As shown in FIGS. 1-2, sides of the LED lamp board 1 and the fastener 8 close to the upper open end of the first housing 4 can be provided, such as being covered for example and without limitation, with the second sealing layer 12. The reflecting cup 13 can fit over the second sealing layer 12. The lens 14 can be positioned at a center of the reflecting cup 13. The lens 14 can be coupled over a light emitting part of the LED lamp board.

The second sealing layer 12 can prevent water or mist from entering the LED lamp board 1, such as through one of the holes that receive the fasteners 8 to mount the LED lamp board 1. The reflecting cup 13 can reflect light emitted by the LED lamp board 1 to make the lamp module 101 brighter, and the reflecting cup 13 can cover an upper surface of the LED lamp board 1 to further seal against water and moisture. The lens 14 can focus the LED light, and further waterproof the LED lamp board 1.

As shown in FIGS. 1-2, the first sealing layer 11 can be provided between the LED lamp board 1 and the power supply driving module 2. The first sealing layer 11 can be configured for sealing and fixing the LED lamp board 1, the power supply driving module 2, and the wires 9 together in the first housing 4.

The first sealing layer 11 can seal, or waterproof, the LED lamp board 1 and the power supply driving module 2 in the first housing 4, so that the LED lamp board 1 and the power supply driving module 2 can form one integral member via the first sealing layer 11.

As shown in FIGS. 1-2, the insulating sheet 10 can be shaped as a ring structure and can be provided on an inner wall of an end of the first housing 4 close to the shaft 6. A lower surface of the insulating sheet 10 and an inner bottom of the first housing 4 can be attached to each other. An upper surface of the insulating sheet 10 can be fixed inside the first housing 4 via the first sealing layer 11.

The insulating sheet 10 can insulate and separate the first sealing layer 11 and the first housing 4. The insulating sheet 10 and/or the first sealing layer 11 can provide isolation and padding between the first housing 4 and the first concentric terminal 3. The first sealing layer 11 can be poured into the first housing 4 as a liquid or gel to fill the first housing 4, and the first sealing layer 11 can dry or cure to form a solid layer.

Figure 3:
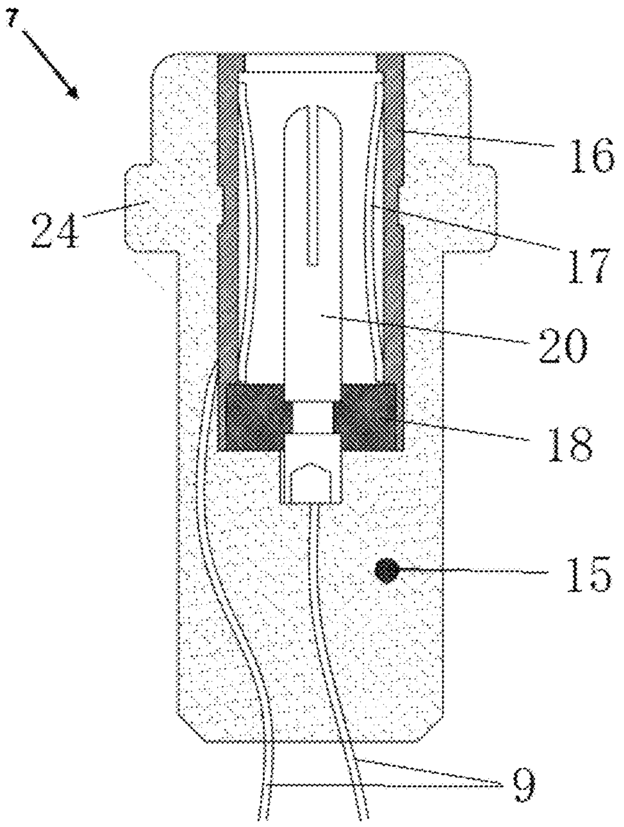
FIG. 3 is a schematic structural diagram of a second concentric terminal of the lamp module group of FIG. 1.

As shown in FIG. 3, the second concentric terminal 7 can comprise the first insulating casing 15, the conductive ring 16, the conductive spring 17, and the first insulating boss 18.

The conductive ring 16 can comprise a metal in some aspects. The first insulating boss 18 can comprise a plastic material in some aspects. The second concentric terminal 7 can be a columnar structure. A bore can be provided above the first insulating casing 15. A bottom of the bore can be provided with the first insulating boss 18. A center of the first insulating boss 18 can be embedded with the conductive post 20. In some aspects, the conductive post 20 can comprise a metal. An inner wall of the bore can be provided with the conductive ring 16. The conductive spring 17 can protrude toward an axial centerline direction of the conductive ring 16. The conductive spring 17 can be provided on an annular inner wall of the conductive ring 16. An outer wall of the conductive ring 16 can be connected to the wire 9. A lower portion of the conductive post 20 can extend downward from a center of the first insulating boss 18 and can be connected to the wire 9. The conductive ring 16 can be configured to insert the first concentric terminal 3. A first limiting boss 24 can be provided on a circumferential outer wall of an end of the first insulating casing 15 close to the bore, and the first limiting boss 24 can protrude outwards from the circumferential outer wall. When coupling the second concentric terminal 7 with the first concentric terminal 3, the first limiting boss 24 and the bore end can face the first concentric terminal 3, and can be configured to engage with the first concentric terminal 3.

The second concentric terminal 7 can be configured for plugging into the first concentric terminal 3 and forming an electrical connection, so that the second concentric terminal 7 conducts power to the the first concentric terminal 3, which conducts the electricity to the power supply driving module 2, and then lights the LED lamp board 1 via the power supply driving module 2.

The conductive spring 17 and the conductive post 20 of the second concentric terminal 7 are configured to receive the first concentric terminal 3. The conductive spring 17 can press the first concentric terminal 3 into a power supply end of the second concentric terminal 7, so that the first concentric terminal 3 can be fully in contact with the conductive post 20. By firmly engaging the first concentric terminal 3 with the second concentric terminal 7, reliable electrical communication can be maintained between the first concentric terminal 3 and the second concentric terminal 7, which can prevent disruptions to the power attributed to poor contact.

Figure 4:
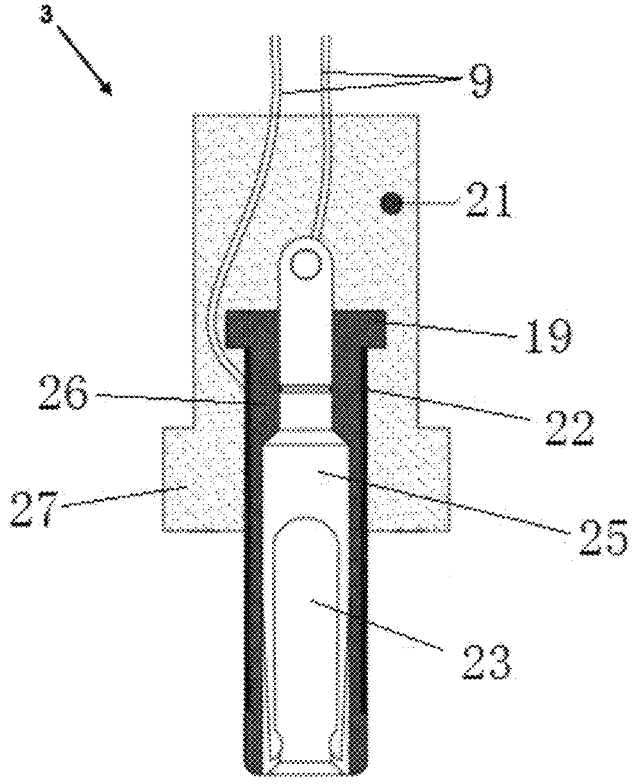
FIG. 4 is a schematic structural diagram of a first concentric terminal of the lamp module group of FIG. 1.

As shown in FIG. 4, the first concentric terminal 3 can comprise the second insulating casing 21, the second insulating boss 19, the outer conductive sleeve 22, and the first inner conductive sleeve 23. In some aspects, the second insulating boss 19 can comprise a plastic material. In some aspects, the outer conductive sleeve 22 and/or the first inner conductive sleeve 23 can comprise metal. In some aspects, the outer conductive sleeve 22 and/or the first inner conductive sleeve 23 can define a tubular structure. The second insulating casing 21 can be a columnar structure. A lower surface of the columnar structure can define a bore. A second insulating boss 19 can be provided in the bore. A side of the second insulating boss close to the bore can be provided with the third insulating sleeve 26. In some aspects, the third insulating sleeve 26 can comprise a plastic material. A diameter of the third insulating sleeve is smaller than a diameter of the second insulating boss 19. The outer conductive sleeve 22 can be provided between the third insulating post and the second insulating casing 21. The first insulating boss 18 and the second insulating boss 19 can be embedded with the second inner conductive sleeve 25. In some aspects, the second inner conductive sleeve 25 can comprise metal. In some aspects, the second inner conductive sleeve 25 can define a tubular shape. One end of the second inner conductive sleeve 25 close to a bottom of the bore can be provided with the wire 9. The wire 9 at one end away positioned from the second inner conductive sleeve 25 can penetrate and extend out of the second insulating casing 21. Another wire 9 can be connected to an outer wall of the outer conductive sleeve 22. The second inner conductive sleeve 25 can be embedded within the first inner conductive sleeve 23. The lower end of the first inner conductive sleeve 23 can define an opening, which can define a circular shape. The opening can be configured for mating the second concentric terminal 7 with the first concentric terminal 3. A circumferential outer wall of an end of the second insulating casing 21 positioned close to the opening of a circular groove can be provided with the second limiting boss 27. The second limiting boss 27 and the second insulating casing 21 can each be configured to be inserted into and fixed in the shaft 6. An end of the shaft 6 positioned away from the first housing 4 can be provided with the first limiting groove 28. A diameter of the first limiting groove 28 can be larger than a diameter of a central through hole of the shaft 6. The first limiting groove 28 can be configured for embedding the second limiting boss 27.

Further, both the first concentric terminal 3 and the second concentric terminal 7 can achieve 360-degree rotation after being plugged, and can further ensure that the power-on state is still maintained during the rotation. Moreover, the twisted disconnection of the wire 9 is avoided during the rotation.

During use, one end of the first inner conductive sleeve 23 of the first concentric terminal 3 can be inserted into the conductive post 20 of the second concentric terminal 7. The other end of the first concentric terminal 3 can be a wire 9 end. The wire 9 at the wire 9 end can be electrically connected to the power supply driving module 2. Meanwhile, the second insulating casing 21, which can be provided at the wire 9 end of the first concentric terminal 3, can be inserted into an inner cavity of the first housing 4 and can be collectively sealed and fixed in the first housing via the first sealing layer 11. One end of the second limiting boss 27 of the first concentric terminal 3 close to the second insulating casing 21 can be closely attached to a groove bottom of a first limiting groove. The second limiting boss 27 can be completely placed in the first limiting groove. Thus, the second insulating casing 21 and the second limiting boss 27 of the first concentric terminal 3 can be completely located in the shaft 6 and the inner cavity of the first housing.

Figure 5:
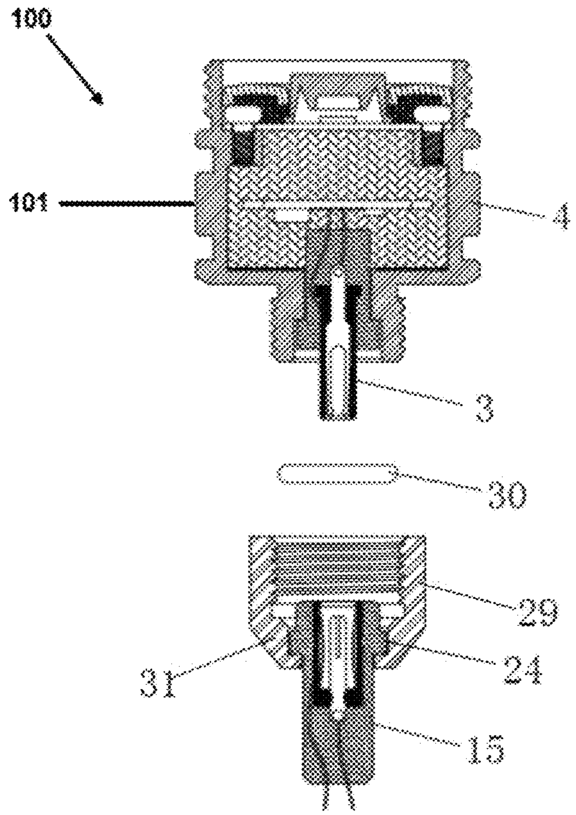
FIG. 5 is a schematic structural diagram of a connection between a first housing of the lamp module group of FIG. 1 and a second housing in accordance with another aspect of the present disclosure.

As shown in FIGS. 3-5, the conductive ring 16 and the conductive spring 17 of the second concentric terminal 7 can be provided to be communicated with each other through the wire 9, and can form a third communication line in the second concentric terminal 7. The conductive post 20 can form a fourth communication line in the bore of the first insulating casing 15 via the first insulating boss 18. The first inner conductive sleeve 23 and the second inner conductive sleeve 25 of the first concentric terminal 3 can each be made of a metal material. The first conductive sleeve can be a bore provided within the second conductive sleeve, thereby forming a first communication line. The outer conductive sleeve 22 can be separated by the third insulating sleeve 26 from the circumferential outer wall of the second conductive sleeve. The outer conductive sleeve 22 can penetrate the second insulator housing through the wire 9 and can form a second communication line. An end of the first concentric terminal 3 away from the second concentric terminal 7 can be configured to connect to the power supply driving module 2. An end of the second concentric terminal 7 away from the first concentric terminal 3 can be configured to connect to a power supply. When the first concentric terminal 3 and the second concentric terminal 7 are mated in electrical communication, the first communication line and the third communication line can be connected together in electrical communication, and the second communication line and the fourth communication line can be connected together in electrical communication. When the first concentric terminal 3 and the second concentric terminal 7 are mated in electrical communication, the first communication line can be electrically isolated from the second communication line, and the third communication line can be electrically isolated from the fourth communication line.

As shown in FIG. 5, a circumferential outer wall of the shaft 6 can be provided with an external thread. The external thread can be configured for installing the second housing 29. The second housing 29 can be a tubular structure. The installing table 31 can be a tapered structure, which can be provided below the tubular structure. An end of the installing table 31 positioned away from the second housing 29 can be provided with a through hole. The through hole can be configured for receiving the first limiting boss 24 of the second concentric terminal 7. A lower surface of the first limiting boss 24 can be connected to an inner bottom surface of the installing table 31. An upper surface of the first limiting boss can be provided with the sealing ring 30.

The second housing 29 can be configured for securing the second concentric terminal 7 and protecting the second concentric terminal 7. The second housing 29 can maintain the connection between the second concentric terminal 7 and the first concentric terminal 3.

During use, an internal thread provided on an inner wall of one end of the second housing 29 away from the installing table 31 can be installed, or engaged, to the external thread of the shaft 6 provided on the first housing 4. The sealing ring 30 can be a ring structure, which can be further provided between the second housing 29 and the shaft 6. The sealing ring 30 can seal a gap between the first housing 4 and the second housing 29 so that the connection can be waterproof. The sealing ring 30 can be compressed between the first housing 4 and the second housing 29 via the shaft 6, which not only enhances the contact between the first concentric terminal 3 and the second concentric terminal 7, but also strengthens the seal and waterproofing of the connection.

Figure 6:
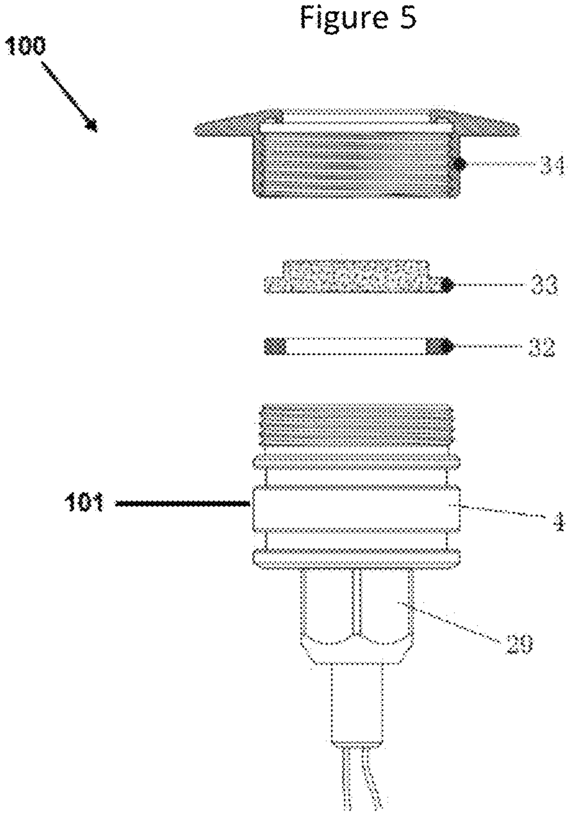
FIG. 6 is a schematic structural diagram of the lamp module group of FIG. 1, the second housing of FIG. 5, and a cover in accordance with another aspect of the present disclosure.

As shown in FIG. 6, a circumferential outer wall of an end of the first housing 4 positioned away from the shaft 6 can be provided with an external thread. The external thread can be configured for installing the cover 34. A center of the cover 34 is provided with an installation through-hole. An inner bottom of one end of the installing hole away from the first housing 4 can be embedded with the sealing lens 33. A side of the sealing lens 33 positioned away from an inner ground of the installing hole can be provided with the gasket 32, which can be a ring structure. In some aspects, the gasket 32 can comprise silicone or another elastomer, such as a rubber for example and without limitation. The gasket 32 can be sleeved on a circumferential outer wall of an end of the external thread of the first housing 4. The cover 34 can be any one selected from the group comprising a flat lid, a curved lid, a round beveled cover, a vertical lamp cover, a long tube cover, and a square beveled cover.

The cover 34 can be made of a metal material. The cover 34 can be connected by using the outer thread of the circumferential outer wall of the end of the first housing 4 away from the first concentric terminal 3. The cover 34 can condense, or focus, light of the LED lamp board 1 and protect the LED lamp board 1, the reflecting cup 13, and the lens 14. The gasket 32 can engage with the cover 34 and the first housing 4 to seal and waterproof the lamp module 101. The sealing lens 33 can be a columnar piece of glass with a section of a T-shaped structure as shown in FIG. 6. For example, the sealing lens 33 can define a stepped shoulder. The sealing lens 33 can prevent water, water vapor, dust, dirt, or other elements from entering the first housing 4 from outside the cover 34. Thus, water resistance and/or waterproofing is provided. The cover 34 can conduct thermal energy of the first housing 4, which can further conduct heat away from the power supply driving module 2 and the LED lamp board.

As shown in FIGS. 7-13, an end of the second housing 29 positioned away from the first housing 4 can be fixed on the lamp holder 35. The lamp holder 35 can be fixed on the base 36 by the fixing rod 37. An inner wall of the lamp holder 35 can be spirally embedded with the cooling pipeline 38. Both ends of the cooling pipeline 38 can extend from an end of the lamp holder 35 close to the fixing rod 37 onto the base 36. The water storage cavity 66 can be provided in the base 36. An upper surface of the water storage cavity 66 can be provided with the water inlet 68 and the water outlet 67. The water inlet 68 can be connected to the water inlet pipe 70. The water outlet 67 can be connected to the water outlet pipe 69. The water inlet pipe 70 and the water outlet pipe 69 can be connected to two open ends of the cooling pipeline 38, respectively. One end of the lamp holder 35 close to the second housing 29 can be provided with the ventilation plate 39. One end of the ventilation plate 39 away from the second housing 29 can be provided with a fan and a water pressure adjusting device. The fan can be provided to be close to the ventilation plate 39. One end of the water pressure adjusting device can be connected to a driving device, and the other end can be connected to an end of the cooling pipeline 38 close to the water outlet pipe 69. A circumferential outer wall of the water storage cavity 66 can be further provided on the water injecting port 71.

The first housing 4 can be compatible with various specifications of lamp holders 35. The lamp holder 35 can have a chandelier structure that is hung on a roof or a cantilever by a lifting ring, or a ceiling structure that is directly installed on the roof or the cantilever by the fastener 8. Or, the lamp holder 35 can be a floodlight or underwater lamp fixed by the fixing rod 37 and the base 36. When the lamp holder 35 can be used as a floodlight or underwater lamp, the base 36 can fix the lamp holder 35 by the fixing rod 37 to install the lamp module group 100. The cooling pipeline 38 can be provided in the lamp holder 35, and the cooling pipeline 38 can be spirally provided on the inner wall of the lamp holder 35, and therefore the reduction of the temperature in the lamp holder 35 can be achieved. Since the lamp module can be installed between the lamp holder 35 and the cover 34, the purpose of heat conduction and heat dissipation for the lamp module group 100 can be achieved by both the lamp holder 35 and the cover 34. Thus, the cooling pipeline 38 can perform water-cooling circulation through the water storage cavity 66 provided in the base 36. In addition, a fan can be further provided in the lamp holder 35. The fan can blow the ventilation plate 39. The ventilation plate 39 can have a circular plate structure. A surface of the circular plate structure can be provided with a plurality of spaced ventilation holes. The ventilation holes can be beneficial for the wind of the fan to be blown toward an end of the second concentric terminal 7 away from the first concentric terminal 3, and thus the purpose of air cooling the second concentric terminal 7 and the lamp holder 35 can be achieved.

As shown in FIGS. 8-13, the fan can include the blade 47, the third rotating shaft 48, and the motor 49. A circumferential outer wall of one end of the third rotating shaft 48 is provided with a plurality of blades 47. The other end of the third rotating shaft 48 can be connected to the first rotating shaft 42. A circumferential outer wall of one end of the third rotating shaft 48 close to the first rotating shaft 42 can be provided with the first gear 40. The first gear 40 can be provided to be engaged with the second gear 41. A center of the second gear 41 can be connected to the fourth rotating shaft 50. The fourth rotating shaft 50 can be provided to be perpendicular to the third rotating shaft 48. An end of the fourth rotating shaft 50 away from the second gear 41 can be connected to a rotating end of the motor 49. An end of the motor 49 away from the fourth rotating shaft 50 can be fixed on an inner wall of the lamp holder 35. The first gear 40 and the second gear 41 can be provided as bevel gears that are engaged with each other. The fixed disc 44 with a circular structure can be provided on the inner wall of the lamp holder 35. The bearing 51 can be provided at a center of the fixed disc 44. The bearing 51 can be configured to connect the circumferential outer wall of the first rotating shaft 42. The lamp holder 35 can have an L-shaped structure. One end of the L-shaped structure can be configured for installing the lamp module group 100, and the other end can be configured for installing on the base 36. The circumferential outer wall of the first rotating shaft 42 can be provided with the first connecting rod 45. The connecting rod can be provided at an end of the first rotating shaft 42 away from the third rotating shaft 48. An end of the first connecting rod 45 away from the first rotating shaft 42 can be provided with the fourth protruding column 43. The fourth protruding column 43 can be provided on a side of the first connecting rod 45 away from the fixed disc 44. The third shaft sleeve 46 can be rotatably connected onto the fourth protruding column 43. The third shaft sleeve 46 can be connected to the third connecting rod 63. An end of the third connecting rod 63 away from the third shaft sleeve 46 can be provided with the fourth shaft sleeve 56. The fourth shaft sleeve 56 can be rotatably connected onto the third protruding column 64. An end of the third protruding column 64 can be provided on one side of a second connecting plate 55. The other side of the second connecting plate 55 can be fixed on a first connecting plate 54. A side of the first connecting plate 54 away from the second connecting plate can be provided with the sliding rod 53. The sliding rod 53 can be slidably provided on the slideway 52. The slideway 52 can be provided on the inner wall of the lamp holder 35. An end of the second connecting plate 55 can be connected to the fourth connecting plate 57. The fourth connecting plate 57 and the third protruding column 64 can be provided on the same surface of the second connecting plate 55. An end of the fourth connecting plate 57 away from the second connecting plate 55 can be fixed on the first shaft sleeve 58. The first shaft sleeve 58 can be fixedly provided on the fifth rotating shaft 59. Both ends of the fifth rotating shaft 59 can be rotatably provided on the inner wall of the lamp holder 35. The second shaft sleeve 65 can be further fixedly provided on the fifth rotating shaft 59. A circumferential outer wall of the second shaft sleeve 65 can be provided with the fifth connecting plate 60. An end of the fifth connecting plate 60 away from the second shaft sleeve 65 can be connected to the second connecting rod 61. An end of the second connecting rod 61 away from the second shaft sleeve 65 can be fixedly connected to the plunger rod 73. An end of the plunger rod 73 away from the second connecting rod 61 can be provided with the movable plug 74. The movable plug 74 can be movably provided in the piston pipe 72. The other end of the piston pipe 72 can be provided to be in communication with one end of the cooling pipeline 38 close to the water outlet pipe 69. The first check valve 75 and the second check valve 76 can be provided on the cooling pipeline 38. The first check valve 75 and the second check valve 76 can be provided on both sides of the piston pipe 72, respectively. The fifth connecting plate 60 and the fourth connecting plate 57 can be provided on both sides of the fifth rotating shaft 59 along an axial centerline of the fifth rotating shaft 59, respectively. The first shaft sleeve 58 and the second shaft sleeve 65 can be provided on the circumferential outer wall of the fifth rotating shaft 59 at an interval. The slideway 52 and the motor 49 can each be provided on an inner wall of the same side of the lamp holder 35. An end of the piston pipe 72 close to the second connecting rod 61 can be provided with a sealing device. The sealing device can be a sealing rubber ring. An outer wall of the sealing device can be fixed to an open inner wall of the piston pipe 72. A center of the sealing device can be provided with a through hole for the movable plug 74 to move back and forth.

The sliding rod 53, the fourth connecting plate 57, and the fifth connecting plate 60 each can be provided in parallel to each other. The planes of the fourth connecting plate 57 and the fifth connecting plate 60 can each be provided in parallel to a surface of the fixed disc 44. The third connecting rod 63 can be located between the fixed disc 44 and the fourth connecting plate 57, and the third connecting rod 63 can be provided to be inclined with respect to the planes of the fourth connecting plate 57 and the fixed disc 44.

The water injecting port 71 can be configured to add or discharge water into or from the water storage cavity 66. An open end of the water injecting port 71 can be provided with a sealing plug. When the water needs to be added or discharged, the purpose of adding or discharging the water into or from the water storage cavity 66 can be achieved by removing the sealing plug.

The inside of the lamp holder 35 can be air-cooled by using the fan. The water in the water storage cavity 66 can be adsorbed into the cooling pipeline 38 by the water pressure adjusting device, improving the water flow speed of the cooling pipeline 38, achieving the purpose of accelerating the cooling of the cooling pipeline 38, and further making the water in the cooling pipeline 38 cool the heat of the lamp holder 35, the first housing 4 and the second housing 29. Thus, the service life of the lamp module group 100 can be improved. During operation, the fan can first be started. After the fan is started, the water pressure adjusting device can begin to work. After the water pressure adjusting device is operational, the fan and the water pressure adjusting device can jointly achieve air cooling and water cooling, thereby achieving the purpose of cooling the lamp module group 100.

Its working principle can be as follows: the motor 49 can be connected to a power supply through the wire 9. When the power supply is started, the motor 49 and the lamp module can be separately started. After the motor 49 is started, the fourth rotating shaft 50 can rotate. After the fourth rotating shaft 50 rotates, the first gear 40 can be driven to rotate. The first gear 40 can rotate and can then engages with the second gear 41 to rotate. The second gear 41 can rotate and can then drive the third rotating shaft 48 and the first rotating shaft 42 to rotate. The third rotating shaft 48 can rotate and can then drive the blade 47 to rotate. The blade 47 can rotate to achieve blowing. The wind of the blade 47 can be blown toward the second housing 29 via the ventilation plate 39, so that the purpose of air cooling the second housing 29 can be achieved.

After the first rotating shaft 42 rotates, the first connecting rod 45 can be driven to rotate. The first connecting rod 45 can rotate, allowing the fourth protruding column 43 on the first connecting rod 45 to make a circular motion around the axial centerline of the first rotating shaft 42, thereby driving the third connecting rod 63 fixedly provided on the third shaft sleeve 46 to rotate, and then the third connecting rod 63 can make a circular motion along with it.

Figure 9:
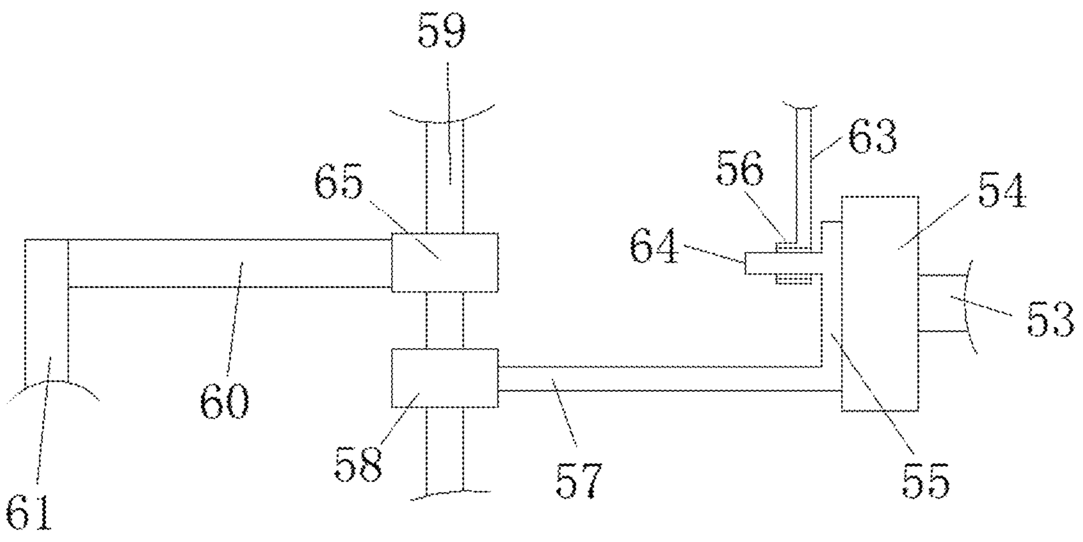
FIG. 9 is a schematic structural diagram of a top view of a water pressure adjusting device in accordance with another aspect of the present disclosure.
Figure 10:
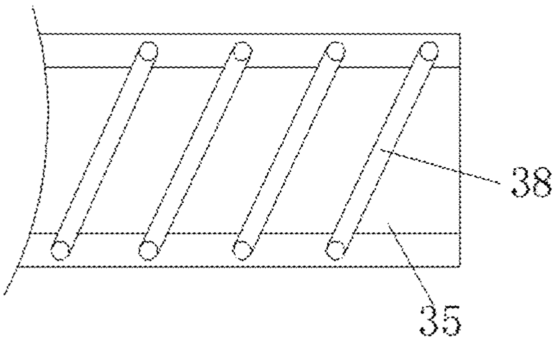
FIG. 10 is a schematic structural diagram of a cooling pipeline in accordance with another aspect of the present disclosure.
Figure 11:
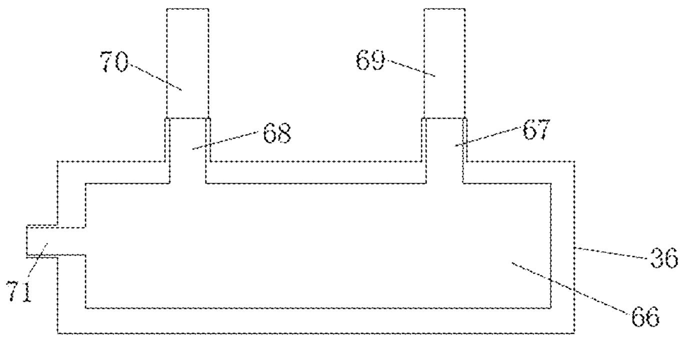
FIG. 11 is a schematic structural diagram of a water storage cavity in accordance with another aspect of the present disclosure.

An end of the third connecting rod 63 away from the first connecting rod 45 can be rotatably provided on the third protruding column 64. The third protruding column 64, the first connecting plate 54, and the second connecting plate 55 can each be fixedly connected. The other end of the fourth connecting plate 57 can be fixed to the circumferential outer wall of the fifth rotating shaft 59 through the first shaft sleeve 58. Both ends of the fifth rotating shaft 59 can be rotatably provided on the inner wall of the lamp holder 35. Thus, the third connecting rod 63 can allow the first connecting plate 54 and the second connecting plate 55 to swing. The sliding rod 53 can be connected to the first connecting plate 54 and can move back and forth on the slideway 52, and can drive the fifth rotating shaft 59 to rotate back and forth. The fifth rotating shaft 59 can rotate back and forth, and can then drive the second shaft sleeve 65 and the fifth connecting plate 60 to swing back and forth. The fifth connecting plate 60 can swing, and can then drive the second connecting rod 61 in FIG. 8 to move left and right. The second connecting rod 61 in FIG. 9 is shown to move up and down.

Figure 12:
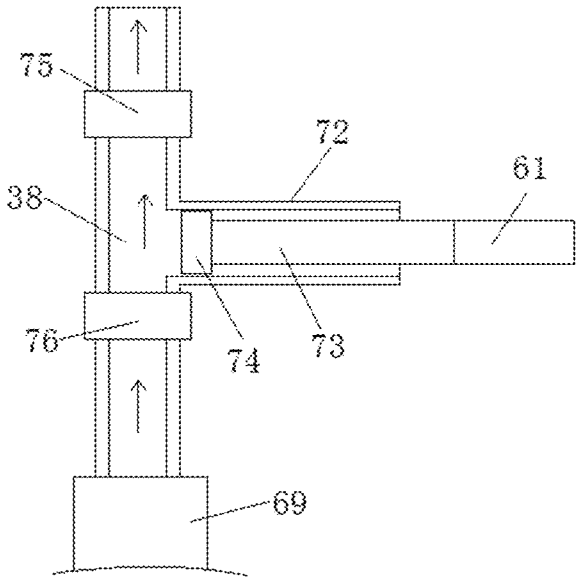
FIG. 12 is a schematic structural diagram of a connection between a plunger pipe and a cooling pipeline in accordance with another aspect of the present disclosure.
Figure 13:
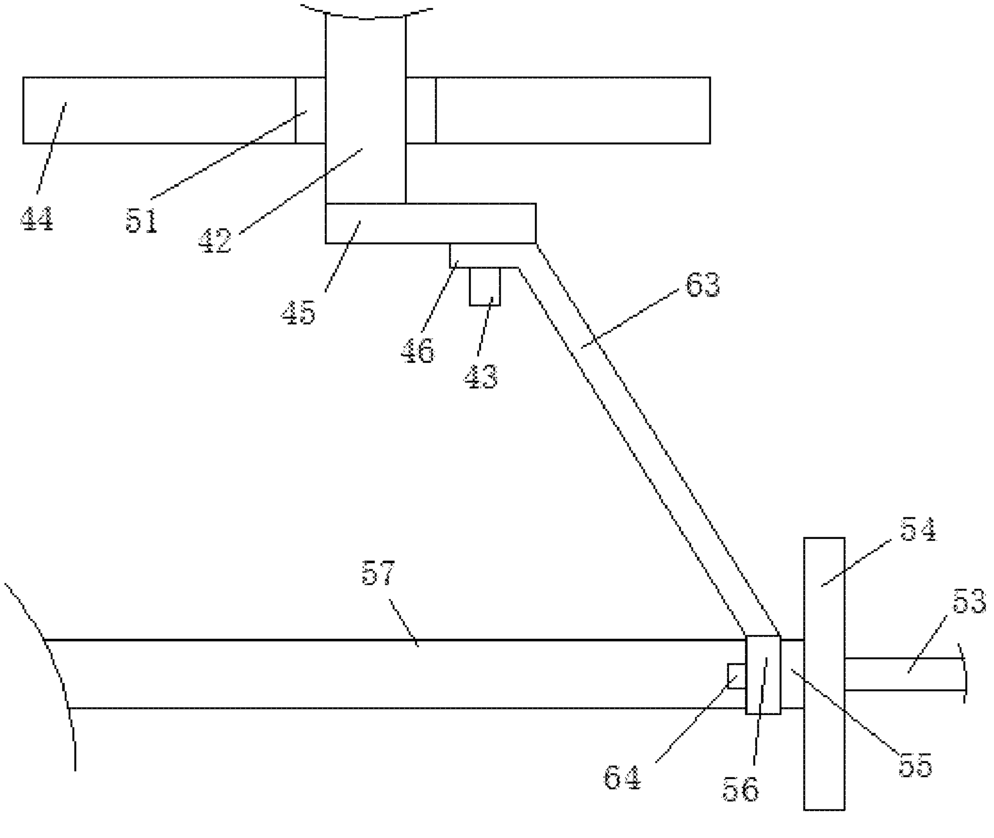
FIG. 13 is a schematic structural diagram of a connection between a third connecting rod, a third shaft sleeve, and a fourth shaft sleeve in accordance with another aspect of the present disclosure.

An end of the second connecting rod 61 away from the fifth connecting plate 60 can be fixedly connected to the plunger rod 73. The plunger rod 73 can also move back and forth, thereby allowing the movable plug 74 to move back and forth in the piston pipe 72. When the movable plug 74 moves back and forth in the piston pipe 72, the air pressure in the piston pipe 72 can change. In FIG. 12, when the plunger rod 73 moves to the right, the second check valve 76 can be opened and the first check valve 75 can be closed. The water in the water storage cavity 66 can be introduced into the cooling pipeline 38 between the first check valve 75 and the second check valve 76 via the water outlet 67 and the water outlet pipe 69, and can fully fill the cooling pipeline 38 located between the first check valve 75 and the second check valve 76. When the plunger rod 73 moves to the left, the second check valve 76 can be closed and the first check valve 75 can be opened. The water in the cooling pipeline 38 located between the first check valve 75 and the second check valve 76 can be pressurized and can flow from the first check valve 75 to the other end of the cooling pipeline 38. Repetition can allow the water in the water storage cavity 66 to intermittently flow into the cooling pipeline 38 via one end of the cooling pipeline 38, and then flow back to the water storage cavity 66 via the other end of the cooling pipeline 38, thereby achieving the purpose of circulating the water in the cooling pipeline 38. The cooling efficiency can be accelerated, so that the lamp module can achieve the purpose of accelerated cooling.

Figure 7:
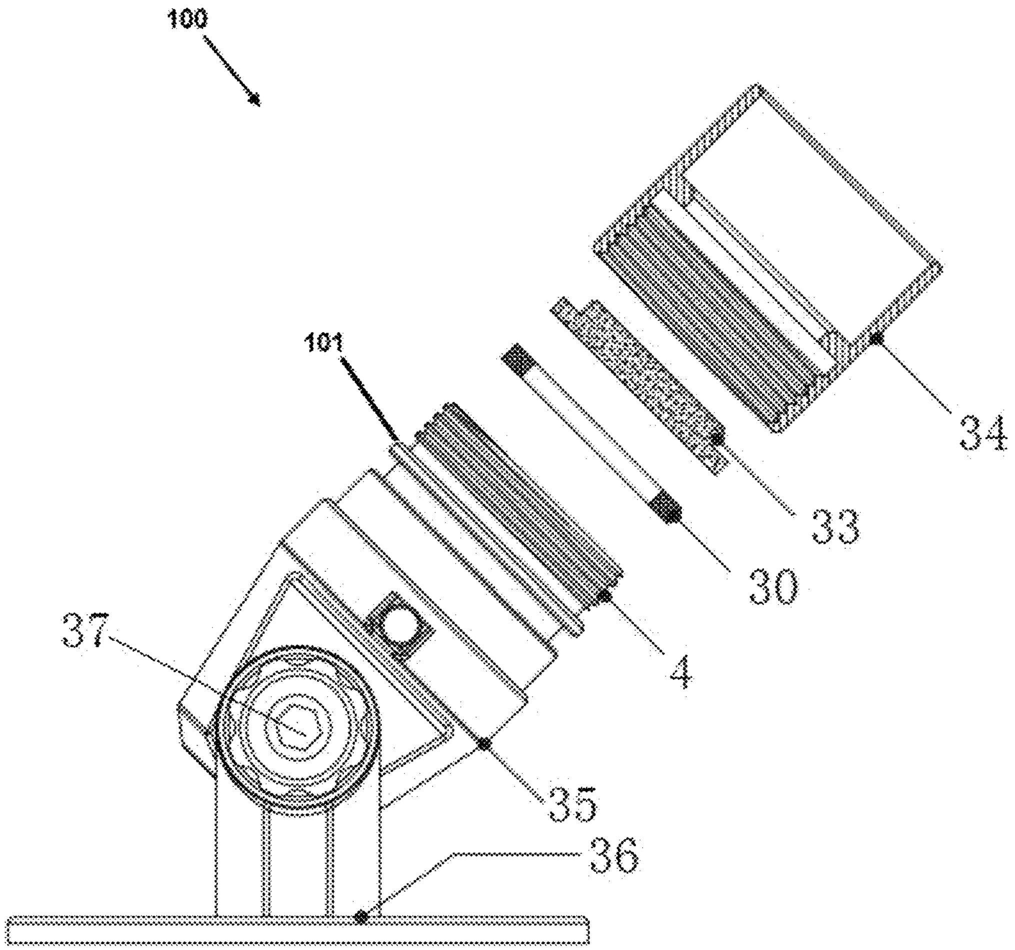
FIG. 7 is a schematic structural diagram of a lamp holder in accordance with another aspect of the present disclosure.
Figure 8:
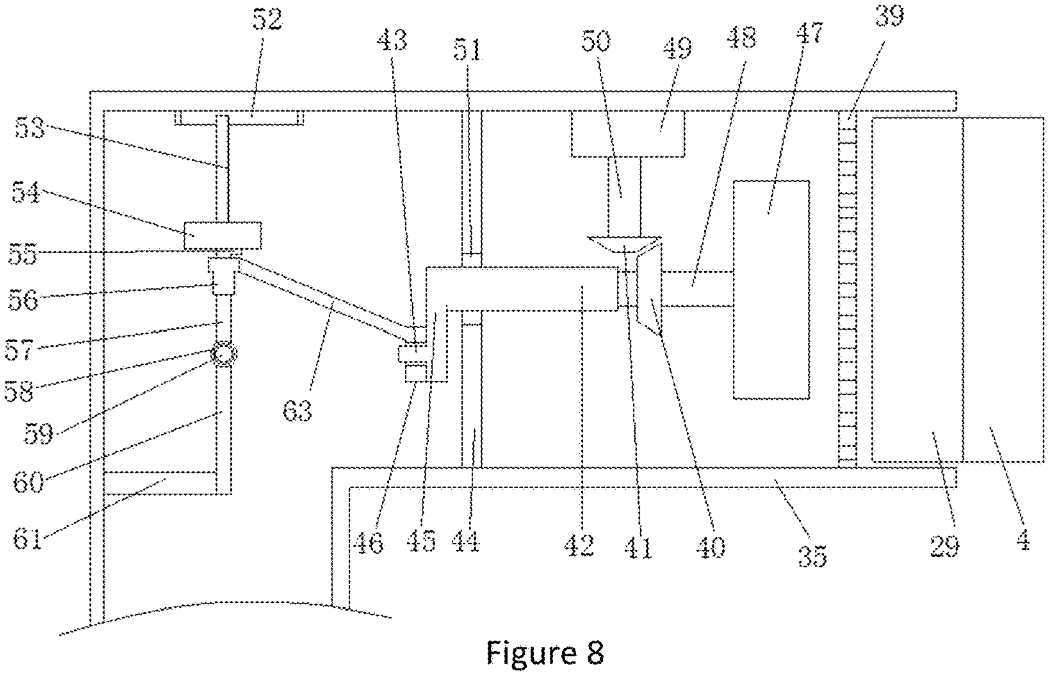
FIG. 8 is a schematic structural diagram of a water pressure adjusting device in accordance with another aspect of the present disclosure.

The various components and assemblies disclosed in FIGS. 8-13 can be omitted from any of the aspects of the lamp module group 100 disclosed herein, specifically including the lamp holder of FIG. 7. The aspects disclosed in FIGS. 8-13 are strictly optional and should be viewed as being required by any aspects of the lamp module group 100, or associated components, disclosed herein.

Figure 14:
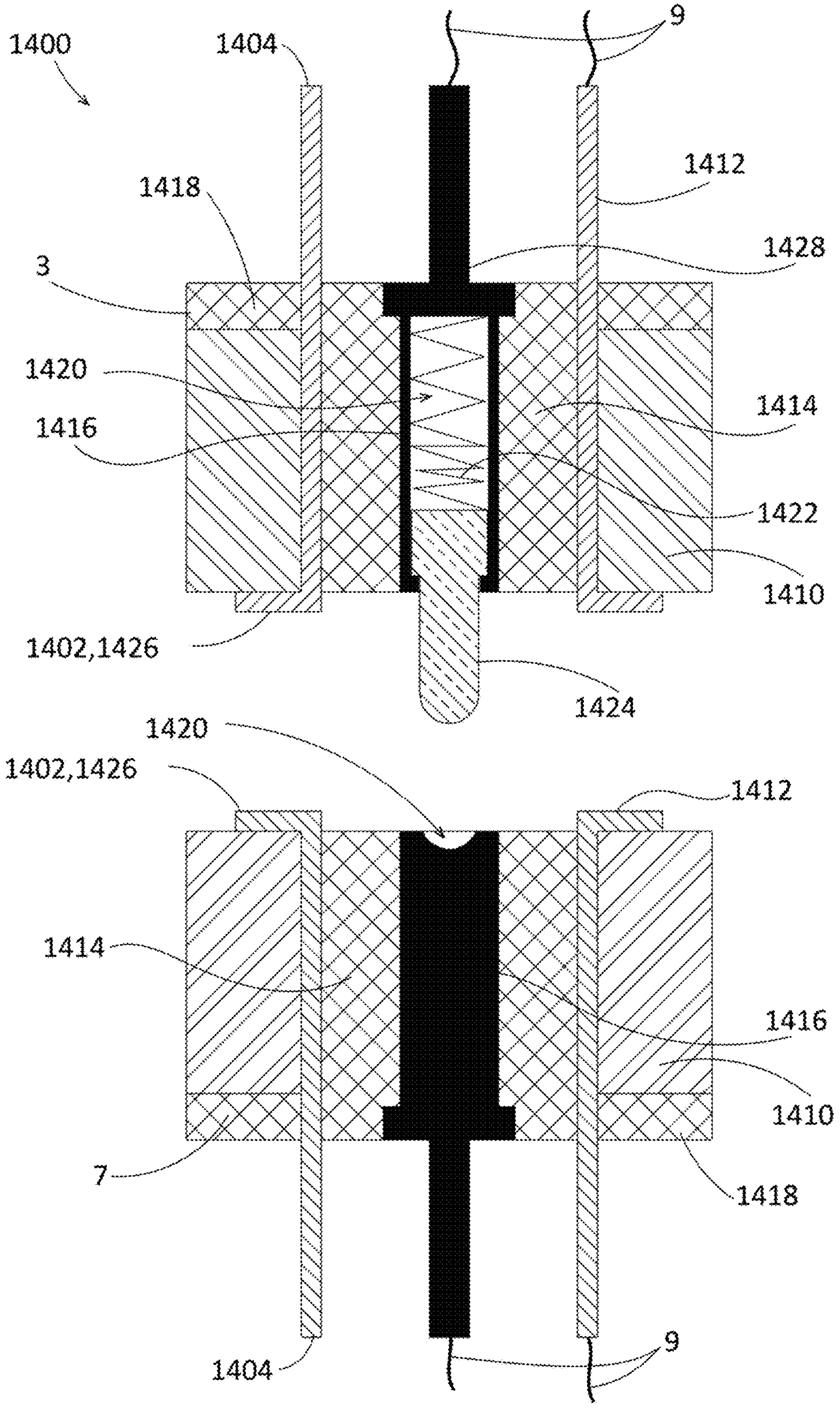
FIG. 14 is a cross-sectional schematic diagram of a concentric electrical connector in accordance with another aspect of the present disclosure.

FIG. 14 is a cross-sectional view of another aspect of a concentric electrical connector assembly 1400 in accordance with another aspect of the present disclosure. The concentric electrical connector assembly 1400 can comprise another aspect of the first concentric terminal 3 and the second concentric terminal 7. In the present aspect, the first concentric terminal 3 can be a male concentric terminal, and the second concentric terminal 7 can be a female concentric terminal. In some aspects, the first concentric terminal 3 can be a female concentric terminal, and the second concentric terminal 7 can be a male concentric terminal.

Each concentric terminal 3,7 can define an inner connection end 1402 and an outer connection end 1404. Each concentric terminal 3,7 can comprise a magnet 1410, an outer conductive sleeve 1412, an insulating sleeve 1414, an inner conductive sleeve 1416, and an insulative ring 1418. In the present aspect, the outer conductive sleeves 1412 can extend from the inner connection end 1402 to the outer connection end 1404. The outer conductive sleeves 1412 can each define a contact flange 1426 at the inner connection end 1402 of each concentric terminal 3,7. The outer conductive sleeve 1412 and the inner conductive sleeve 1416 of each concentric terminal 3,7 can be coupled to a wire 9 at the outer connection end 1404. In some aspects, the conductive sleeves 1412,1416 can comprise a conductive material, such as metal for example and without limitation.

The inner conductive sleeve 1416 can be positioned at the center of each respective concentric terminal 3,7. The insulating sleeves 1414, the outer conductive sleeves 1412, the magnets 1410, and/or the insulative rings 1418 can define an at least partially annular or tubular shape, for example and without limitation. Each inner conductive sleeve 1416 can be at least partially surrounded by the respective insulating sleeve 1414. Each insulating sleeve 1414 can be at least partially surrounded by the respective outer conductive sleeve 1412. The insulating sleeves 1414 can electrically isolate the inner conductive sleeves 1416 from the outer conductive sleeves 1412. The outer conductive sleeves 1412 can be at least partially surrounded by the magnets 1410 and the insulative rings 1418. The magnets 1410 can be captured, or secured, on the outer conductive sleeves 1412 between the respective insulative rings 1418 and the contact flanges 1426.

Each inner conductive sleeve 1416 can define an inner sleeve cavity 1420. The inner sleeve cavities 1420 can extend into the respective inner conductive sleeves 1416 from the inner connection ends 1402 towards the outer connection ends 1404. In the present aspect, the inner sleeve cavity 1420 of the first concentric terminal 3 can be a bore extending into the inner conductive sleeve 1416 to a conductive base 1428 of the inner conductive sleeve 1416. A spring 1422 can be positioned within the inner sleeve cavity 1420 between the conductive base 1428 and a conductive pin 1424. In the present aspect, the spring 1422 can be a coil spring. The conductive pin 1424 can be captured at the inner connection end 1402 of the first concentric terminal 3, and the conductive pin 1424 can be configured to telescope, or slide, within the inner sleeve cavity 1420, which can compress the spring 1422.

In the present aspect, the inner sleeve cavity 1420 of the second concentric terminal 7 can be a shallow depression, such as a dimple, for example and without limitation. In some aspects, the inner sleeve cavity 1420 can extend further into the inner conductive sleeve 1416 of the second concentric terminal 7, such as to define a bore for example and without limitation. The inner sleeve cavity 1420 can be sized to receive the conductive pin 1424.

The poles of the magnets 1410 can be oriented so that the inner connection end 1402 of the first concentric terminal 3 attracts the inner connection end 1402 of the second concentric terminal 7, and vice versa. The magnets 1410 can draw the inner connection ends 1402 together to place the contact flanges 1426 of the outer conductive sleeves 1412 in facing engagement and in electrical communication, thereby establishing a first electrically conductive pathway through the outer conductive sleeves 1412 and the wires 9 attached thereto.

As the inner connection ends 1402 are drawn together, the conductive pin 1424 can engage the inner sleeve cavity 1420 of the inner conductive sleeve 1416 of the second concentric terminal 7, and the conductive pin 1424 can be depressed into the inner sleeve cavity 1420 of the inner conductive sleeve 1416 of the first concentric terminal 3, thereby compressing the spring 1422. The spring 1422 can exert a biasing force on the conductive pin 1424, which can ensure positive contact between the conductive pin 1424 and the inner conductive sleeve 1416 of the second concentric terminal 7, thereby establishing electrical communication between the conductive pin 1424 and the inner conductive sleeve 1416 of the second concentric terminal 7. The conductive pin 1424 can maintain electrical communication with the inner conductive sleeve 1416 of the first concentric terminal 3 through both direct contact with the inner conductive sleeve 1416 and through indirect contact through the spring 1422, which can be electrically conductive. Accordingly, a second electrically conductive pathway can be established through the inner conductive sleeves 1416 and the wires 9 attached thereto.

The concentric electrical connector assembly 1400 can be rotatable, in that the concentric terminals 3,7 can be rotated relative to one another without disrupting the first electrically conductive pathway or the second electrically conductive pathway.

The concentric electrical connector assembly 1400 can be utilized in place of the concentric terminals 3,7 shown throughout the other drawings, such as to provide power to the lamp module group 100. For example and without limitation, the concentric terminals 3,7 of the present aspect of the concentric electrical connector assembly 1400 can be integrated with the shaft 6 of the first housing 4 (the shaft 6 of the first housing 4 shown in FIG. 1) and the second housing 29 (shown in FIG. 5). In such aspects, when the second housing 29 is threadedly engaged with the shaft 6 of the first housing 4, an electrical connection can be made between the concentric terminals 3,7 of the present aspect of the concentric electrical connector assembly 1400 to provide power to the lamp module group 100. The concentric electrical connector assembly 1400 can be compatible with any of the various aspects of electrical module groups of the present disclosure, including both the lamp module group 100 and the speaker module group 3100.

Figure 15:
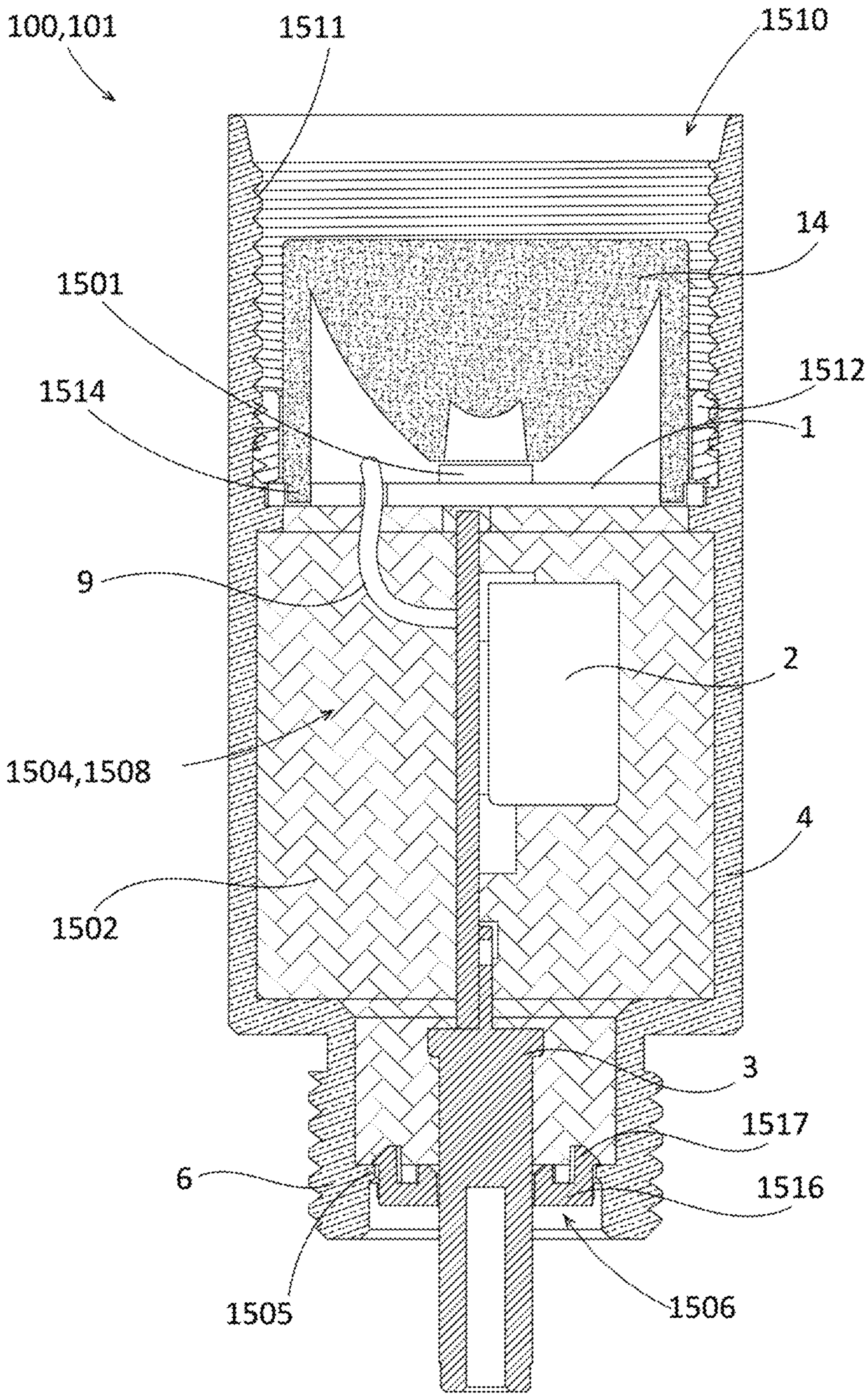
FIG. 15 is a cross-sectional schematic diagram of another aspect of the lamp module in accordance with another aspect of the present disclosure.
Figure 16:
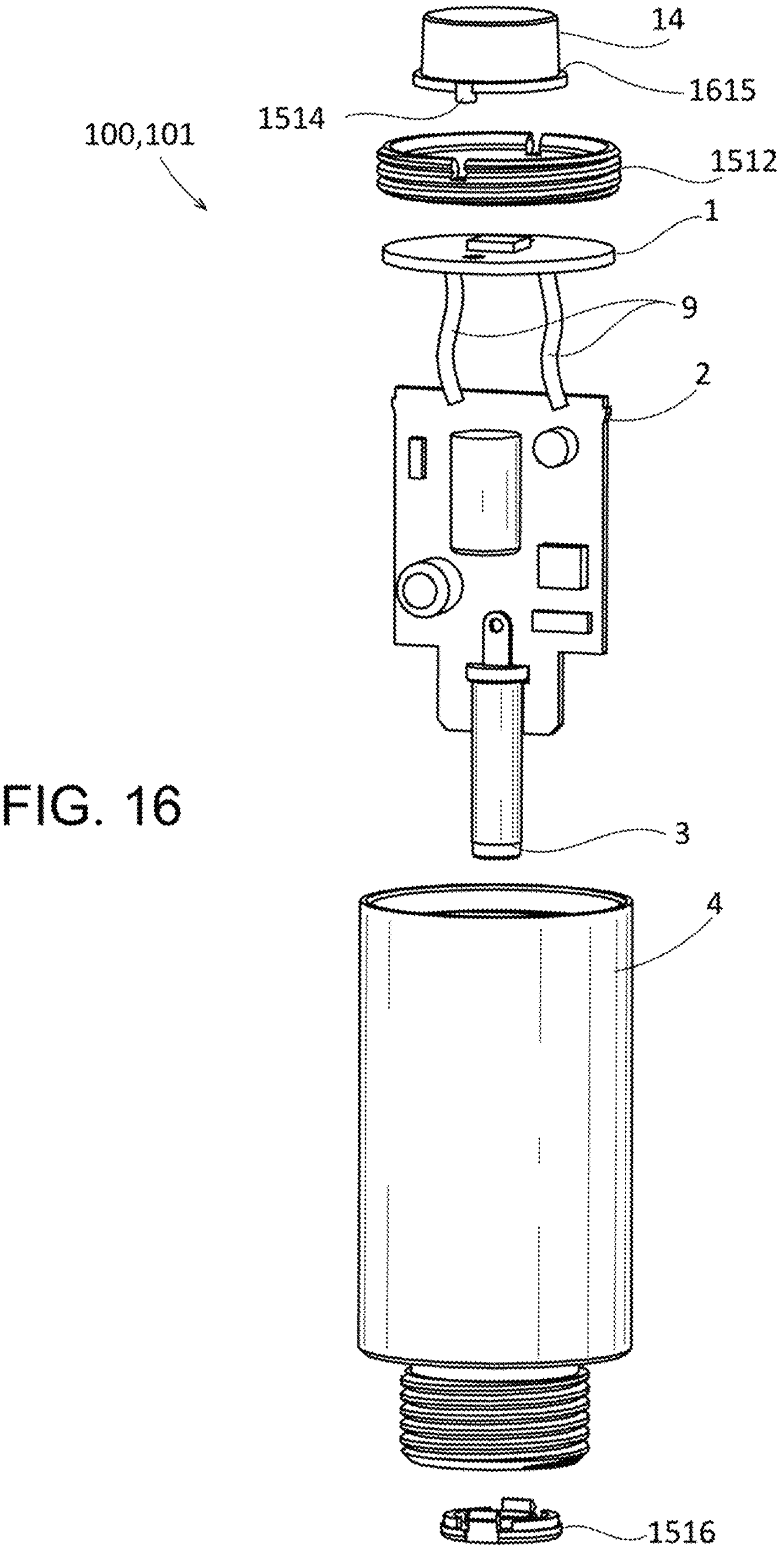
FIG. 16 is an exploded schematic diagram of the lamp module of FIG. 15.

FIG. 15 is a cross-sectional view of another aspect of the lamp module 101 of the lamp module group 100 in accordance with another aspect of the present disclosure. FIG. 16 is an exploded view of the lamp module 101 of the lamp module group 100 of FIG. 15. As shown in FIGS. 15 and 16, the lamp module group 100 can comprise the LED lamp board 1, the power supply driving module 2, the first concentric terminal 3, the first housing 4, the lens 14, a first retention insert 1512, and a second retention insert 1516. In the present aspect, the LED lamp board 1 can be connected in electrical communication with the power supply driving module 2 by wires 9. The first concentric terminal 3 can be directly mounted to the power supply driving module 2, as shown, or connected by wires (not shown). The lens 14 can define at least one indexing post 1514, which can be received by the LED lamp board 1 to positively index and position the lens 14 relative to the LED lamp board 1.

The first housing 4 can define a housing cavity 1504. The housing cavity 1504 can comprise a lower bore 1506 extending through the shaft 6, a main compartment 1508, and an upper bore 1510. The terms "upper" and "lower" are used with respect to the present viewing orientation and should not be viewed as limiting; for example and without limitation, the lamp module 101 can be used in any orientation. The inner rib 5 can extend radially inward into the housing cavity 1504 between the upper bore 1510 and the main compartment 1508. The upper bore 1510 can define internal threading 1511. The LED lamp board 1 can be supported within the upper bore 1510 atop the inner rib 5. The first retention insert 1512 can be a threaded insert, which can threadedly engage the internal threading 1511. The first retention insert 1512 can be screwed into the upper bore 1510 to secure the LED lamp board 1 to the inner rib 5. In some aspects, the first retention insert 1512 can engage with a lens flange 1615 (shown in FIG. 16) of the lens 14 to secure the lens 14 to the LED lamp board 1. In some aspects, the lens 14, itself, and/or the lens 14 and first retention insert 1512 can form a seal around an LED 1501 and the wire 9, such as to protect them from exposure to moisture, dust, or other elements. In some aspect, the seal can be formed with a glue, caulk, epoxy, or other suitable material. The lamp module 101 can be waterproof. For example, in the present aspect, the lamp module 101 can be IP68 rated, or better, under IEC standard 60529.

The shaft 6 can define a shaft inner rib 1505 extending into the lower bore 1506. The second retention insert 1516 can comprise one or more hooks 1517. The hooks 1517 can be sized to snap over the shaft inner rib 1505, thereby retaining the second retention insert 1516 within the lower bore 1506. The second retention insert 1516 can engage with the first concentric terminal 3 to secure the first concentric terminal 3 within the shaft 6. In some aspects, the second retention insert 1516 can also provide a seal within the lower bore 1506, which can prevent, water, dust, dirt, or other elements from reaching the main compartment 1508 through the lower bore 1506. In the present aspect, the main compartment 1508 can be filled with a potting, glue, or other filler 1502. Potting can be used to protect the power supply driving module 2 from exposure to moisture, and to electrically isolate the electronics from the first housing 4. Certain glues can be used for the same purpose, as well as to shunt heat away from the LED lamp board 1 and the power supply driving module 2 to the first housing 4. Such glues can comprise additives configured to enhance thermal conductivity. The first housing 4 can comprise a thermally conductive material, such as a metal for example and without limitation. The first housing 4 can act as a heat sink and aid in dissipation of heat, which can lower the operating temperatures of the lamp module group 100 and extend the service life of the electronics therein.

Figure 17:
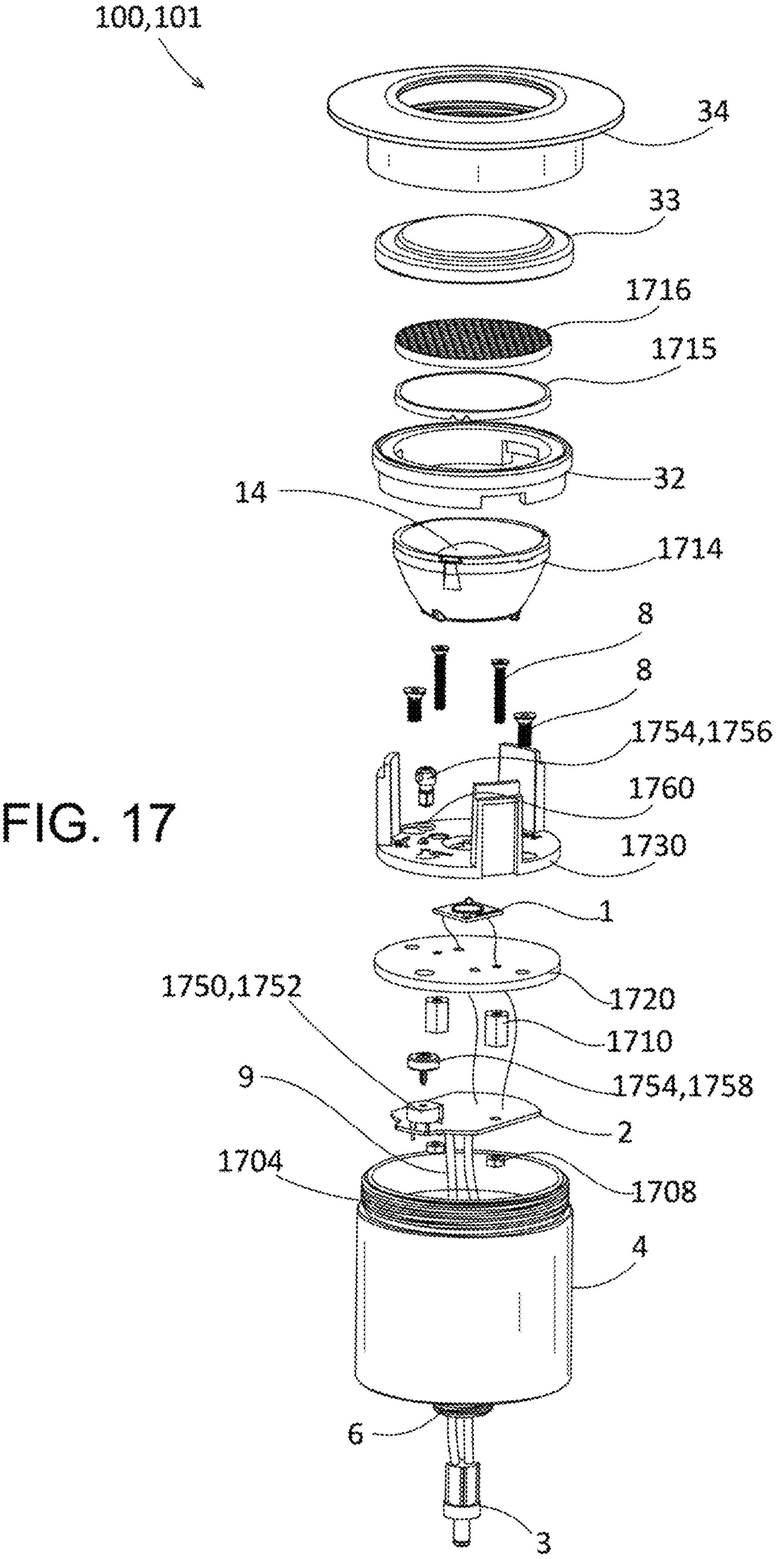
FIG. 17 is an exploded schematic diagram of another aspect of the lamp module in accordance with another aspect of the present disclosure.
Figure 18:
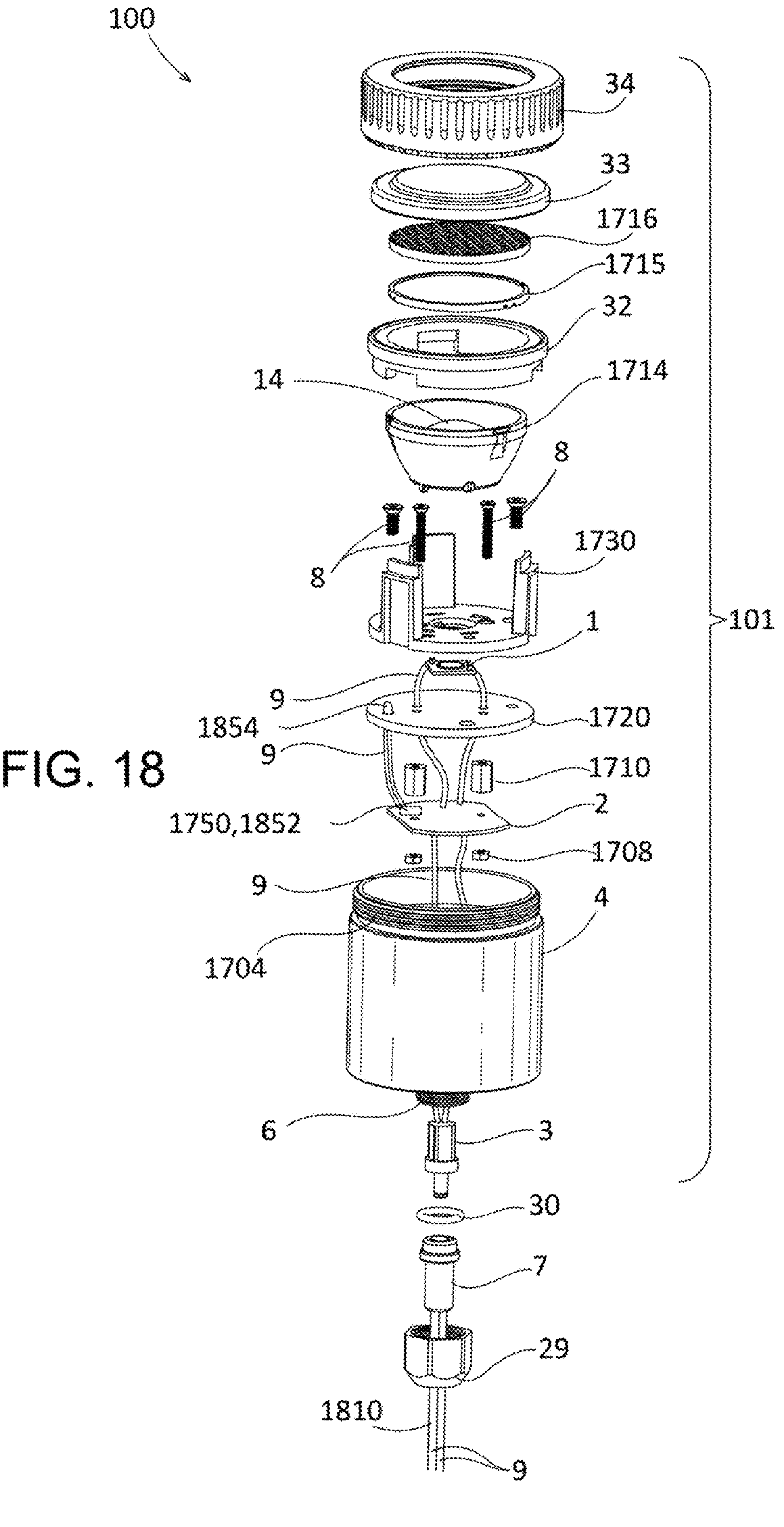
FIG. 18 is an exploded schematic diagram of another aspect of the lamp module and a power cable in accordance with another aspect of the present disclosure.
Figure 19:
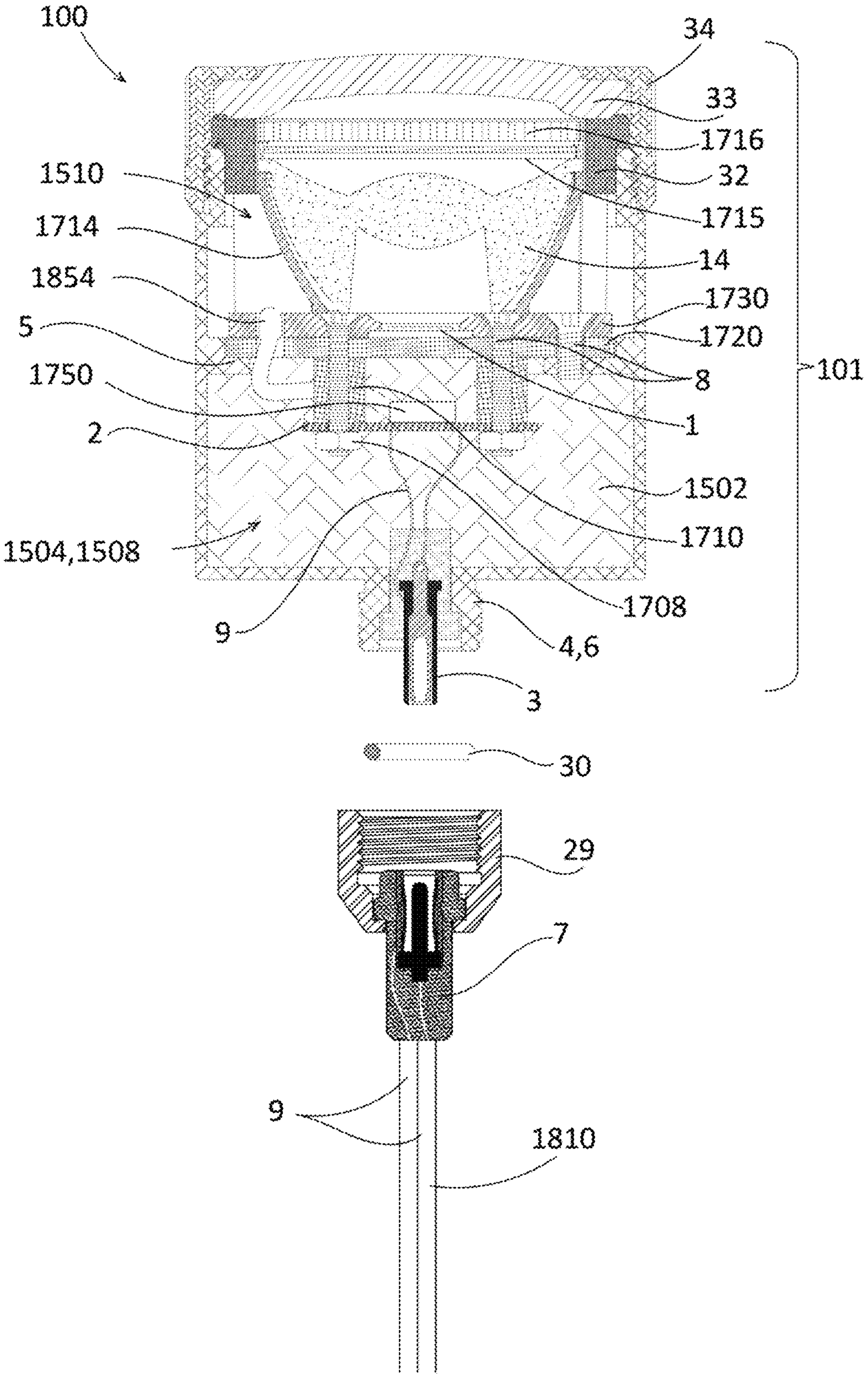
FIG. 19 is a cross-sectional schematic diagram of the lamp module and the power cable of FIG. 18.

FIGS. 17 and 18 show another aspect of the lamp module 101 of the lamp module group 100 in accordance with another aspect of the present disclosure, wherein the lamp module 101 shown in FIG. 17 can be manually dimmable, and wherein the lamp module 101 shown in FIG. 18 can be electronically dimmable. FIG. 19 is a cross-sectional view of the lamp module group 100 of FIG. 18.

As FIGS. 17-19 demonstrate, the lamp module group 100 can comprise the LED lamp board 1, the power supply driving module 2, the first concentric terminal 3, and the first housing 4. In some aspects, the lamp module group 100 can further comprise one or more fasteners 8, wires 9, and one or more lenses 14. Particularly, the lamp module group 100 of the present aspect can utilize interchangeable lenses 14, which can be interchanged, or swapped out, from the lamp module group 100 to change a beam spread angle for the lamp module group 100, as described in greater detail below with respect to FIG. 20. The lens 14 is shown in a lens holder 1714. As also discussed below in greater detail with respect to FIG. 20, the lens holder 1714 can engage with a mounting bracket 1730 of the lamp module group 100 to secure the lens 14 in place. The gasket 32 can be positioned atop the mounting bracket 1730, and the sealing lens 33 can be placed over the gasket 32. The first housing 4 can define housing threads 1704 at an outer end opposite from the shaft 6. The cover 34 can be screwed onto the housing threads 1704, which can compress the gasket 32 between the sealing lens 33, the mounting bracket 1730, and the first housing 4, thereby forming a seal therebetween. With the cover 34, the sealing lens 33, and the gasket 32 mounted to the first housing 4, the lamp module group 101 of the present aspect can be waterproof, such as being IP68 rated, or better, under IEC standard 60529.

The lamp module group 100 can be modular, and various accessories and different aspects of the disclosed components can be utilized to configure the lamp module group 100 for different intended uses. For example and without limitation, different aspects of the cover 34 are disclosed between FIGS. 17 and 18, which can be used or adapted for use with the lamp module group 100 of the present aspect, or other aspects of the lamp module group 100 disclosed herein. In some aspects, the cover 34 can be configured to alter qualities of the light emitted from the lamp module group 100. For example and without limitation, the cover 34 can be configured to direct, scatter, dim, diffuse, or otherwise alter light emitted from the lamp module group 100.

The lamp module group 100 can also optionally comprise various accessories configured to alter qualities of the light emitted from the lamp module group 100. For example, one or more accessory lenses 1715 can be placed between the lens 14 and the sealing lens 33. The lens holder 1714 can be configured to support the accessory lens 1715, and tightening the cover 34 to the first housing 4 can secure the accessory lens 1715 in place. A variety of accessory lenses 1715 are contemplated, which can, for example and without limitation, alter the color and/or intensity of the light. For example, in some aspects, the accessory lens 1715 can comprise a frosted translucent material configured to dim the light emitted by the lamp module group 100. In some aspects, the accessory lens 1715 can be colored or otherwise tinted to change the color of the light emitted. In some aspects, the accessory lens 1715 can be configured to both dim the light and change its color. In some aspects, multiple accessory lenses 1715 can be utilized together to provide multiple effects. In some aspects, the sealing lens 33 can be configured to alter the light emitted from the lamp module group 100, such as to tint, dim, or scatter the light for example and without limitation.

In some aspects, a diffuser 1716 can be positioned between the lens 14 and the sealing lens 33. The diffuser 1716 can be configured to scatter light emitted from the lamp module group 100. The diffuser 1716 can be omitted or utilized alone or in conjunction with one or more accessory lenses 1715.

In the present aspect, the lamp module group 100 can further comprise a mounting plate 1720. The LED lamp board 1 can be mounted to the mounting plate 1720 (LED lamp board 1 shown mounted to the mounting plate 1720 in FIG. 19). The mounting bracket 1730 can fit over the LED lamp board 1 so that the LED lamp board 1 is at least partially positioned between, or sandwiched between, the mounting bracket 1730 and the mounting plate 1720. In some aspects, some of the fasteners 8 can extend through the mounting plate 1720 and the mounting bracket 1730 and thread into the first housing 4 to secure the mounting bracket 1730 to the mounting plate 1720. In some aspects, these fasteners can be screws or bolts. Some of the fasteners 8 can cooperate with one or more nuts 1708 and one or more standoffs 1710 to secure together the LED lamp board 1, the mounting plate 1720, the LED lamp board 1, and the mounting bracket 1730. In some aspects, these fasteners 8 can extend through the standoffs 1710 and threadedly engage with the nuts 1708. In such aspects, the standoffs 1710 can or may not threadedly engage with the fasteners 8. In some aspects, these fasteners 8 can threadedly engage with the standoffs 1710. In some aspects, the standoffs 1710 can define a male threaded portion that can threadedly engage with the nuts 1708.

The standoffs 1710 can be positioned between the mounting plate 1720 and the power supply driving module 2, and when secured together, the power supply driving module 2 can be spaced apart from the mounting plate 1720. Spacing the power supply driving module 2 apart from the mounting plate 1720, and the LED lamp board 1 attached thereto, can protect the power supply driving module 2 from heat generated by the LED lamp board 1. In some aspects, the mounting plate 1720 can comprise a thermally conductive material, such as a metal for example and without limitation, which can conduct heat generated by the LED lamp board 1 to the first housing 4. The first housing 4 can act as a heat sink and aid in the dissipation of heat generated by the LED lamp board 1. In some aspects, the mounting plate 1720 can comprise a plastic material. In such aspects, the plastic can have a plastic flammability rating under Underwriters Laboratories standard UL 94, such as HB, V-2, V-1, V-0, 5VB, or 5VA, for example and without limitation.

As shown in FIGS. 18 and 19, the second concentric terminal 7 can be comprised by a power cable 1810, which can comprise two or more separate wires 9 coupled together to form the power cable 1810. The second concentric terminal 7 can be connected in electrical communication with the wires 9 of the cable 1810. The second housing 29 can fit over the power cable 1810. The second housing 29 can be at least partially shaped as a hexagonal nut, which can be threadedly engaged with the shaft 6 to secure the power cable 1810 to the first housing 4, thereby forming an electrical connection between the first concentric terminal 3 and the second concentric terminal 7. The sealing ring 30 can be placed between the first housing 4 and the second housing 29. Tightening the second housing 29 onto the shaft 6 can compress and energize the sealing ring 30, thereby forming a seal between the first housing 4 and the second housing 29. The seal can be a waterproof seal that can prevent water, as well as dust, dirt, and other elements, from entering the first housing 4 through the shaft 6. The first concentric terminal 3 can be electrically connected to the power supply driving module 2 by wires 9, which in turn can be electrically connect to the LED lamp board 1 by other wires 9 (shown in FIG. 18).

The lamp module groups 100 of the aspects of FIGS. 17 and 18 can be dimmable. In each aspect, the power supply driving module 2 can comprise a dimmer 1750, which can comprise one or more electrical components. The dimmer 1750 can be adjusted to vary the light output of the LED lamp board 1, such as to cause the LED lamp board 1 to emit more or less light.

The aspect of FIG. 17 can be manually dimmable, and the dimmer 1750 can be a manual dimmer 1752, such as a potentiometer, rheostat, switch and resistor bank, digital potentiometer, integrated circuit chip, or other suitable component or combination of components. In the present aspect, the manual dimmer 1752 can comprise a control 1754. In the present aspect, the control 1754 can be a two-piece control 1754 with an upper control 1756 and a lower control 1758. In the present aspect, the lower control 1758 can extend between the power supply driving module 2 and the mounting plate 1720. The mounting plate 1720 and mounting bracket 1730 can define an opening, and the lower control 1758 and the upper control 1756 can be engaged with one another through the opening. In some aspects, a control seal 1760 can be positioned to seal the opening. In some aspects, the control seal 1760 can be positioned between the upper control 1756 and the lower control 1758. The upper control 1756 can be positioned to be accessible by removing the cover 34 and sealing lens 33. For example and without limitation, the upper control 1756 can be positioned above the mounting plate 1720 and the mounting bracket 1730. In some aspects, the control 1754 can be accessible through the opening, such as with a screwdriver or other tool for example and without limitation. In some aspects, the control 1754 can penetrate the first housing 4.

The control 1754 can manually actuate the manual dimmer 1752. In the present aspect, the control 1754 can be rotated to adjust the manual dimmer 1752. In some aspects, the control 1754 can be a button or engage with a button of the manual dimmer 1752, such as a momentary switch for example and without limitation, and the control 1754 can be depressed to toggle through various dimming settings, such as based on the number of button presses or how long the button is depressed. In some aspects, the control 1754 can adjust through a different method, such as by sliding the control 1754 along a path.

Turning to FIGS. 18 and 19, the lamp module group 100 can be electronically dimmable, and the dimmer 1750 can be a wireless dimmer 1852, such as a digital potentiometer, an integrated circuit chip, or other suitable component or combination of components. The wireless dimmer 1852 can be electrically connected to an antenna 1854 by a wire 9. The antenna 1854 can be configured to wirelessly receive signals, such as through Bluetooth, cellular frequency, WiFi, radio, infrared, or any other suitable type of wireless communication signal. The antenna 1854 can receive these signals, which can encode commands for the wireless dimmer 1852, and the wire 9 can communicate the signals to the wireless dimmer 1852. The wireless dimmer 1852 can respond to commands encoded within the signal to vary the output of the LED lamp board 1. The antenna 1854 can be positioned above or at least partially exposed through the mounting bracket 1730. In some aspects, the antenna 1854 can penetrate the first housing 4.

As further shown in FIG. 19, the mounting plate 1720 can rest on the inner rib 5. In some aspects, one or more of the fasteners 8, such as screws for example and without limitation, can thread into the inner rib 5 to secure the mounting plate 1720 to the first housing 4. The main compartment 1508 of the housing cavity 1504 can be filled with potting, glue, or other filler 1502, and the main compartment 1508 can be waterproof. The mounting plate 1720 and the inner rib 5 can form a wall between the main compartment 1508 and the upper bore 1510 of the housing cavity 1504.

Figure 20:
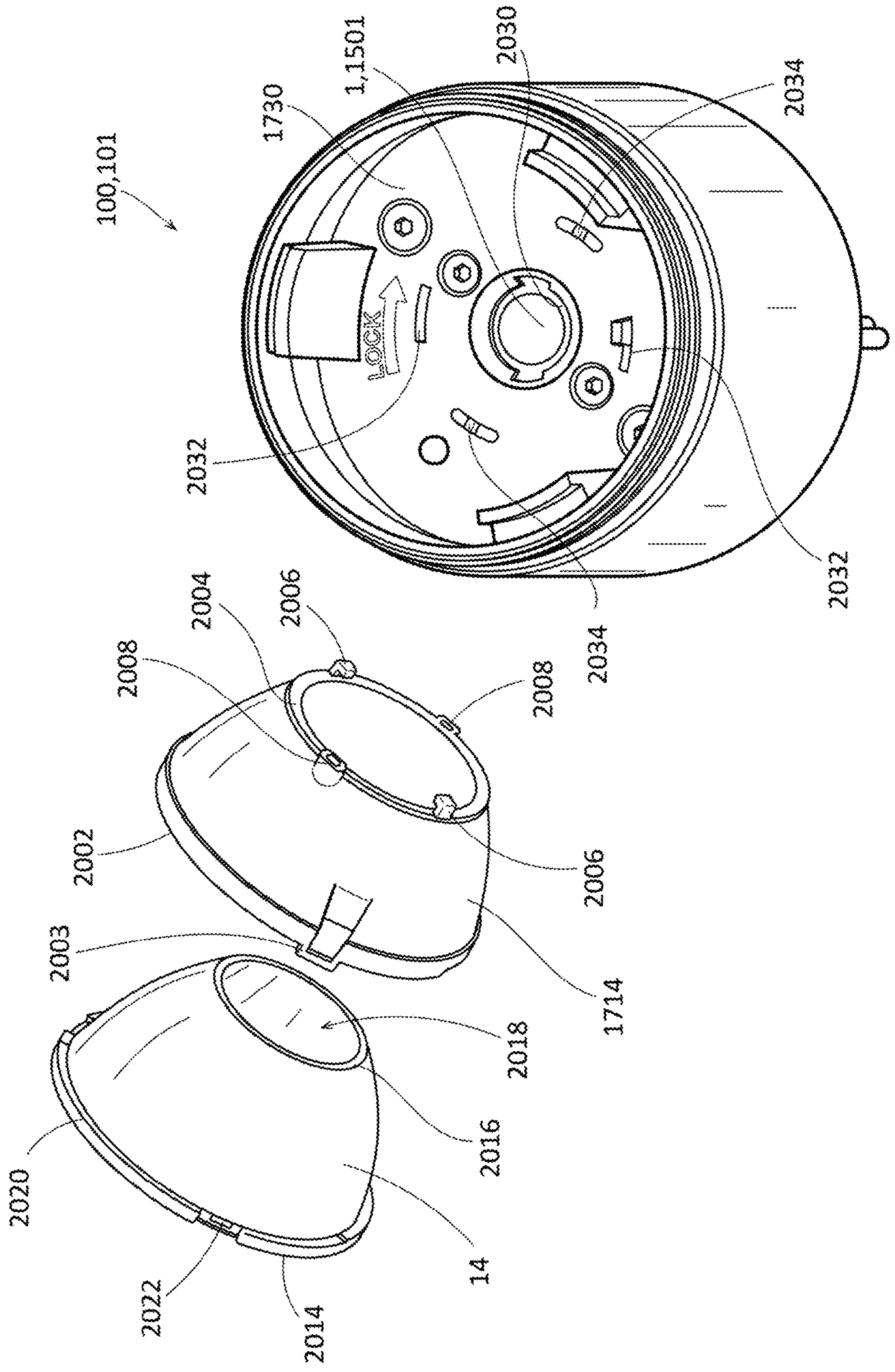
FIG. 20 is a top perspective view of the lamp module of FIG. 18 in a partially disassembled state.

As shown, the lens 14 can be mounted within the lens holder 1714. FIG. 20 is a perspective view of the lamp module group 100 of FIG. 18 in a partially disassembled state. As referenced above, the lenses 14 can be interchanged, such as to change a beam angle of the lamp module group 100. Each lens 14 can define an outer end 2014 and an inner end 2016. The inner end 2016 can define an opening 2018, which can be positioned over the LED 1501 when the lens 14 and lens holder 1714 are mounted to the mounting bracket 1730. With the opening 2018 placed over the LED 1501, the lens 14 can fully gather the light emitted by the LED 1501.

The outer end 2014 of the lens 14 can define a lens flange 2020 and one or more mounting tabs 2022. The lens holder 1714 can define an outer end 2002 and an inner end 2004. The lens holder 1714 can define one or more mounting catches 2003 at the outer end 2002. The lens flange 2020 can be sized so that the lens flange 2020 can rest on the outer end 2002 of the lens holder 1714 when the inner end 2016 of the lens 14 is inserted into the lens holder 1714 and the lens 14 is mounted to the lens holder 1714. When the lens 14 is mounted to the lens holder 1714, the mounting catch 2003 can slip over the mounting tab 2022 to secure the lens 14 to the lens holder 1714.

The LED 1501 of the LED lamp board 1 can be exposed through a center opening 2030 of the mounting bracket 1730. The mounting bracket 1730 can define a pair of locking slots 2032 and a pair of locking depressions 2034. The inner end 204 can define a pair of locking legs 2006 and a pair of locking tabs 2008. To lock the lens holder 1714 to the mounting bracket 1730, the locking legs 2006 can be inserted through the locking slots 2032, and the lens holder 1714 can be twisted relative to the mounting bracket 1730 to a locked position of the lens holder 1714. The locking slots 2032 and the locking legs 2006 can be shaped so that once the lens holder 1714 is placed in the locked position, the locking legs 2006 cannot be withdrawn through the locking slots 2032, thereby securing the lens holder 1714 to the mounting bracket 1730. In the locked position, the locking tabs 2008 of the lens holder 1714 can engage the locking depressions 2034 of the mounting bracket 1730. Engagement between the locking depressions 2034 and the locking tabs 2008 can bias the lens holder 1714 to remain in the locked position, thereby resisting rotation of the lens holder 1714 back towards an unlocked position wherein the lens holder 1714 can be removed from the mounting bracket 1730 by disengaging the locking legs 2006 from the locking slots 2032.

In practice, the lens 14 can be changed out by rotating the lens holder 1714 to the unlocked position so that the lens 14 and lens holder 1714 can be removed from the mounting bracket 1730. The mounting catches 2003 can then be disengaged from the mounting tabs 2022, such as by prying the mounting catches 2003 over the mounting tabs 2022. The lens 14 can then be removed from the lens holder 1714. A different lens 14 can then be inserted into the lens holder 1714 and secured by engaging the mounting catches 2003 with the mounting tabs 2022. The lens holder 1714, with the lens 14 mounted therein, can then be secured to the mounting bracket 1730 by inserting the locking legs 2006 back into the locking slots 2032, and then rotating the lens holder 1714 from the unlocked position to the locked position. In some aspects, the lens 14 can be mounted in the lens holder 1714 while the lens holder 1714 is secured to the mounting bracket 1730.

Figure 21C:
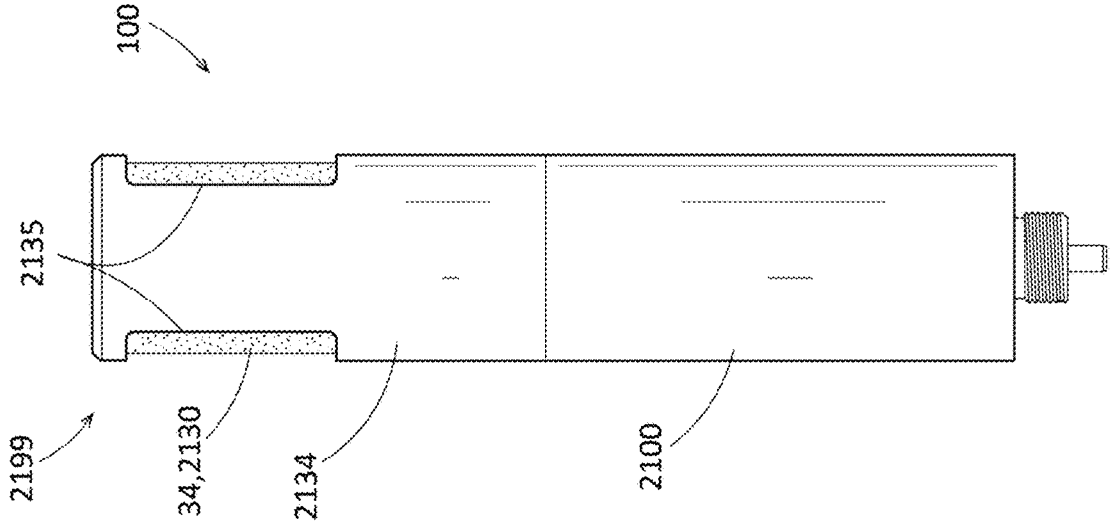
FIG. 21C is a schematic view of the bollard of FIG. 21B with a shroud in accordance with another aspect of the present disclosure.
Figure 21B:
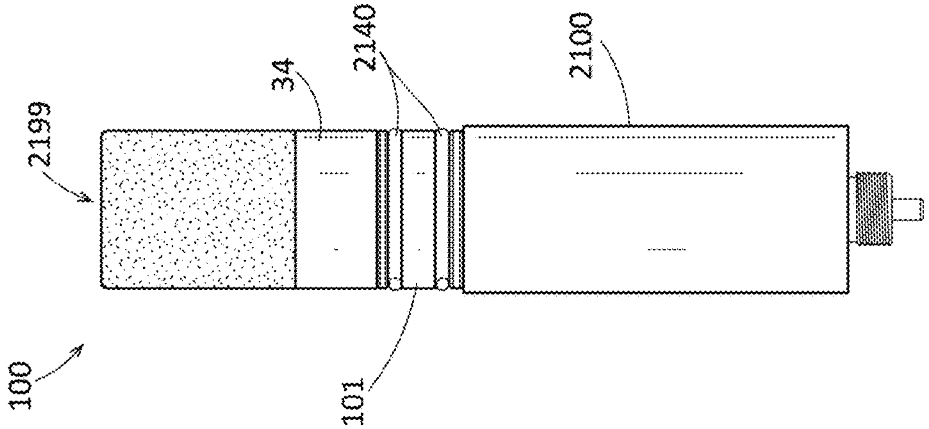
FIG. 21B is a schematic diagram of the cover, the lamp module, and the bollard post of FIG. 21A, shown configured as a bollard in accordance with another aspect of the present disclosure.
Figure 21A:
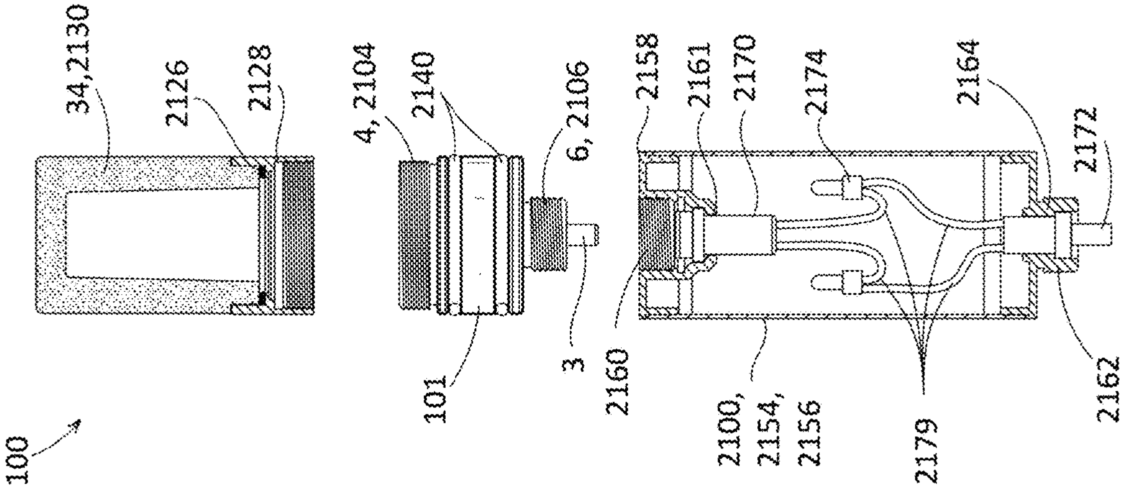
FIG. 21A is a cross-sectional schematic diagram of the lamp module of FIG. 1, another aspect of the cover, and a bollard post, shown in an exploded configuration, in accordance with another aspect of the present disclosure.
Figure 22A:
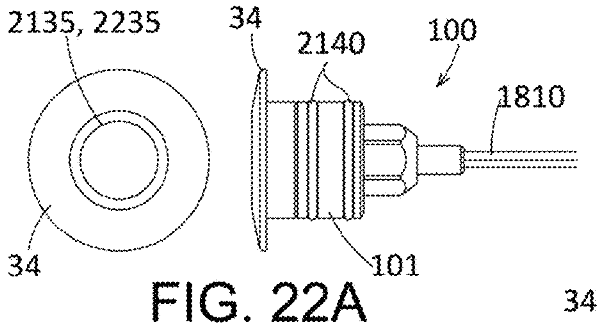
FIG. 22A is a top view and a side view of the lamp module group comprising the lamp module of FIG. 1 and another aspect of a cover in accordance with another aspect of the present disclosure.
Figure 22F:
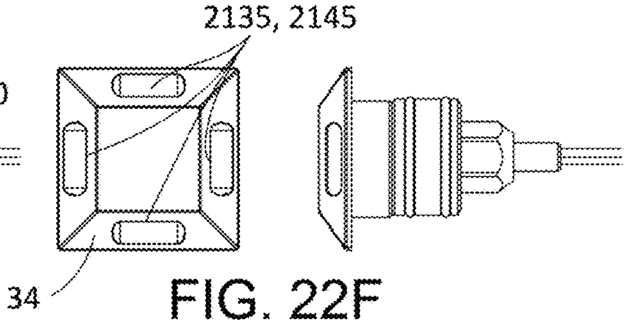
FIG. 22F is a top view and a side view of the lamp module group comprising the lamp module of FIG. 1 and another aspect of a cover in accordance with another aspect of the present disclosure.
Figure 22B:
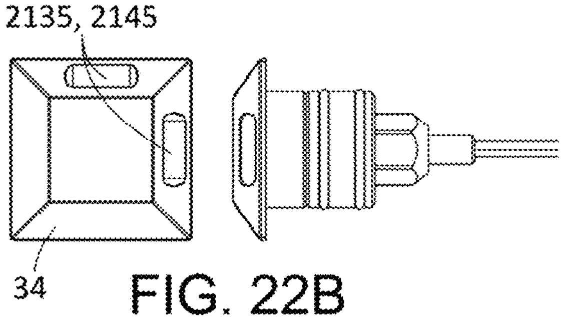
FIG. 22B is a top view and a side view of the lamp module group comprising the lamp module of FIG. 1 and another aspect of a cover in accordance with another aspect of the present disclosure.
Figure 22G:
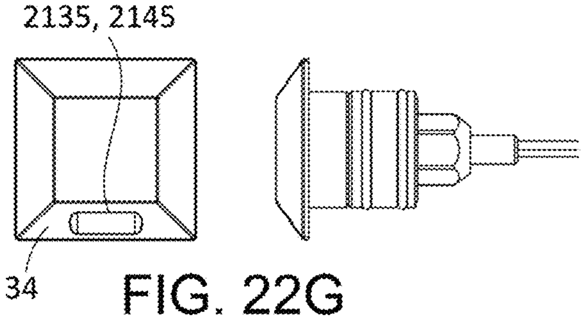
FIG. 22G is a top view and a side view of the lamp module group comprising the lamp module of FIG. 1 and another aspect of a cover in accordance with another aspect of the present disclosure.
Figure 22C:
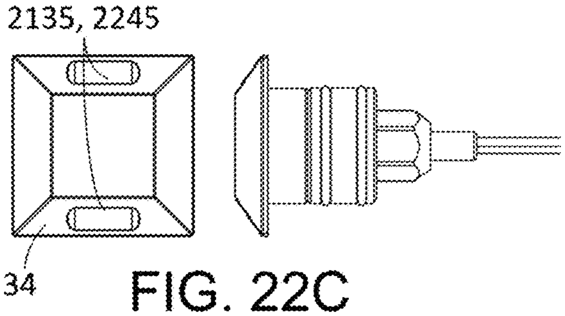
FIG. 22C is a top view and a side view of the lamp module group comprising the lamp module of FIG. 1 and another aspect of a cover in accordance with another aspect of the present disclosure.
Figure 22H:
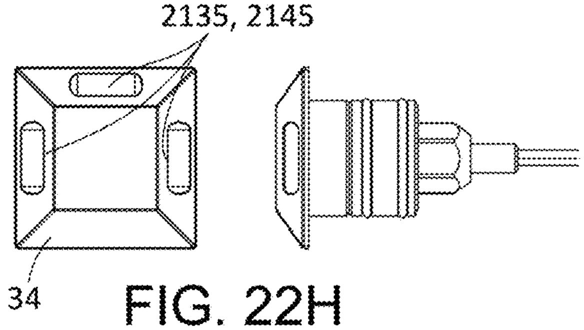
FIG. 22H is a top view and a side view of the lamp module group comprising the lamp module of FIG. 1 and another aspect of a cover in accordance with another aspect of the present disclosure.
Figure 22D:
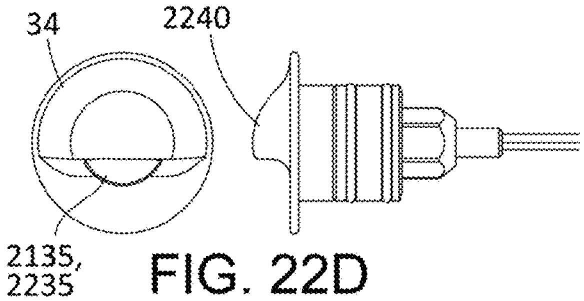
FIG. 22D is a top view and a side view of the lamp module group comprising the lamp module of FIG. 1 and another aspect of a cover in accordance with another aspect of the present disclosure.
Figure 22I:
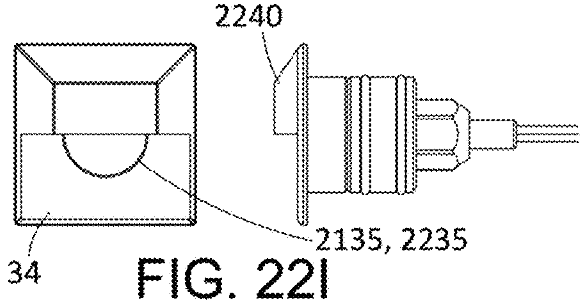
FIG. 22I is a top view and a side view of the lamp module group comprising the lamp module of FIG. 1 and another aspect of a cover in accordance with another aspect of the present disclosure.
Figure 22E:
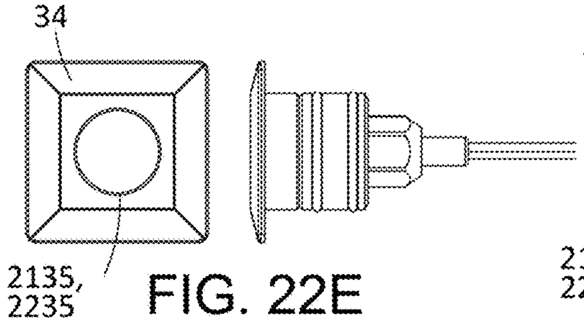
FIG. 22E is a top view and a side view of the lamp module group comprising the lamp module of FIG. 1 and another aspect of a cover in accordance with another aspect of the present disclosure.
Figure 22J:
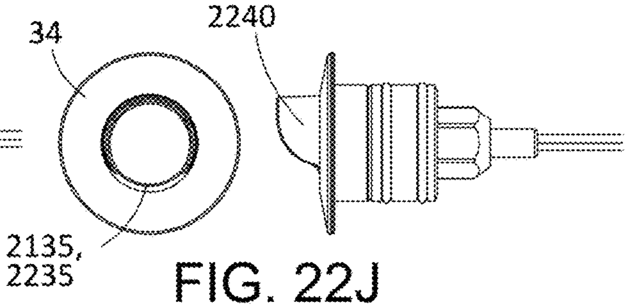
FIG. 22J is a top view and a side view of the lamp module group comprising the lamp module of FIG. 1 and another aspect of a cover in accordance with another aspect of the present disclosure.

FIGS. 21A-C demonstrate another configuration of the lamp module group 100 of FIG. 1, which can further comprise a bollard post 2100, another aspect of the cover 34, and a shroud 2134 in accordance with further aspects of the present disclosure.

As shown in FIG. 21A, the lamp module group 100 can comprise one or more O-rings 2140 extending circumferentially around the first housing 4 of the lamp module 101. The first housing 4 can define housing threading 2104 opposite from the shaft 6. The shaft 6 can define shaft threading 2106.

The bollard post 2100 can comprise an accessory housing 2154. The accessory housing 2154 can comprise a main tube 2156, a top threaded insert 2158 defining a threaded bore 2160, and a bottom threaded insert 2162 defining an accessory shaft 2164. The terms "top" and "bottom" are used with respect to the present viewing angle and should not be viewed as limiting; for example and without limitation, the bollard post 2100 can be utilized in any orientation. The bollard post 2100 can comprise a first concentric accessory terminal 2170 and a second concentric accessory terminal 2172. The first concentric accessory terminal 2170 can be received by the threaded bore 2160 of the top threaded insert 2158 to form a power receptacle 2161. The first concentric accessory terminal 2170 can be connected in electrical communication with the second concentric accessory terminal 2172 by a plurality of accessory wires 2179, which in turn can be connected together by electrical connectors 2174, such as wire nuts for example and without limitation. The first concentric accessory terminal 2170 can be secured within the threaded bore 2160. The first concentric accessory terminal 2170 can be a female concentric terminal. The shaft 6 can be screwed into the threaded bore 2160 to electrically connect the first concentric terminal 3 with the first concentric accessory terminal 2170. The second concentric accessory terminal 2172 can be secured within the accessory shaft 2164. The second concentric accessory terminal 2172 can be a male concentric terminal.

The accessory shaft 2164 and the second concentric accessory terminal 2172 can be coupled to a power cable 1810 or a fixed power outlet (not shown) to transmit power through the bollard post 2100 to the lamp module 101. In some aspects, one or more bollard posts 2100 can be coupled to a base comprising a wall cord (not shown), such as to form a lamp. For example, a single bollard post 2100 could be utilized for a desk lamp or other application wherein a shorter height might be desired. Multiple bollard posts 2100 can be coupled together for applications wherein a taller lamp might be desired, such as for a floor lamp. In some aspects, the bollard posts 2100 can define a shape other than being straight. For example and without limitation, the main tube 2156 can be curved to form an elbow, such as a 90-degree or 45-degree elbow for example and without limitation. In some aspects, the main tube 2156 can branch or otherwise diverge, and the bollard post 2100 can be configured to couple to multiple lamp modules 101. For example and without limitation, the main tube can define a tee-shape or wye-shape with separate lamp modules 101 connected to two of the ends.

In the aspect shown, the cover 34 can comprise a base 2128 and a translucent element 2130. In the aspect shown, the translucent element 2130 can be screwed, or threaded, into the base 2128, and a cover gasket 2126 can be positioned between the base 2128 and the translucent element 2130 to form a seal therebetween. The base 2128 can be configured to threadedly engage the housing threads 2104 to mount the cover 34 to the lamp module 101. In the present aspect, the translucent element 2130 can comprise a frosted glass column configured to dim and diffuse light emitted from the lamp module 101.

FIG. 21B shows the cover 34, the lamp module 101, and the bollard post 2100 screwed together to assume the configuration of a bollard 2199 for the lamp module group 100. With the cover 34 and the bollard post 2100 secured to the lamp module 101, the O-rings 2140 can remain exposed. The O-rings 2140 can be configured to frictionally engage and retain another accessory, such as the shroud 2134.

FIG. 21C shows the bollard 2199 with the shroud 2134 installed. The shroud 2134 can slide over the cover 34 and the lamp module 101 (shown in FIG. 21B) to contact the bollard post 2100, thereby fully concealing the lamp module 101. The O-rings 2140 (shown in FIG. 21B) can frictionally retain the shroud 2134 on the lamp module 101. The shroud 2134 can be configured to reduce or direct light emitting through the translucent element 2130 of the cover 34. The shroud 2134 can be opaque, and the shroud 2134 can define one or more openings 2135 through which light from the translucent element 2130 can pass. The positioning of the openings 2135 can direct light from the bollard 2199, and the size of the openings 2135 can control the amount of light emitting therefrom. In some aspects, the openings 2135 may also have a complex shape, such as a grid pattern (not shown), which can diffuse and/or dim the light emitted through the shroud 2134.

FIGS. 22A-J demonstrate various aspects of the cover 34 of the lamp module group 100 for use with the lamp module 101. The aspects of the cover 34 that are shown can be configured for use as flush-mount lighting applications, such as path lights for example and without limitation. As shown in each of FIGS. 22A-J, but only labelled in FIG. 22A for clarity, the covers 34 can be mounted to the lamp module 101 of the lamp module group 100, and the lamp module 101 can be coupled to a power source, such as the power cable 1810, for example and without limitation. In some applications, the lamp module 101 and the power cable 1810 can be buried or otherwise set into a ground surface, such as concrete for example and without limitation, where only the cover 34 is exposed. In some applications, the lamp module group 100 can be set into a hole, such as in a countertop, cabinet, shelving display, or other structure, and the O-rings 2140 can frictionally retain the lamp module group 100 in the hole with only the cover 34 exposed.

The covers 34 can be configured to direct light in various directions via one or more openings 2135. The covers 34 of FIGS. 22A, 22D, 22E, 22I, and 22J can each define a top opening 2235. The top openings 2235 can direct light at least partially upwards from the covers 34. The covers 34 of FIGS. 22D, 22I, and 22J can each comprise a lip 2240 that can redirect or otherwise limit the angle of light emitted from the openings 2135. The covers 34 of FIGS. 22B, 22C, 22F, 22G, and 22H can each define one or more side openings 2245, which can direct light in various directions from the respective covers 34. The covers 34 can define various shapes, such as circular and square as shown, or other suitable shapes, such as oval, various polygonal shapes, or other irregular shapes.

FIGS. 23A-D show various aspects of the lamp module group 100 in accordance with additional aspects of the present disclosure wherein the lamp module group 100 is configured as a pendant light. In each of the aspects shown, the lamp module group 100 can comprise the cover 34, the gasket 32, the lamp module 101, sealing ring 30, the power cable 1810, and the second housing 29. The covers 34 of FIGS. 23A,B can be open on the end opposite from the first housing 4, whereas the covers 34 of FIGS. 23C,D can be closed on the end opposite from the first housing 4. The lamp module groups 100 of FIGS. 23A,B can comprise the sealing lens 33 to cooperate with the gasket 32 and the covers 34 to seal the first housing 4 of the light module 101. As demonstrated by the cover 34 in FIG. 23A, the cover 34 can define an inner rib 2333, which can engage with the sealing lens 33 so that when the cover 34 is tightened onto the first housing 4, the gasket 32 can be compressed between the sealing lens 33 and the first housing 4, thereby forming a seal. For the aspects of the lamp module groups 100 of FIGS. 23C,D, the gasket 32 can be compressed between the cover 34 and the first housing 4 to form a seal.

Figure 23A:
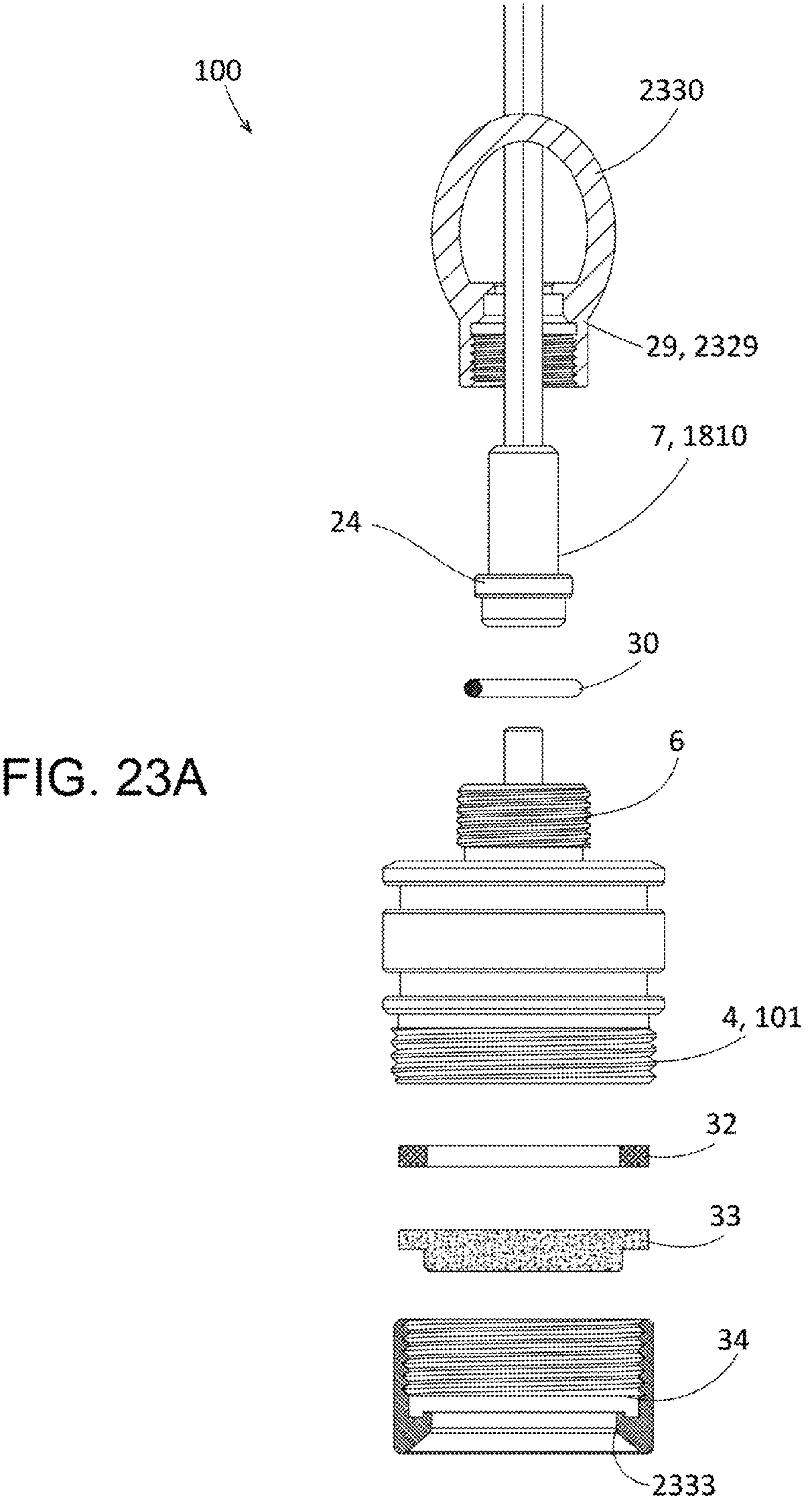
FIG. 23A is a schematic diagram of another aspect of the lamp module group configured as a pendant light and shown in an exploded state.
Figure 23B:
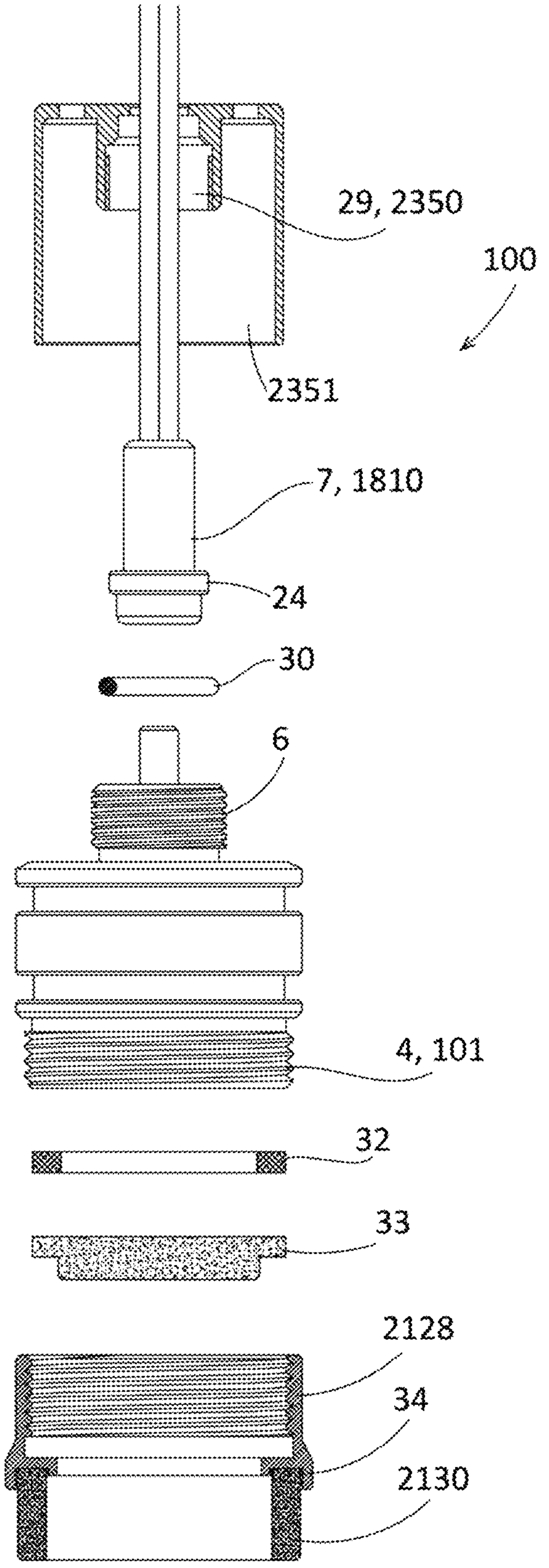
FIG. 23B is a schematic diagram of another aspect of the lamp module group configured as a pendant light and shown in an exploded state.

In the aspects shown, the second housing 29 can be a hanging housing, such as a looped hanging housing 2329 (shown in FIGS. 23A,C,D) or a sleeved hanging housing 2350 (shown in FIG. 23B). Each of the hanging housings 2329,2350 can receive the power cable 1810 and engage with the second concentric terminal 7 of the power cable 1810. Specifically, each hanging housing 2329,2350 can engage with the first limiting boss 24 of the second concentric terminal 7 so that the power cable 1810 cannot be withdrawn through the hanging housing 2329,2350. The looped hanging housing 2329 can define a loop 2330, which the power cable 1810 can extend through. In some aspects, the loop 2330 can provide stress relief for the power cable 1810, such as to reduce the load on the second concentric terminal 7 from the weight of the lamp module 101.

The hanging housings 2329,2350 can threadedly engage with the shaft 6 of the first housing 4, with the sealing ring 30 positioned therebetween. Compression of the sealing ring 30 when the hanging housings 2329,2350 are tightened to the shaft 6 can create a seal between the hanging housings 2329,2350 and the shaft 6 of the first housing 4. The sleeved hanging housing 2350 (shown in FIG. 23B) can comprise an extended sleeve 2351, which can fit down over the first housing 4 when the sleeved hanging housing 2350 is screwed onto the shaft 6.

Figure 23C:
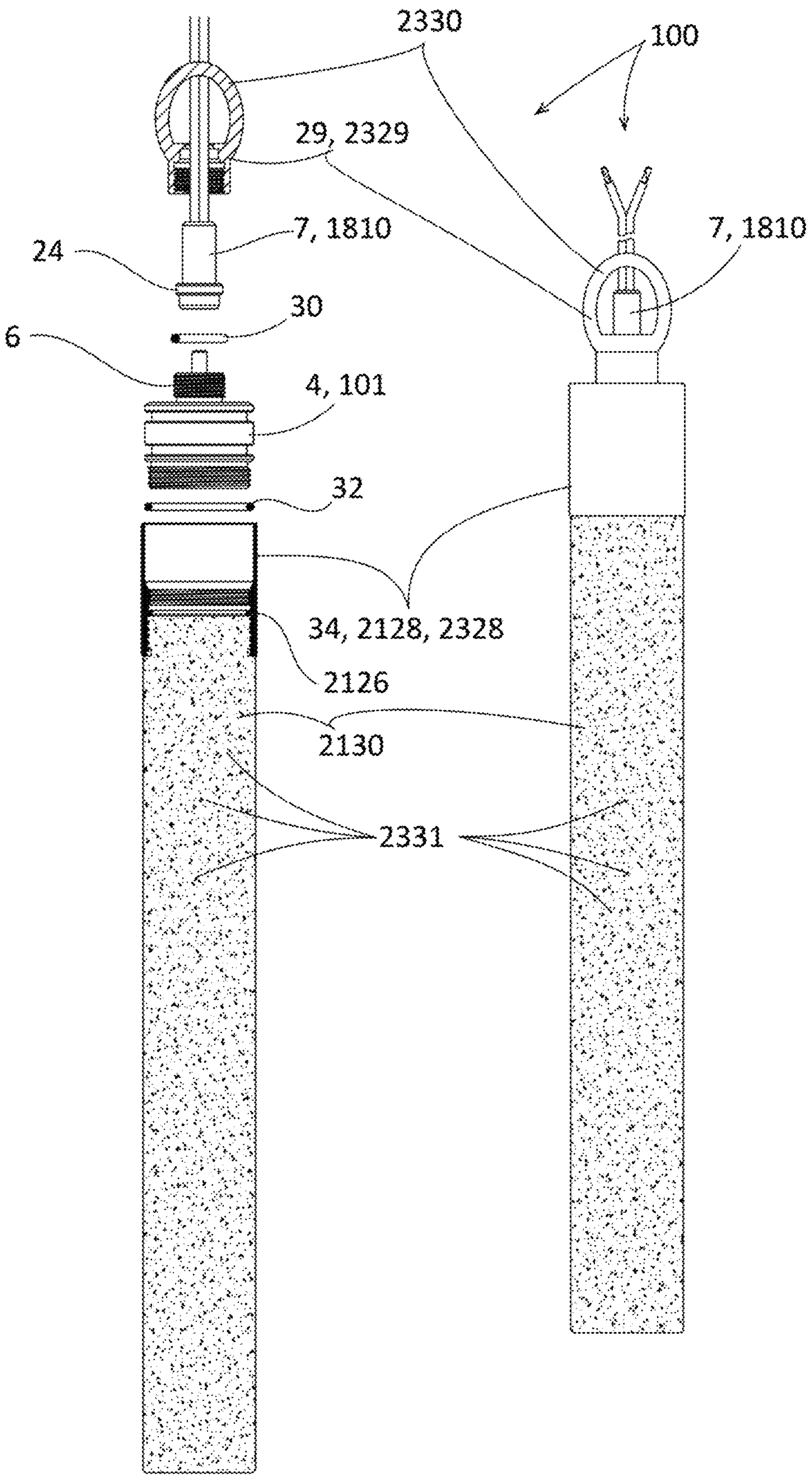
FIG. 23C is a schematic diagram of another aspect of the lamp module group configured as a pendant light and shown in both an exploded state and an assembled state.
Figure 23D:
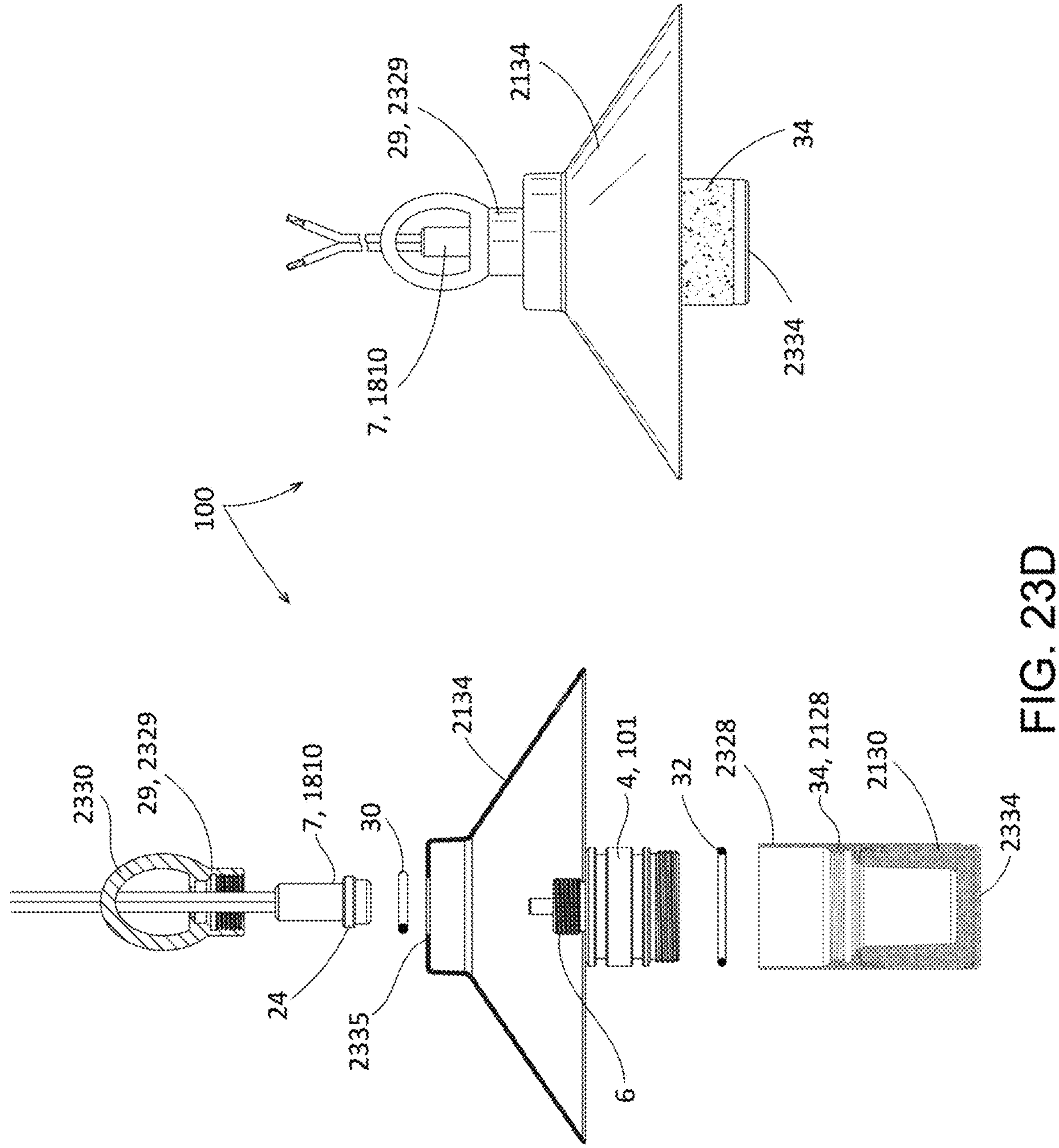
FIG. 23D is a schematic diagram of another aspect of the lamp module group configured as a pendant light and shown in both an exploded state and an assembled state.

As shown in FIG. 23D, in some aspects, the lamp module group 100 can further comprise another aspect of the shroud 2134, which can be a top shroud. In the aspect shown, rather than fitting over the cover 34, the shroud 2134 can fit over the lamp module 101. Specifically, the shroud 2134 can define a top opening 2335, which can fit over the shaft 6 of the first housing 4. When the second housing 29 is threaded onto the shaft 6, the shroud 2134 can be captured between the first housing 4 and the second housing 29. As shown in the assembled configuration on the right, the shroud 2134 can extend downwards over the first housing 4 and at least a portion of the cover 34.

Continuing with FIG. 23D, the cover 34 can comprise the base 2128 and the translucent element 2130. The translucent element 2130 can be a hollow glass cylinder. In the aspect shown, the translucent element 2130 can be configured to dim and/or diffuse light passing through it. For example, the translucent element 2130 can comprise a frosted material, such as frosted glass or plastic. In the present aspect, the cover 34 can further comprise an end cap 2334 on the translucent element 2130 opposite from the base 2128. In some aspects, the end cap 2334 can be configured to alter an aspect of the light, such as to tint or dim the light directed directly downwards through the translucent element 2130. In some aspects, the end cap 2334 can be reflective, and light traveling downwards through the translucent element 2130 can be reflected upwards towards the shroud 2134, where it can then be reflected back downwards again to diffuse the light and provide a softer effect to the light that is cast downwards from the lamp module group 100. In the aspect shown, the base 2128 can be a sleeved base with an extended sleeve 2328 (also shown in FIG. 23C), which can be configured to slide over the first housing 4 when the cover 34 is threaded onto the first housing 4, as demonstrated in the assembled configuration of the lamp module group 100 on the right side of FIG. 23C.

Remaining on FIG. 23C, in some aspects, the cover 34 can comprise a cover gasket 2126 positioned between the base 2128 and the translucent element 2130. The translucent element 2130 can thread into the base 2128, and the cover gasket 2126 can be compressed and form a seal between the translucent element 2130 and the base 2128. In the aspect shown, the translucent element 2130 can be a solid rod, such as a rod formed from, glass or a polymer. In some aspects, the translucent element 2130 can be clear and uniform. In some aspects, additives or imperfections 2331 can be distributed through the translucent element 2130 for visual effect. For example and without limitation, the additives or imperfections 2331 can be foreign materials, such as glitter, reflective or colored particles, or discrete objects, or voids, such as entrapped bubbles, intentionally induced cracks, or other interstices in the material. As an example of a discrete object, a symbolic or written logo, trademark, mascot, or other likeness can be cast into the translucent element 2130.

FIGS. 24A-D show various aspects of the lamp module group 100 in accordance with additional aspects of the present disclosure wherein the lamp module group 100 is configured as a spotlight. The aspect of FIG. 24D can be similar to the aspect of FIG. 7; however, the aspects of the lamp module group 100 of FIG. 24D can omit the assemblies and components disclosed in the aspects of FIGS. 8-13, such as the fan and water cooling system for example and without limitation.

Figure 24B:
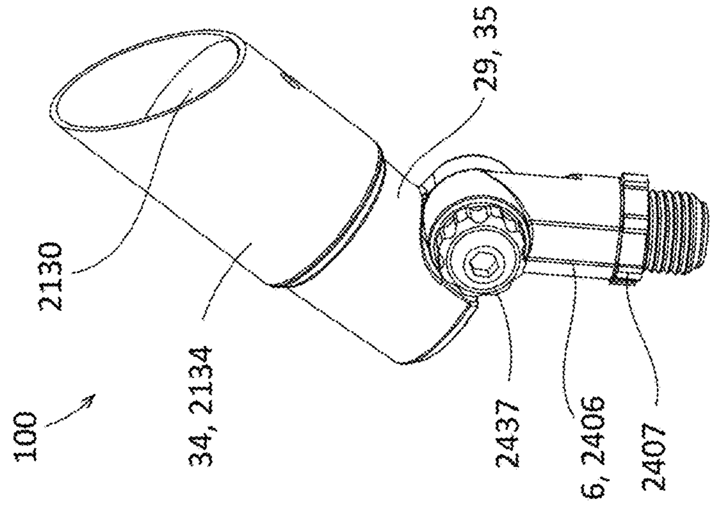
FIG. 24B is a perspective view of the lamp module group of FIG. 24A, shown in an assembled state.
Figure 24A:
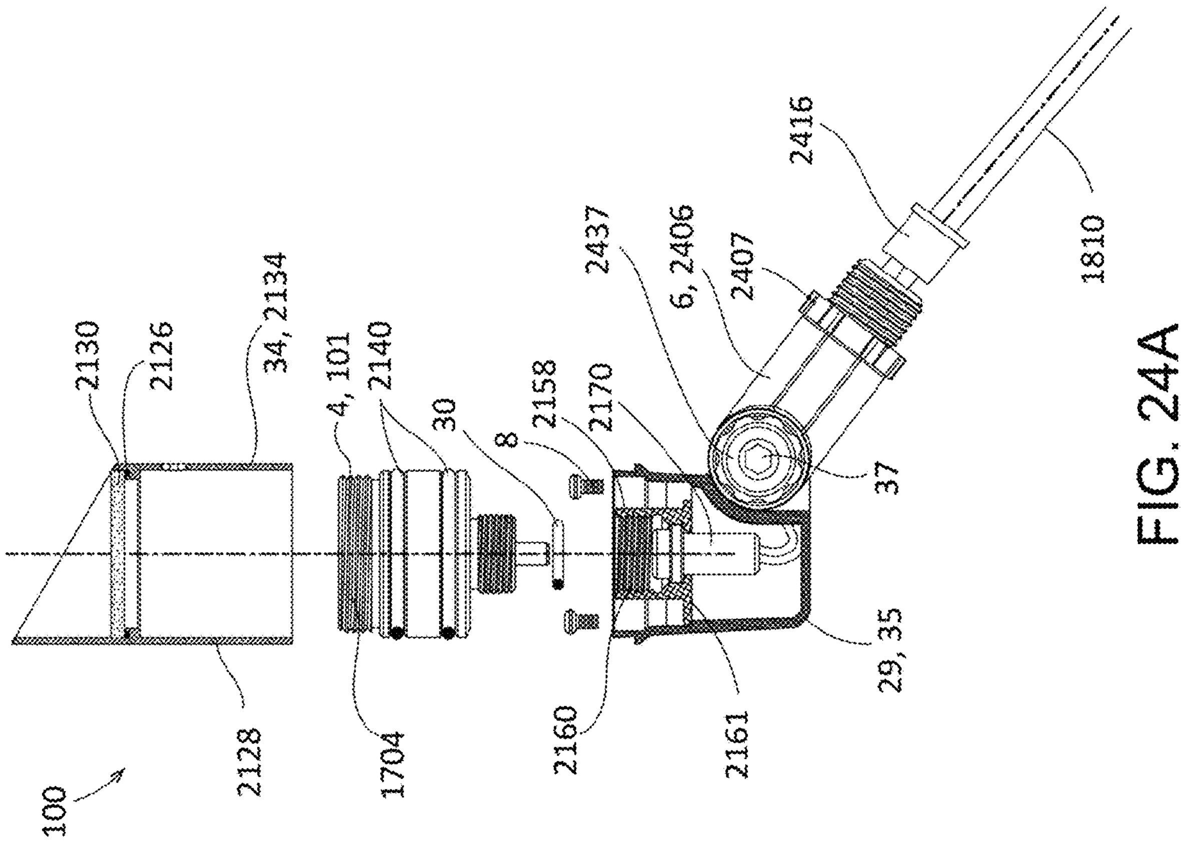
FIG. 24A is an exploded cross-sectional view of another aspect of the lamp module group configured as a spotlight in accordance with another aspect of the present disclosure.
Figure 24C:
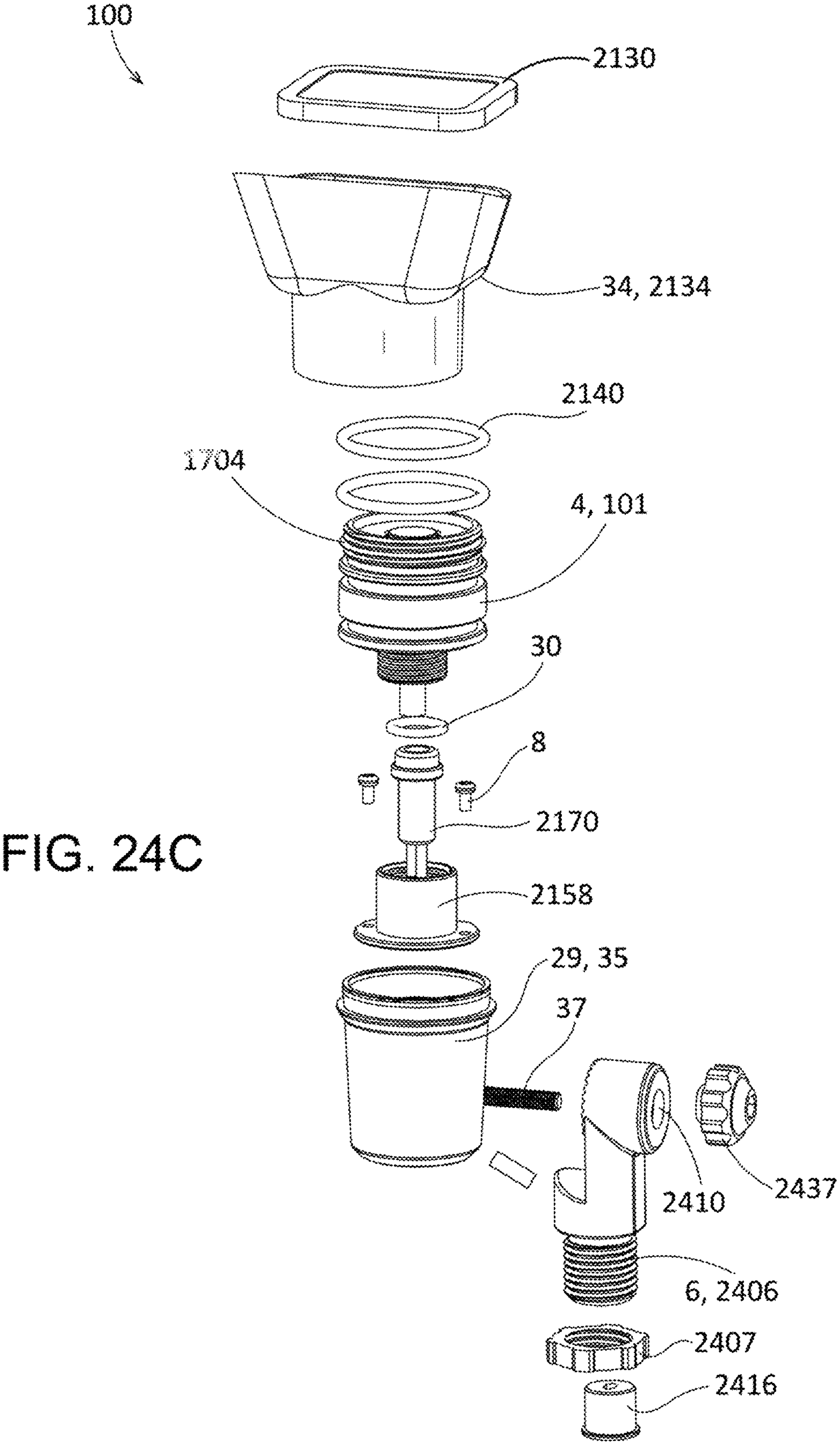
FIG. 24C is an exploded view of another aspect of the lamp module group configured as a spotlight in accordance with another aspect of the present disclosure.

The lamp module groups 100 of FIGS. 24A-C can be substantially the same, except that FIG. 24C discloses a different aspect of the cover 34, or shroud 2134, than that of FIGS. 24A,B. The cover 34, or shroud 2134, can be substantially cylindrical in the aspects of FIGS. 24A,B. The cover 34, or shroud 2134, can be substantially rectangular and offer a wider emitting angle for the lamp module group 100 compared to the cylindrical aspect. In the aspects shown in FIGS. 24A-C, the structure can be utilized as the cover 34. As shown in FIGS. 24A,B, the translucent element 2130 can be round. As shown in FIG. 24C, the translucent element 2130 can be rectangular. As shown in FIGS. 24A,C, the cover 34 can slip over the first housing 4 of the lamp module 101. Rather than being threaded on, the cover 34 can frictionally engage the O-rings 2140 to secure the cover 34 to the first housing 4 of the lamp module 101. Because the housing threads 1704 are not engaged, in some aspects, a separate cover (not shown) can be threaded onto the housing threads 1704, and the disclosed structure can act as a shroud 2134 positioned over the cover 34. As shown in FIG. 24A, the cover 34, or shroud 2134, can comprise the base 2128, the translucent element 2130, and the cover gasket 2126 therebetween.

Turning to FIGS. 24A,C, the second housing 29 can be the lamp holder 35. The lamp holder 35 can receive the top threaded insert 2158, which can in turn receive the first concentric accessory terminal 2170 in the threaded bore 2160 to form the power receptacle 2161 (the threaded bore 2160 and the power receptacle 2161 shown in FIG. 24A). The top threaded insert 2158 can be secured to the lamp holder 35 by the fasteners 8. The lamp module 101 can be screwed into the power receptacle 2161 to electrically connect the lamp module 101 to the first concentric accessory terminal 2170 and the power cable 1810 (shown in FIG. 24A) connected thereto. The power cable 1810 can extend through the lamp holder 35 and the shaft 6 connected thereto. The power cable 1810 can extend through a cable insert 2416, and the cable insert 2416 can be inserted into the shaft 6 where the power cable 1810 exits the shaft 6. The cable insert 2416 can provide a seal and prevent abrasion to the power cable 1810 from rubbing against the shaft 6.

The shaft 6 can be a tiltable shaft 2406, which can be adjusted for angle relative to the lamp holder 35. As shown in FIG. 24C, the tiltable shaft 2406 can define a fixing hole 2410, which can receive the fixing rod 37. A fixing nut 2437 can be threaded onto the fixing rod 37. The fixing nut 2437 can be loosened to allow the tiltable shaft 2406 to tilt, or pivot, relative to the lamp holder 35. The fixing nut 2437 can be tightened to fix the tiltable shaft 2406 relative to the lamp holder 35.

Figure 24D:
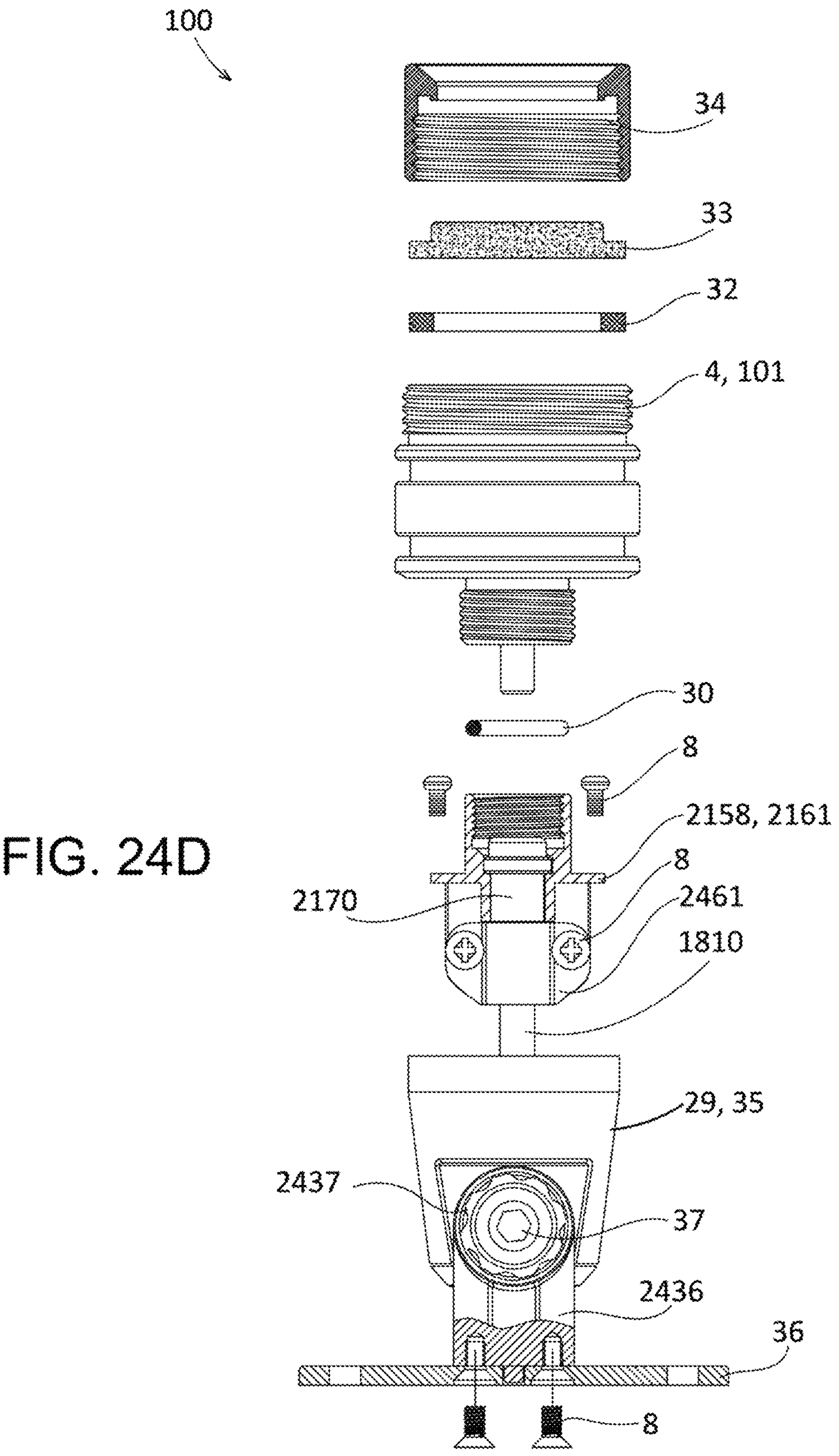
FIG. 24D is an exploded cross-sectional view of another aspect of the lamp module group configured as a spotlight in accordance with another aspect of the present disclosure.

Turning to FIG. 24D, the lamp module group 100 can comprise the cover 34, the sealing lens 33, the gasket 32, the lamp module 101, the sealing ring 30, fasteners 8, the top threaded insert 2158, the first concentric accessory terminal 2170, the power cable 1810, the lamp holder 35, the fixing rod 37, the fixing nut 2437, and the base 36. The power receptacle 2161 can comprise the top threaded insert 2158 and the first concentric accessory terminal 2170, and in the present aspect, the power receptacle 2161 can further comprise a receptacle clamp 2461. The receptacle clamp 2461 can couple the first concentric accessory terminal 2170 to the top threaded insert 2158, such as by engaging the first concentric accessory terminal 2170 or the power cable 1810 attached thereto. The receptacle clamp 2461 can be fastened to the top threaded insert 2158 by fasteners 8, and tightening the fasteners 8 with the first concentric accessory terminal 2170 or the power cable 1810 positioned between the receptacle clamp 2461 and the top threaded insert 2158 can directly or indirectly secure the first concentric accessory terminal 2170 to the top threaded insert 2158.

When assembled, additional fasteners 8 can secure the power receptacle 2161 within the second housing 29, or lamp holder 35. The first housing 4 of the lamp module 101 can be screwed into the power receptacle 2161 to electrically connect the lamp module 101 with the power cable 1810, thereby providing power to the lamp module 101.

In the aspect shown, the lamp module group 100 can comprise one or more arms 2436, which can be coupled to the base 36, such as with fasteners 8 for example and without limitation. The arm or arms 2436 can engage with the fixing rod 37 and the fixing nut 2437 to support the lamp holder 35. The lamp holder 35 can be tiltable relative to the arm or arms 2436 and the base 36, such as be loosening the fixing nut 2437 relative to the fixing rod 37. The fixing nut 2437 can be tightened on the fixing rod 37 to secure the lamp holder 35 relative to the arm or arms 2436 and the base 36.

Figure 25:
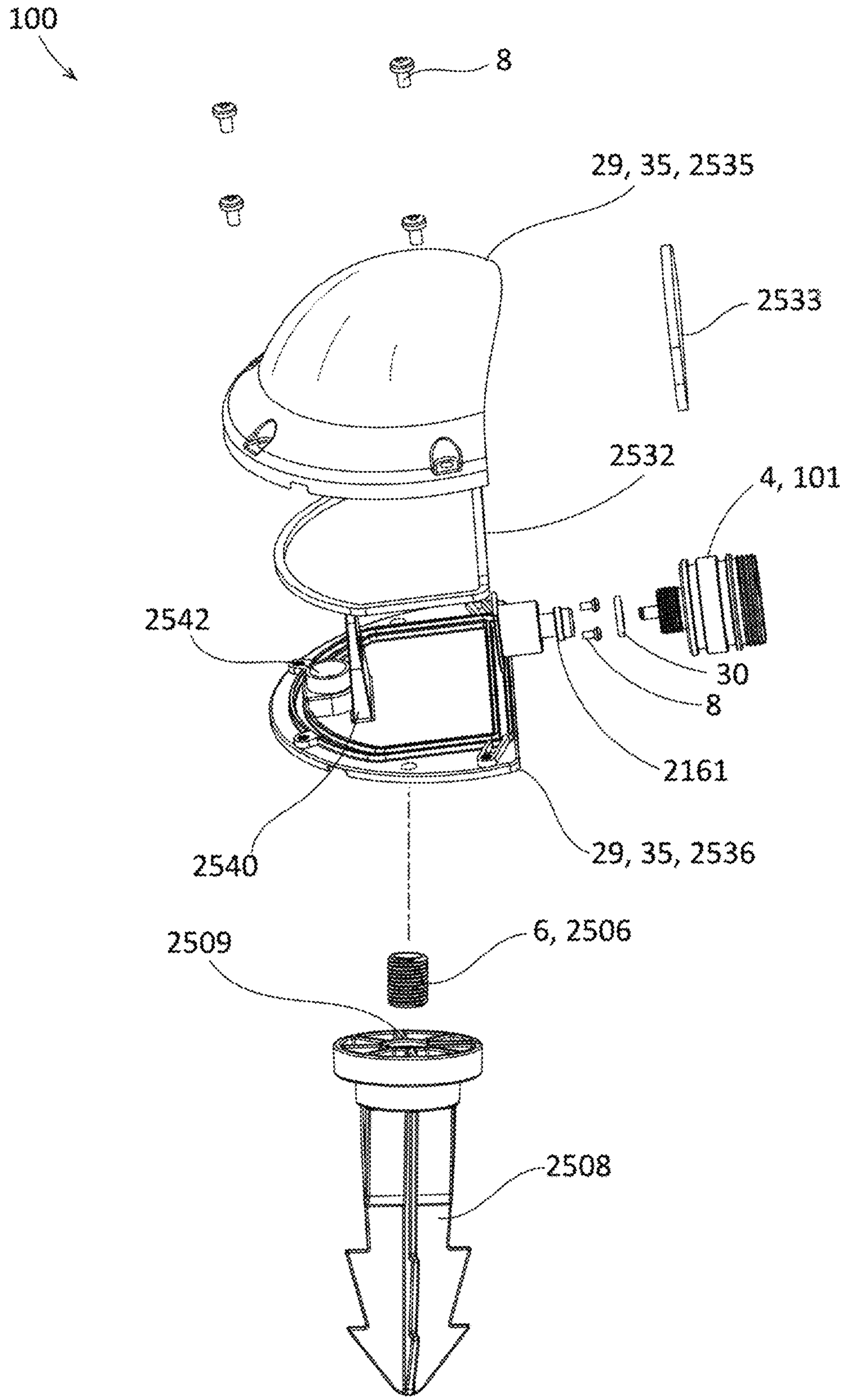
FIG. 25 is an exploded view of another aspect of the lamp module group comprising a two-piece lamp holder and a stake in accordance with another aspect of the present disclosure.

FIG. 25 shows another aspect of the lamp module group 100 configured for landscaping use. The second housing 29 can be a two-piece version of the lamp holder 35. In the present aspect, the lamp holder 35 can have a clam-shell design comprising a top shell 2535 and a bottom shell 2536. The lamp holder 35 can comprise a sealing lens 2533, a gasket 2532, and one or more fasteners 8. The lamp holder 35 can define a receptacle mount 2540 and a shaft mount 2542. In the present aspect, the receptacle mount 2540 and the shaft mount 2542 can be defined by the bottom shell 2536; however, in other aspects, one or both of the receptacle mount 2540 and the shaft mount 2542 can be defined by a different portion of the lamp holder 35, such as the top shell 2535, for example and without limitation.

When assembled, the power receptacle 2161 can be coupled to the receptacle mount 2540 by fasteners 8. The first housing 4 of the lamp module 101 can be screwed into the power receptacle 2161. The gasket 2532, which can extend around a perimeter of the lamp holder 35, can be placed between the shells 2535,2536, and the sealing lens 2533 can be placed between the shells 2535,2536 at an opening (not shown) of the lamp holder 35. The shells 2535,2536 can then be coupled together with the fasteners 8, thereby sealing the lamp module 101 inside the lamp holder 35.

The shaft mount 2542 can be configured to receive the shaft 6. In the present aspect, the shaft 6 can be a threaded stub-shaft 2506, and the shaft 6 can be threaded into the shaft mount 2542. A power cable (not shown), can extend through the shaft 6 and the shaft mount 2542 to the power receptacle 2161, thereby providing power to the attached lamp module 101.

In the present aspect, the lamp module group 100 can further comprise a stake 2508, which can be configured to stab into a ground surface, such as the earth. The stake 2508 can also define a threaded opening 2509, which can receive a portion of the shaft 6 to couple the lamp holder 35 atop the stake 2508. With the stake 2508 stabbed into the ground surface, the lamp holder 35 can be supported above the ground surface, such as in a garden or landscape setting, for example and without limitation. In some aspects, the lamp module group 100 of FIG. 25 can be utilized as a path light, such as to light an outdoor walkway, for example and without limitation.

Figure 26:
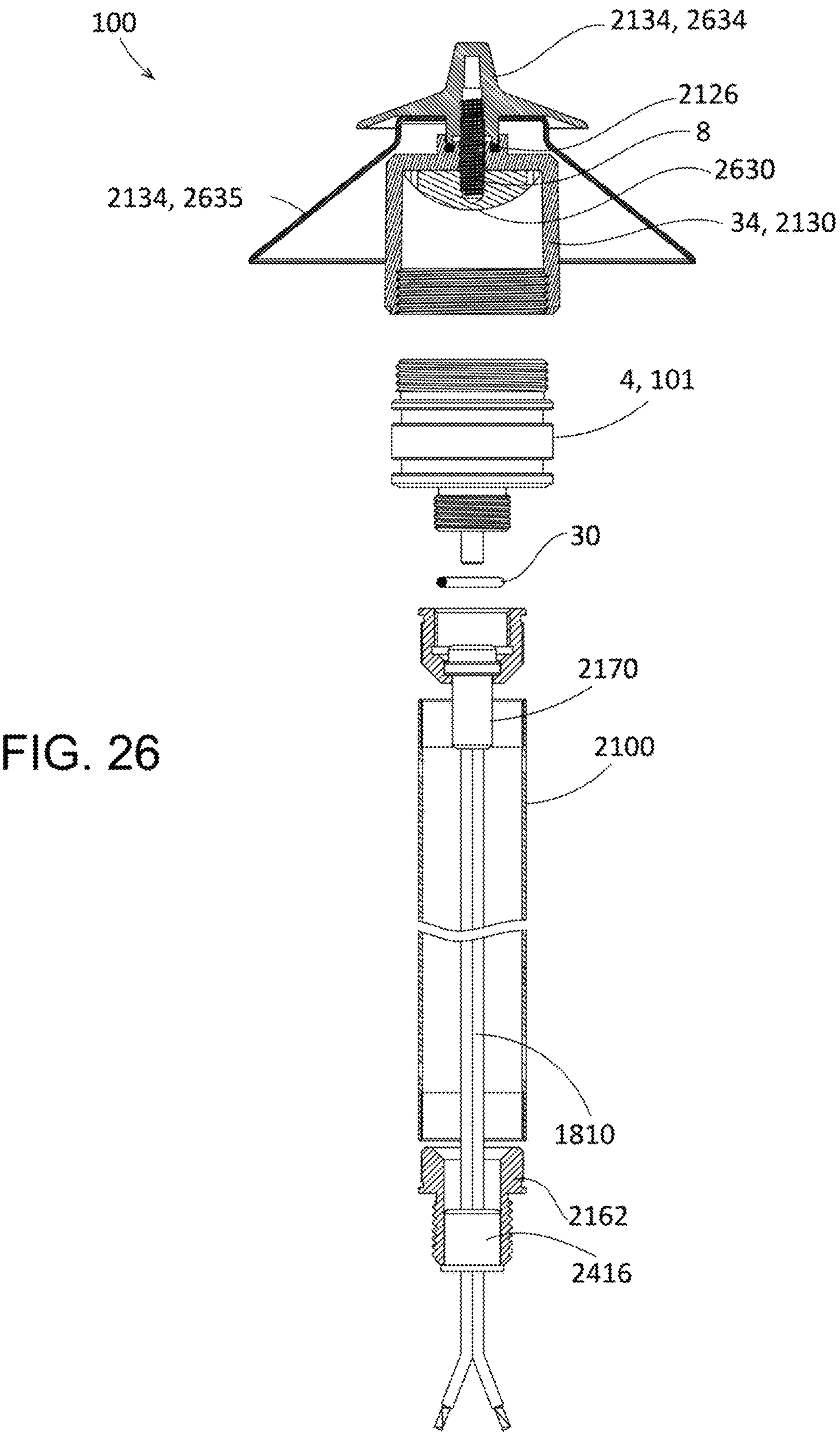
FIG. 26 is an exploded view of another aspect of the lamp module group comprising another aspect of a shroud and another aspect of the bollard post in accordance with another aspect of the present disclosure.

FIG. 26 shows another aspect of the lamp module group 100, which is configured as a path light. The lamp module group 100 can comprise another aspect of the bollard post 2100. Rather than comprising the second concentric accessory terminal 2172 (shown in FIG. 21A), the bollard post 2100 can be configured for use with the power cable 1810, which can extend through the bollard post 2100. The bottom threaded insert 2162 can be configured to receive the power cable 1810, and the cable insert 2416 can be inserted between the power cable 1810 and the bottom threaded insert 2162 to provide a seal and prevent abrasion of the power cable 1810 where the power cable 1810 extends outwards from the bottom threaded insert 2162. In some aspects, the lamp module group 100 of the present aspect can further comprise the stake 2508 (shown in FIG. 25), and the threaded opening 2509 can receive the bottom threaded insert 2162. In other aspects, the bottom threaded insert 2162 can be threaded into a junction box, a base, or other structure to support the lamp module group 100.

In the aspect shown, the cover 34 can omit the base 2128 (shown in FIG. 21A), and the translucent element 2130 can couple directly to the first housing 4 of the lamp module 101. Specifically, the translucent element 2130 can thread onto the first housing 4. The lamp module group 100 can further comprise a reflector 2630 positioned within the cover 34 opposite from the first housing 4. The reflector 2630 can reflect light directed upwards from the lamp module 101 back downwards. The fastener 8 can threadedly engage the reflector 2630, and the fastener 8 can extend through the translucent element 2130 to threadedly engage the shroud 2134. In the present aspect, the fastener 8 can be a threaded rod, a stud, or other suitable fastener. The fastener 8 can extend through the cover gasket 2126, which can be positioned and compressed between the shroud 2134 and the translucent element 2130, thereby forming a seal between the shroud 2134 and the translucent element 2130.

In the aspect shown, the shroud 2134 can be a two-piece shroud, with an upper shroud 2634 positioned atop a bottom shroud 2635. In the present aspect, the bottom shroud 2635 can be larger than the upper shroud 2634, and the bottom shroud 2635 can extend downwards over at least a portion of the cover 34. The shroud 2134 can be configured to reflect light downwards towards a ground surface.

Figure 27:
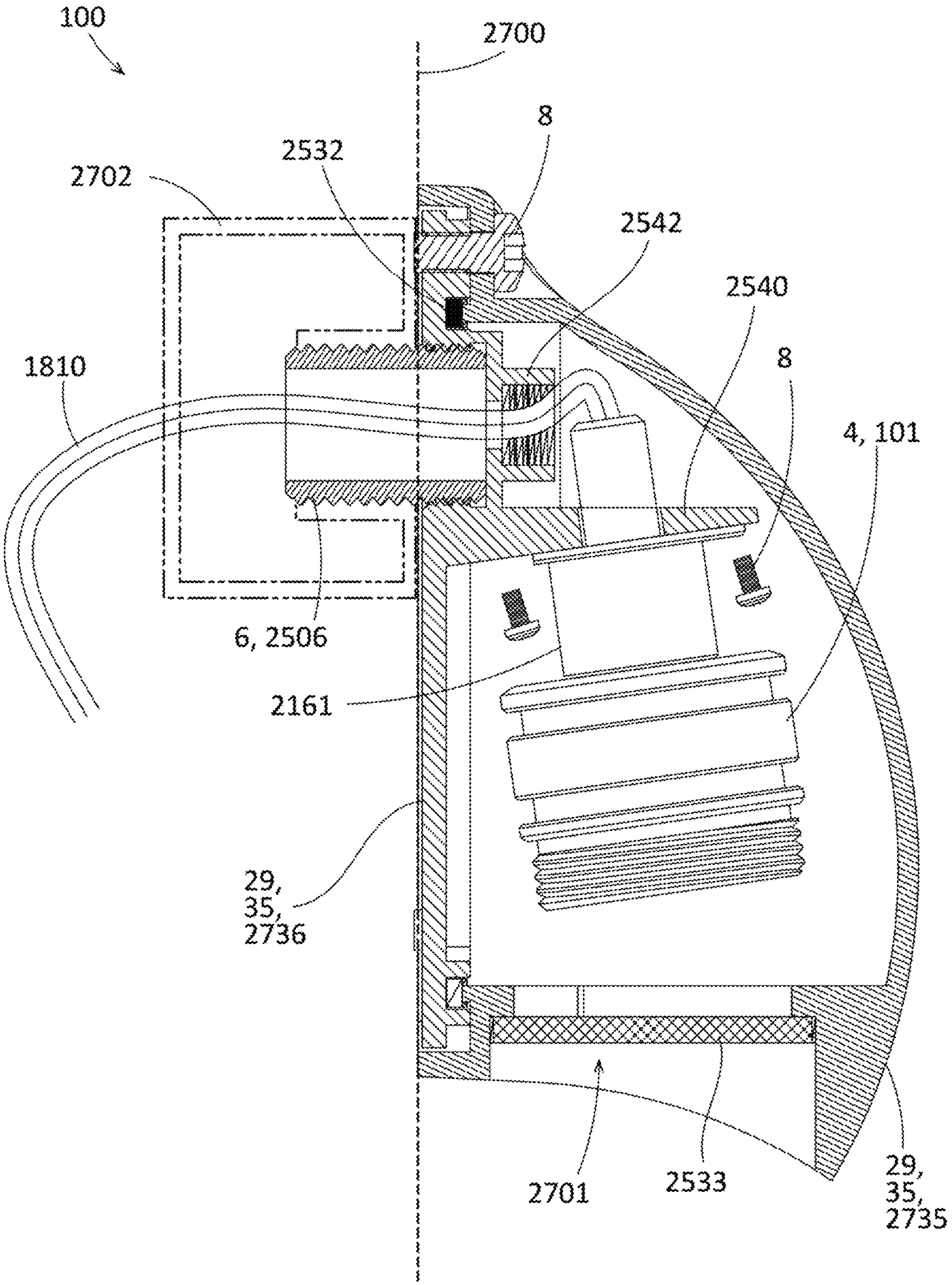
FIG. 27 is a cross-sectional view of another aspect of the lamp module group configured as a sconce in accordance with another aspect of the present disclosure.

FIG. 27 shows another aspect of the lamp module group 100 attached to a wall 2700. The lamp module group 100 can be configured as a wall light, such as a sconce. The second housing 29 can be a two-piece version of the lamp holder 35. In the present aspect, the lamp holder 35 can comprise an outer shell 2735 and an inner shell 2736. The inner shell 2736 can be substantially flat on one side, and the inner shell 2736 can be configured to be mounted to the wall 2700, as shown. The lamp holder 35 can comprise the sealing lens 2533, the gasket 2532, and one or more fasteners 8. The lamp holder 35 can define the receptacle mount 2540 and the shaft mount 2542. In the present aspect, the receptacle mount 2540 and the shaft mount 2542 can be defined by the inner shell 2736; however, in other aspects, one or both of the receptacle mount 2540 and the shaft mount 2542 can be defined by a different portion of the lamp holder 35, such as the outer shell 2735, for example and without limitation.

When assembled, the power receptacle 2161 can be coupled to the receptacle mount 2540 by fasteners 8 (shown removed from the receptacle mount 2540). The first housing 4 of the lamp module 101 can be screwed into the power receptacle 2161. The gasket 2532, which can extend around a perimeter of the lamp holder 35, can be placed between the shells 2735,2736, and the sealing lens 2533 can be placed between the shells 2735,2736 at an opening 2701 of the lamp holder 35. The shells 2735,2736 can then be coupled together with one or more fasteners 8, thereby sealing the lamp module 101 inside the lamp holder 35.

The shaft mount 2542 can be configured to receive the shaft 6. In the present aspect, the shaft 6 can be the threaded stub-shaft 2506, and the shaft 6 can be threaded into the shaft mount 2542. The power cable 1810, can extend through the shaft 6 and the shaft mount 2542 to the power receptacle 2161, thereby providing power to the attached lamp module 101.

In the present aspect, the lamp module group 100 can further comprise a junction box 2702, which can be installed, or roughed in, behind the wall 2700. The shaft 6 can threadedly engaged the junction box 2702 to secure the lamp module group 100 to the wall 2700. The power cable 1810 can be routed through the junction box 2702 behind the wall 2700. In the present aspect, the lamp module 101 is shown facing downwards; however, in other aspects, the lamp module 101 can face a different direction, such as upwards, outwards, or horizontally, for example and without limitation. In some aspects, the wall 2700 can be a different type of surface, such as a ceiling, floor, cabinet top, or other structure.

Figure 28:
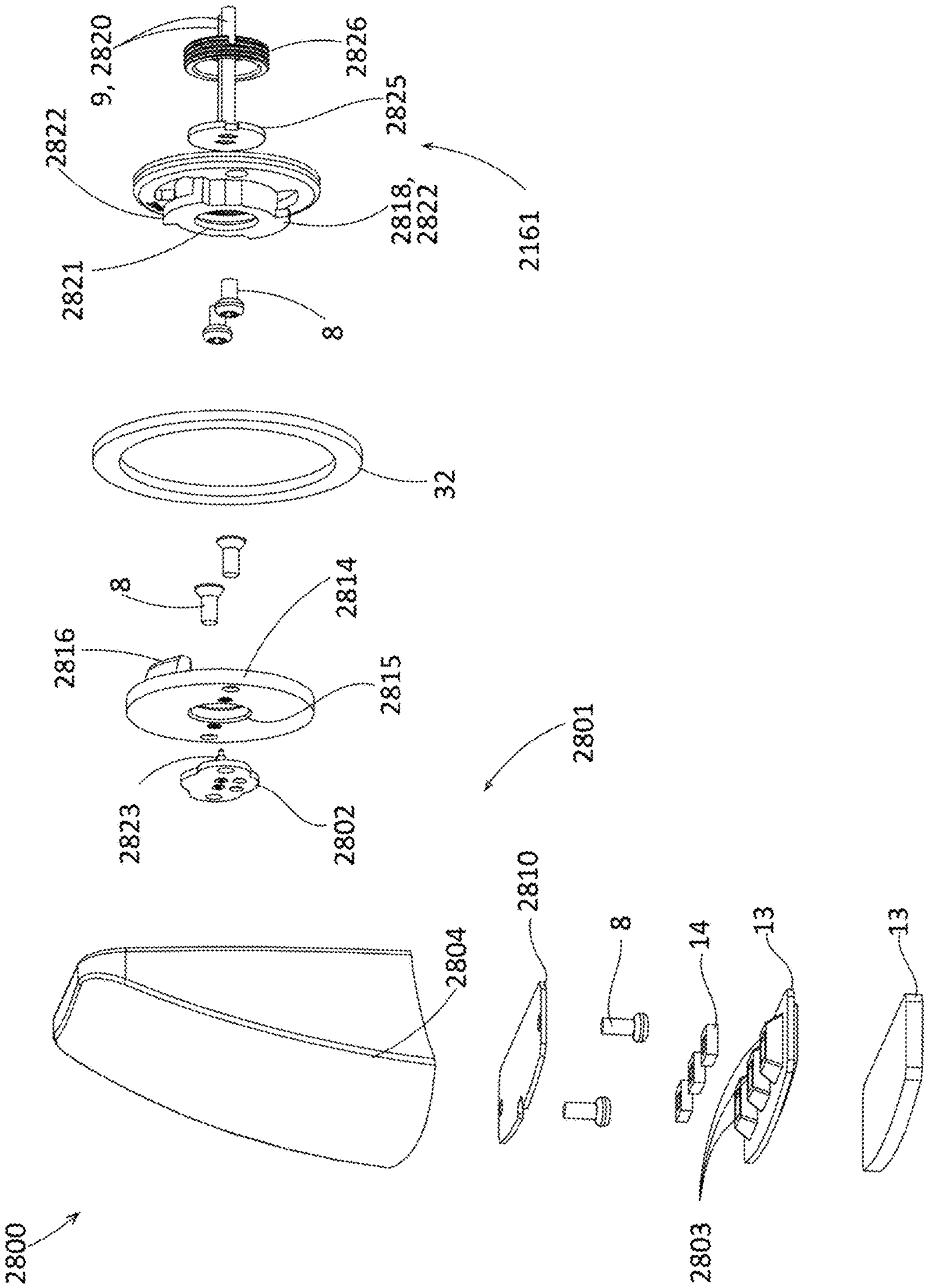
FIG. 28 is an exploded view of the lamp module group of FIG. 27.
Figure 29:
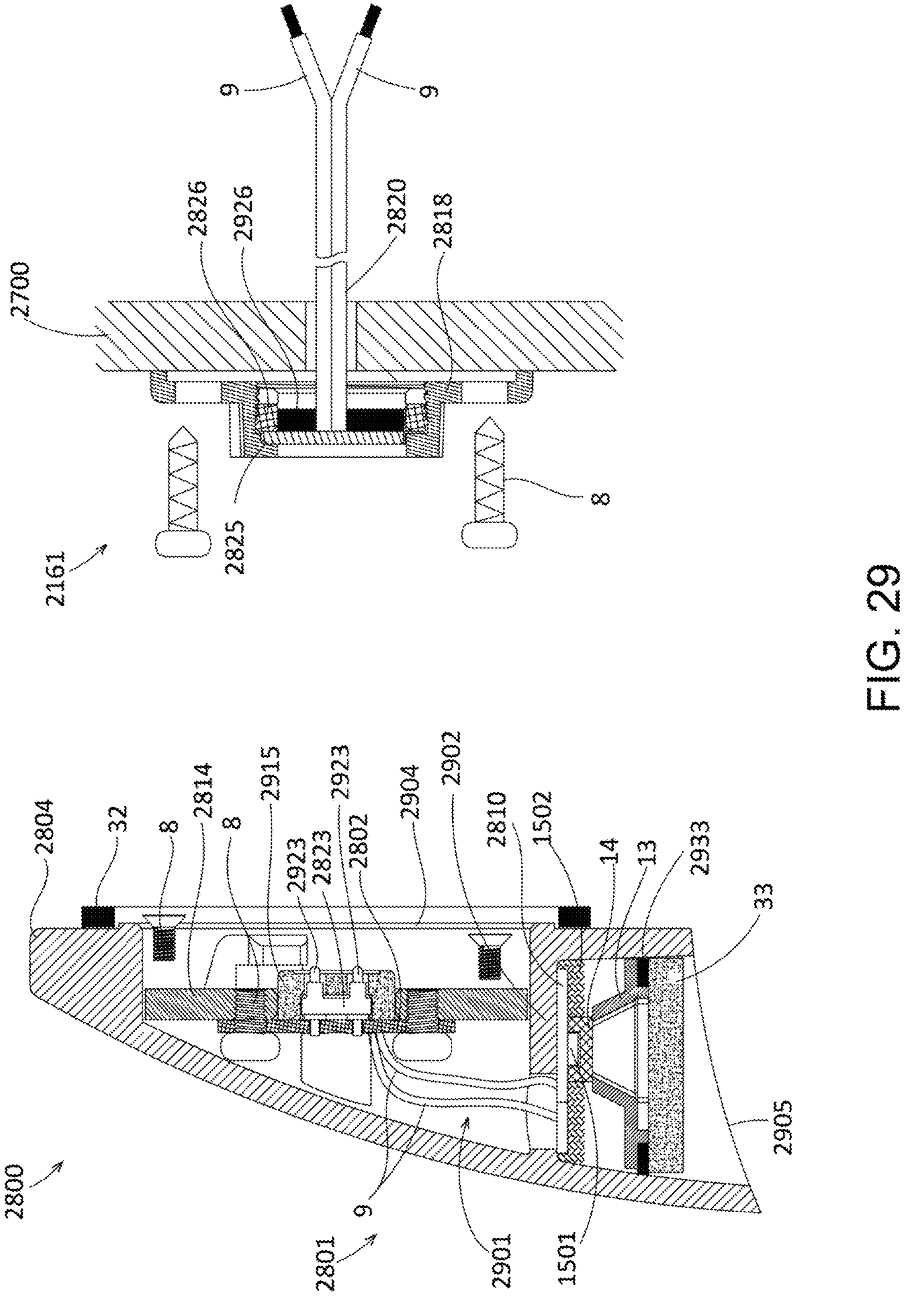
FIG. 29 is cross-sectional view of another aspect of the lamp module group configured as a sconce in accordance with another aspect of the present disclosure.
Figure 30:
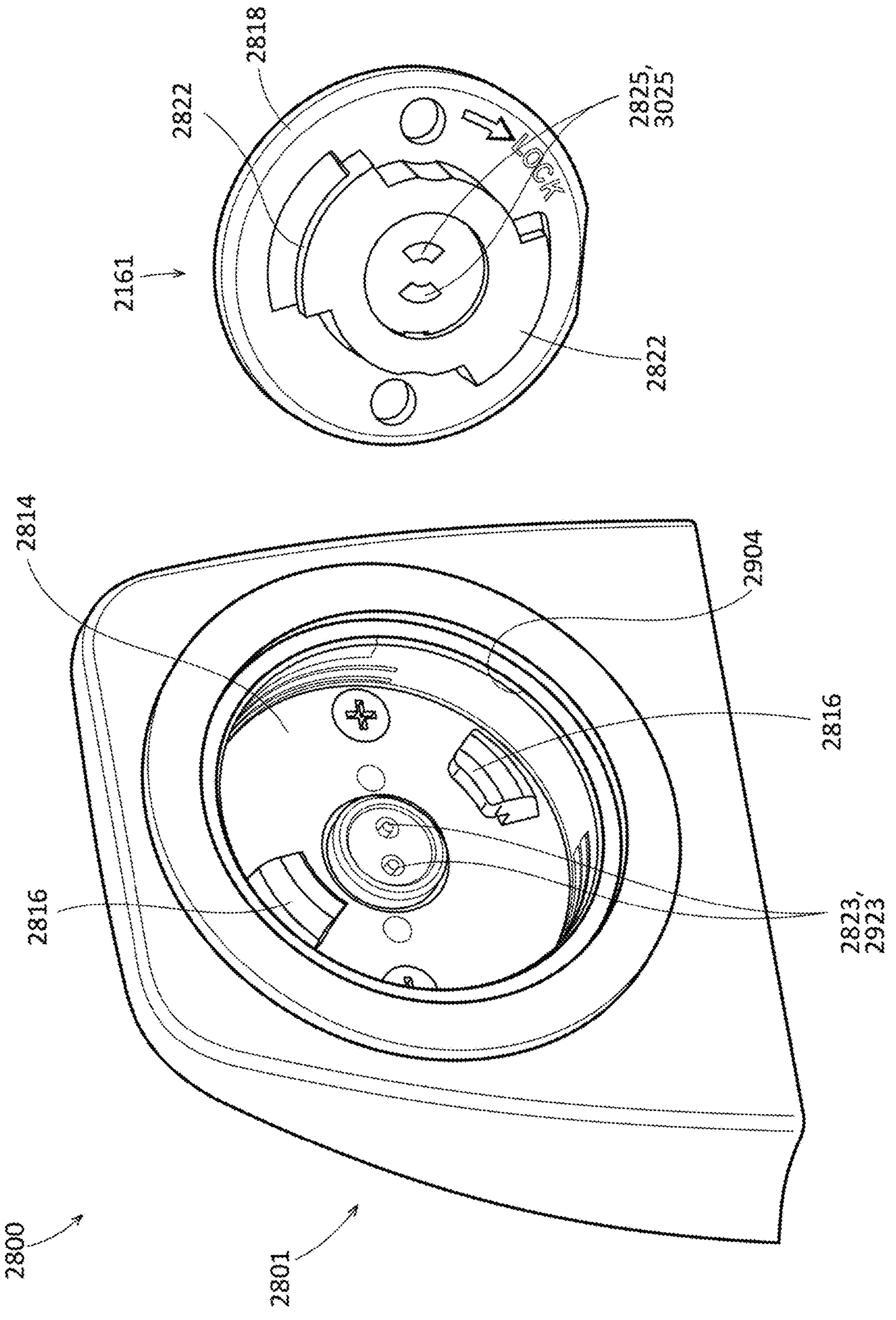
FIG. 30 is a perspective view of the lamp module group of FIG. 29.

FIGS. 28-30 show various views of another aspect of a lamp module group 2800 comprising another aspect of a lamp module 2801 and another aspect of a power receptacle 2161, in accordance with the present disclosure.

FIG. 28 is an exploded view of the lamp module group 2800. The lamp module 2801 can comprise an LED lamp board 2810, a power supply driving module 2802, a first housing 2804, and a first mounting plate 2814. The LED lamp board 2810 can be secured inside the first housing 2804 by fasteners. In the present aspect, the LED lamp board 2810 can comprise three LEDs 1501 (LED 1501 shown in FIG. 29); however, in other aspects, the LED lamp board 2810 can comprise more than or fewer than three LEDs 1501. In the present aspect, the lamp module 2801 can further comprise three lenses 14, which can respectively fit over the LEDs 1501. The reflector cup 13 can define three separate reflector openings 2803 for receiving the lenses 14 and positioning the lenses 14 to align with the LEDs 1501. In some aspects, the lamp module 2801 can comprise a different number of lenses 14, such as a single lens 14 configured to fit over each LED 1501. The sealing lens 33 can fit within the first housing 2804 to at least partially seal the first housing 2804.

In the present aspect, a first terminal 2823 can be mounted directly to the power supply driving module 2802. The first mounting plate 2814 can define a first mounting plate opening 2815, and the first terminal 2823 can be received within the first mounting plate opening 2815. Fasteners can secure the power supply driving module 2802 and the first mounting plate 2814.

The power receptacle 2161 can comprise a second mounting plate 2818, a second terminal 2825, a retention ring 2826, and a power cable 2820. The power cable 2820 can comprise two or more wires 9. The power cable 2820 can be connected to the second terminal 2825, and the power cable 2820 can supply power to the second terminal 2825. The second terminal 2825 can be inserted into a second mounting plate opening 2821, and the retention ring 2826 can be inserted into the second mounting plate opening 2821 behind the second terminal 2825 to secure the second terminal 2825 within the second mounting plate opening 2821. In the present aspect, the retention ring 2826 can threadedly engage the second mounting plate opening 2821. In some aspects, the retention ring 2826 can snap into place, be adhered into place, or otherwise secured to the second mounting plate 2818. Fasteners 8 can couple the power receptacle 2161 to the wall 2700, as shown in FIG. 29.

The first mounting plate 2814 can define one or more claws 2816. The second mounting plate 2818 can define one or more radial lugs 2822. In some aspects, the radial lugs 2822 can be at least partially helical in shape. The mounting plates 2814,2818 can be configured to connect the lamp module 2801 and the power receptacle 2161 together by engaging the claws 2816 with the radial lugs 2822, which can also position the first terminal 2823 in electrical communication with the second terminal 2825, thereby providing power from the power receptacle 2161 to the lamp module 2801.

FIG. 29 is a cross-sectional view of the lamp module group 2800 of FIG. 28. The first housing 2804 can define a housing cavity 2901 with a rear opening 2904 and a bottom opening 2905. The gasket 32 can be positioned around the rear opening 2904. In some aspects, the gasket 32 can be coupled to the first housing 2804, such as with an adhesive. The power supply driving module 2802 and the first mounting plate 2814 can be inserted through the rear opening 2904 and secured within the housing cavity 2901 by fasteners 8. An insulating cover 2915 can fit over the first terminal 2823; however, contacts 2923 of the first terminal 2823 can extend through the insulating cover 2915. The contacts 2923 can be electrically conductive. The contacts 2923 can be configured to connect in electrical communication with the second terminal 2825 when the lamp module 2801 is coupled to the power receptacle 2161, thereby supplying power to the power supply driving module 2802.

The power supply driving module 2802 can be electrically connected to the LED lamp board 2810 by wires 9 within the housing cavity 2901. The LED lamp board 2810 can be inserted through the bottom opening 2905 and mounted to an inner wall 2902 of the first housing 2804. The lenses 14 can be fit over the LEDs 1501, and the LED lamp board 2810 can be coated with a layer of potting, glue, or other filler 1502, which in some aspects can be formulated to conduct, or shunt, heat away from the LED lamp board 2810 to the first housing 2804. The reflector cup 13 can be fit over the lenses 14, and the sealing lens 33 can be adhered to the reflector cup 13 with a sealant 2933, such as silicone, glue, epoxy, or other suitable material.

The power receptacle 2161 can be coupled to the wall 2700 by the fasteners 8, and the power cable 2820 can extend through the wall, such as through a hole or opening. The wires 9 of the power cable 2820 can be connected to a power system (not shown), and the wires 9 can be phase, neutral, ground, positive, negative, or other types of wires for example and without limitation, of the power system. An insulating cover 2926 can be positioned within the retention ring 2826 and between the wall 2700 and the second terminal 2825.

FIG. 30 is a perspective view of the lamp module group 2800 of FIG. 28 facing the respective mounting plates 2814,2818 of the lamp module 2801 and the power receptacle 2161. To secure the lamp module 2801 to the power receptacle 2161, the rear opening 2904 can be placed over the power receptacle 2161 with the claws 2816 of the first mounting plate 2814 positioned between the radial lugs 2822 of the second mounting plate 2818. The lamp module group 2800 can then be twisted to engage the claws 2816 with the radial lugs 2822, thereby coupling the lamp module 2801 to the power receptacle 2161 and positioning the first terminal 2823 in electrical communication with the second terminal 2825.

The second terminal 2825 can comprise contact pads 3025. The contact pads 3025 can each be connected in electrical communication with a different wire 9 of the power cable 2820 (wires 9 and power cable 2820 shown in FIG. 29). When the first terminal 2823 is connected in electrical communication with the second terminal 2825 each contact 2923 can each be positioned in electrical communication with a different contact pad 3025, thereby completing multiple electrical pathways. In the present aspect, each contact pad 3025 can define an arcuate shape and be sized so that the contacts 2923 can remain in contact with the respective contact pads 3025 through the range of rotational motion utilized to engage and disengage the claws 2816 and radial lugs 2822.

Figure 31:
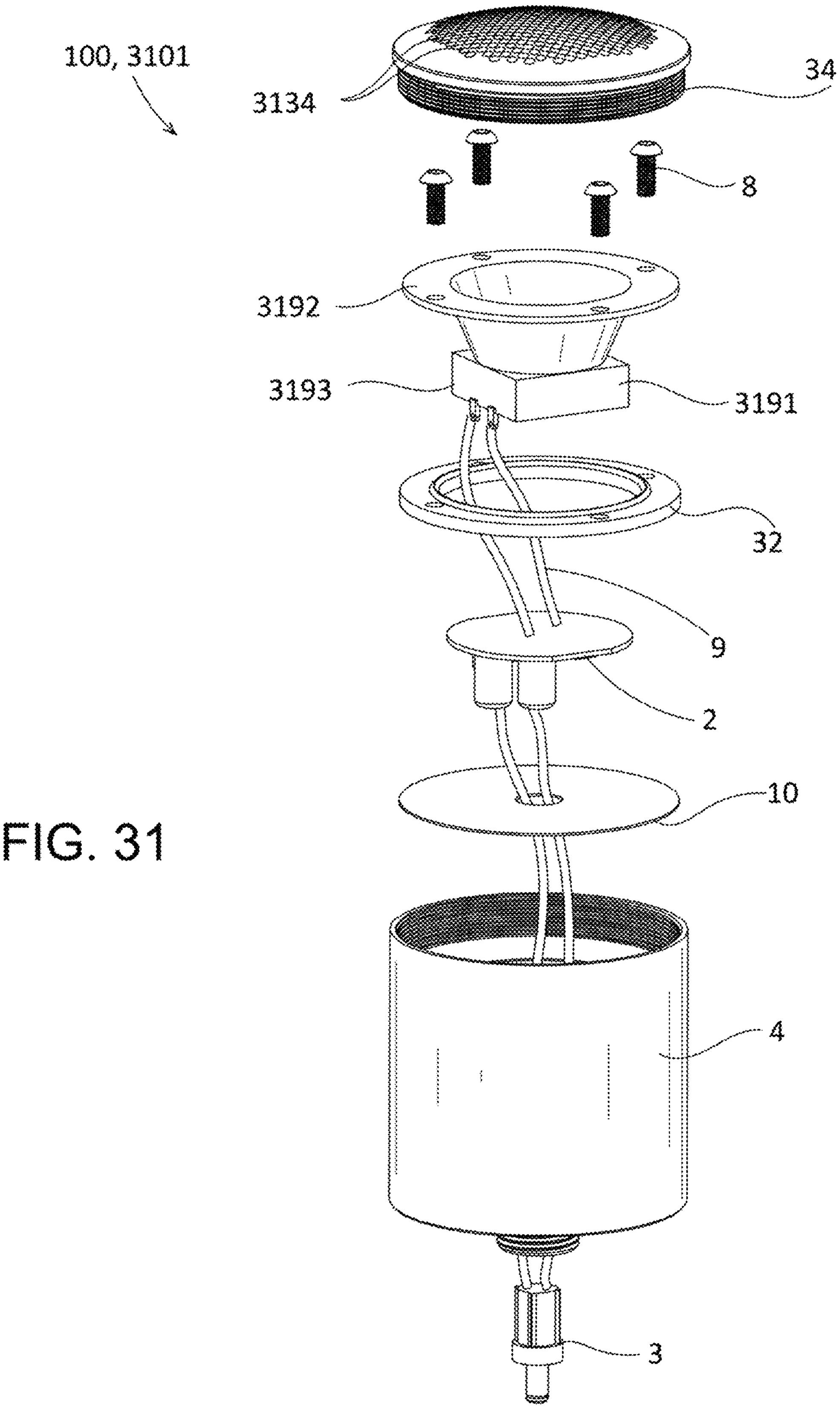
FIG. 31 is an exploded view of a speaker module group in accordance with another aspect of the present disclosure.

FIG. 31 is an exploded view of another aspect of the electronic module group 100 in accordance with another aspect of the present disclosure. In the aspect shown, the electronic module group 100 can comprise the speaker module 3101, and the electronic module group 100 can be the speaker module group 100, as referenced above.

It is contemplated that the speaker module 3101 can be utilized in place of, or in addition to, various aspects of the lamp module 101 disclosed herein to form various speaker assemblies or combined lamp and speaker assemblies. For example and without limitation, the speaker module 3101 can be suspended by the power cable 1810 (shown in FIG. 32) to form a pendant speaker. In some aspects, the speaker module 3101 can be combined with the bollard posts 2100 of FIGS. 21 and 26 and/or the stake 2508 of FIG. 25, such as to support the speaker module 3101. In some aspects, the speaker module 3101 can be combined with various aspects of the lamp holder 35, which can be understood to be a module holder, or more specifically a speaker holder, in that application. It is contemplated that in some aspects, the module holder can house multiple lamp modules 101, multiple speaker modules 3101, or combinations of lamp modules 101 and speaker modules 3101. As noted below, a speaker 1391 of the speaker module 3101 can be waterproof in some applications, and both indoor and outdoor applications for the speaker module group 3100 are contemplated. In some aspects, some accessories, such as the power cable 1810 or the bollard post 2100, can be branched and capable of electrically connecting multiple modules 101,3101 together, including combinations of lamp modules 101 and speaker modules 3101. In some aspects, multiple speaker modules 3101 can be utilized together to form various different ranges of sound frequency. For example and without limitation, speaker modules 3101 can be tweeters, midrange loudspeakers, subwoofers, or any other type of speaker, which can be utilized cooperatively.

As shown in FIG. 31, the speaker module 3101 of the speaker module group 100 can comprise the speaker 3191, the power supply driving module 2, the first concentric terminal 3, and the first housing 4. The speaker module 3101 can also comprise the insulating sheet 10, the gasket 32, the cover 34, and fasteners 8.

For aspects of the electronic module group 100 comprising the speaker 3191, the power supply driving module 2 can be configured to power the speaker 3191, such as to produce a range of frequencies and volumes through the speaker 3191. In some aspects, the power supply driving module 2 or a separate component of the speaker 3191 can be configured to receive signals wirelessly, which can carry instructions to the speaker 3191 to produce certain sounds at certain volumes. In some aspects, the speaker module 3101 can receive instructions through the first concentric terminal 3 rather than wirelessly. For example and without limitation, the instructions can be the notes of a song, voice recording, an audio track to a television show or movie, or other audio file. The speaker 3191 can comprise a basket 3192 and a coil housing 3193, which can comprise and house sound producing elements, such as a magnet, an electromagnetic coil, or other components, for example and without limitation. Instructions from the power supply driving module 2 can be communicated to the coil housing 3193 through wires 9.

In some aspects, the speaker 3191 can be a waterproof speaker. The speaker 3191 and the gasket 32 can cooperate to form a seal and prevent the intrusion of elements, such as water, dust, or dirt, from entering the first housing 4 and reaching the power supply driving module 2. The speaker module 3101 can be waterproof. For example and without limitation, in the present aspect, the speaker module 3101 can be IP65 rated, or better, under IEC standard 60529.

The cover 34 can define a plurality of openings 3134. The openings 3134 can facilitate the projection of sound from the speaker 3191 outwards through the cover 34.

Figure 32:
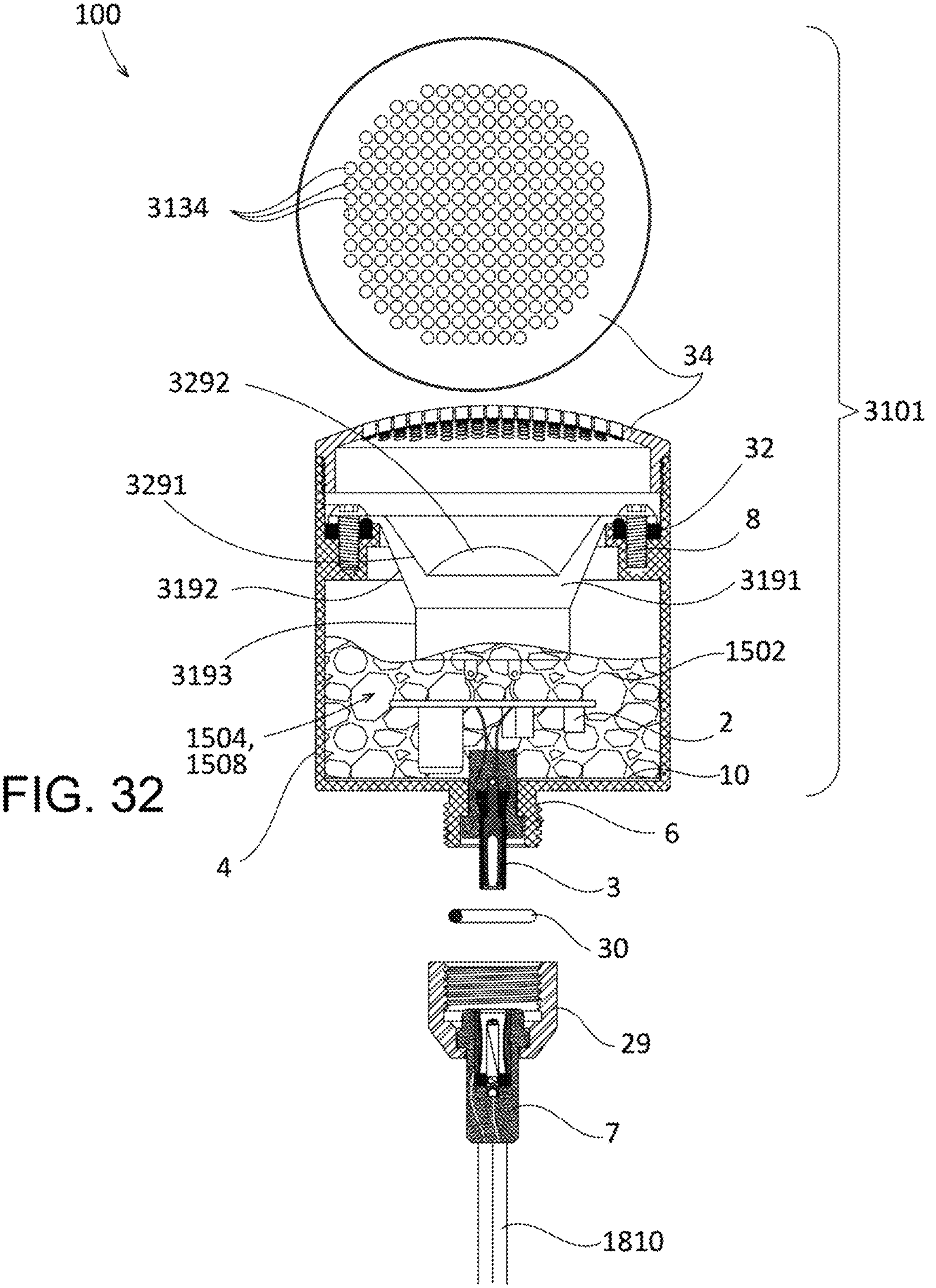
FIG. 32 is a cross-sectional view the speaker module group of FIG. 31 and the power cable of FIG. 18.

FIG. 32 is a cross-sectional view of the speaker module group 100 of FIG. 32, further comprising the power cable 1810. Two covers 34 are shown. One cover 34 is shown installed in the first housing 4. A second cover 34 is shown for demonstrative purposes, including to show a top view wherein the openings 3134 are clearly visible. The openings 3134 can take any shape, such as round, polygonal, slots, or gaps, such as those in a wire mesh for example and without limitation.

The speaker 3191 can be installed within the first housing 4, and the speaker 3191 can be coupled to the first housing 4 by the fasteners 8. The gasket 32 can be positioned between the first housing 4 and the basket 3192, thereby sealing the main compartment 1508 of the housing cavity 1504. The main compartment 1508 can be at least partially filled with the potting, glue, or other filler 1502. The insulating sheet 10 can be positioned around the first concentric terminal 3 and between the first housing 4 and the potting, glue, or other filler 1502. In the present aspect, the potting, glue, or other filler 1502 can fill the main compartment 1508 up to the coil housing 3193. A diaphragm 3291 and a cone 3292 of the speaker 3191 can be positioned within the basket 3192, and the components, such as coils and magnets, within the coil housing 3193 can vibrate the diaphragm 3291 and the cone 3292 to produce sound.

The power cable 1810 can be coupled to the speaker module 3101 to provide power to the speaker module 3101. The second housing 29 can thread onto the shaft 6, with the sealing ring 30 therebetween, to form a waterproof connection, and the first concentric terminal 3 can electronically connect with the second concentric terminal 7 of the power cable 1810 to supply power to the power supply driving module 2, which in turn can provide power to the speaker 3191.

Figure 33:
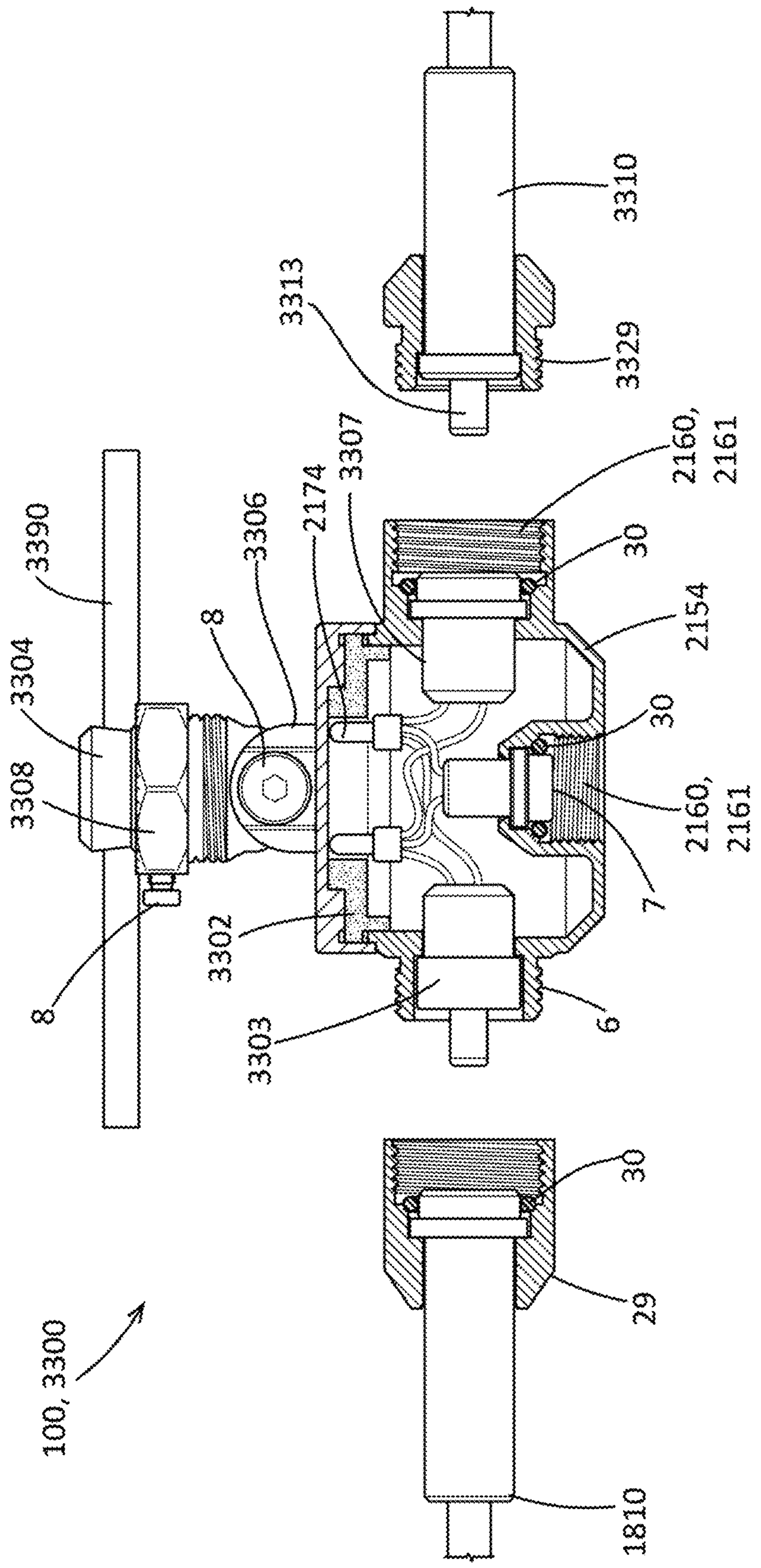
FIG. 33 is a partial cross-sectional view of another aspect of an accessory of the electronic module group, the power cable, and another aspect of a power cable in accordance with another aspect of the present disclosure.

FIG. 33 shows a partial cross-sectional view of another aspect of an accessory 3300 of the electronic module group 100, the power cable 1810, and another aspect of a power cable 3310 in accordance with another aspect of the present disclosure. The accessory 3300 can be utilized with various aspects of the lamp module 101 and the speaker module 3101 disclosed herein. In the present aspect, the accessory 3300 can be a catenary mount 3300.

The catenary mount 3300 can comprise the accessory housing 2154, a top plate 3306, and a wire hook 3304. The wire hook 3304 can be configured to hang on a catenary wire 3390, as shown. The catenary wire 3390 can be a structural wire, or cable, that can be secured between two points. The catenary wire 3390 can be taut or relaxed. A nut 3308 and a fastener 8 can be engaged with the wire hook 3304. The nut 3308 can be threaded onto the wire hook 3304. In the aspect shown, the nut 3308 can be tightened against the catenary wire 3390 to pinch the catenary wire 3390 between the wire hook 3304 and the nut 3308. The fastener 8 can be threaded into the nut 3308. The fastener 8 can extend through the nut 3308 to engage with the wire hook 3304 to rotationally fix the nut 3308 to the wire hook 3304. In some aspects, the fastener 8 can be a set screw. In some aspects, the fastener 8 can be a thumb screw. In some aspects, the fastener 8 can be configured to be tightened with a tool, such as a wrench, socket, screwdriver, or other suitable tool.

The wire hook 3304 can be hingedly coupled to the top plate 3306 by another fastener 8. The top plate 3306 can mount to the accessory housing 2154. An accessory gasket 3302 can be positioned between the top plate 3306 and the accessory housing 2154 and form a seal therebetween.

In the present aspect, the catenary mount 3300 can comprise a plurality of concentric terminals 7,3303,3307. The concentric terminals 7,3303,3307 can be interconnected by a plurality of wires 9 (shown in FIG. 34) and wire connectors 2174, such as wire nuts. The second concentric terminal 7 can be mounted within the threaded bore, or bottom threaded bore, 2160 to form the power receptacle 2161, which can be a bottom power receptacle 2161 in the present aspect. The sealing ring 30 can be positioned within the bottom power receptacle 2161. The bottom power receptacle 2161 can be positioned opposite from the wire hook 3304. The bottom power receptacle 2161 can be configured to coupled with the shaft 6 of the module 101,3101, such as a lamp module or speaker module.

The concentric terminal 3303 can be a first accessory concentric terminal 3303, and the concentric terminal 3307 can be a second accessory concentric terminal 3307. In the present aspect, the first accessory concentric terminal 3303 can be a male connector. In the present aspect, the second accessory concentric terminal 3307 can be a female connector. In the present aspect, the accessory concentric terminals 3303,3307 can be larger in size than the second concentric terminal 7. In other aspects, the accessory concentric terminals 3303,3307 can be sized to match the size of the second concentric terminal 7 and the first concentric terminal 3 (shown in FIG. 4).

The first accessory concentric terminal 3303 can be positioned within the shaft 6 of the accessory housing 2154. The shaft 6 can extend out of a side of the accessory housing 2154. The second accessory concentric terminal 3307 can be positioned within a second threaded bore, or side threaded bore, 2160, which can be defined opposite from the shaft 6. The shaft 6 and the side threaded bore 2160 can be positioned above the bottom threaded bore 2160 and below the top plate 3306. The second accessory concentric terminal 3307 and the second threaded bore 2160 can define a second power receptacle 2161, which can be a side power receptacle 2161. The sealing ring 30 can be positioned within the side power receptacle 2161.

The power cable 1810 can be coupled to the stem 6, such as by threadedly engaging the second housing 29 with the stem 6. The sealing ring 30 can form a seal between the first accessory concentric terminal 3303 and the power cable 1810. The power cable 1810 can electrically connect to the first accessory concentric terminal 3303 and supply power to the catenary mount 3300, and more specifically to the second concentric terminal 7 and the second accessory concentric terminal 3307. If a module, such as the lamp module 101 or the speaker module 3101, is connected to the second concentric terminal 7, the module can indirectly receive power from the power cable 1810 through the catenary mount 3300.

In some aspects, the side power receptacle 2161 can be sealed, such as with a plug (not shown), and the second accessory concentric terminal 3307 may not electrically connect with any other components. In the aspect shown, the side power receptacle 2161 can be configured to connect with the second power cable 3310. The second power cable 3310 can comprise a male concentric terminal 3313 in the present aspect, and the second power cable 3310 can comprise a second housing 3329, which can be configured as a male second housing 3329. The male concentric terminal 3313 and the male second housing 3329 can be configured to electrically connect with the side power receptacle 2161. In some aspects, multiple catenary mounts 3300 can be mounted on the catenary wire 3390, and the second power cable 3310 can connect to another catenary mount 3300 to provide power to it. Accordingly, a chain of catenary mounts 3300 and modules 101,3101 can be mounted along the catenary wire 3390.

In other aspects, the catenary mount 3300 can comprise any combination of male and female concentric terminals 7,3303,3307. Either power receptacle 2161 can be a shaft 6, or the shaft 6 can be a threaded bore 2160 of a power receptacle 2161.

Figure 34:
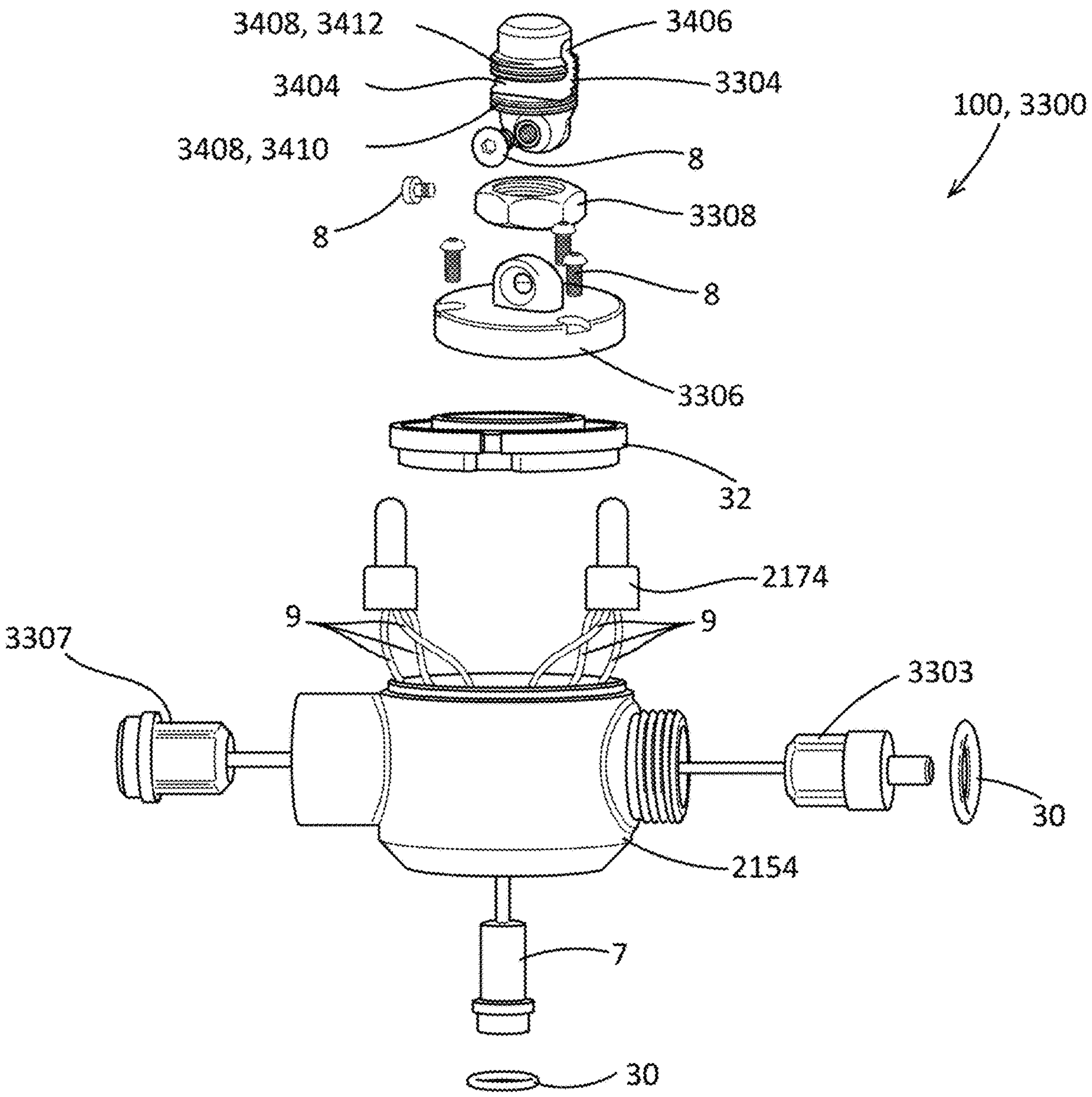
FIG. 34 is an exploded view of the catenary mount of the electronic module group of FIG. 33.

FIG. 34 is an exploded view of the catenary mount 3300 of the electronic module group 100. As shown, a plurality of wires 9 can electrically connect the concentric terminals 7,3303,3307 in electrical communication. The wires 9 can be coupled together with electrical connectors 2174. Any of the concentric terminals 7,3303,3307 can be fit with one of the sealing rings 30, or the power cables 1810,3310 (shown in FIG. 33) can be fit with the sealing rings 30.

A plurality of fasteners 8 can couple the top plate 3306 to the accessory housing 2154, and the fasteners 8 can compress the gasket 32 between the top plate 3306 and the accessory housing 2154 to form a seal therebetween. A fastener 8 can hingedly couple the wire hook 3304 to the top plate 3306.

The wire hook 3304 can define hook threading 3408. The wire hook 3304 can also define a wire slot 3404. In the present aspect, the wire slot 3404 can extend through the hook threading 3408 on one side, which can define a top threading portion 3412 above the wire slot 3404 and a bottom threading portion 3410 below where the wire slot 3404 intersects the hook threading 3408. A top notch 3406 of the wire slot 3404 can extend above the top threading portion 3412.

In use, the nut 3308 can be threaded down so that the nut 3308 threadedly engages the bottom threading portion 3410 and is positioned below the wire slot 3404. The catenary wire 3390 (shown in FIG. 33) can be slipped into the wire slot 3404. The nut 3308 can then be threadedly rotated upwards until the nut 3308 engages the top threading portion 3412. With the nut 3308 threadedly engaging the top threading portion 3412, the catenary wire 3390 can be captured in the top notch 3406 by the nut 3308. In some aspects, the nut 3308 can be slightly spaced apart from the catenary wire 3390, which can allow the wire hook 3304 to slide along the catenary wire 3390. In some aspects, the nut 3308 can be tightened against the catenary wire 3390, and the catenary wire 3390 can be pinched between the nut 3308 and the top notch 3406, which can secure the catenary mount 3300 along the catenary wire 3390. The fastener 8, such as the set screw, can be tightened into the nut 3308 to engage the wire hook 3304 and prevent the nut 3308 from rotating relative to the wire hook 3304.

Figure 35A:
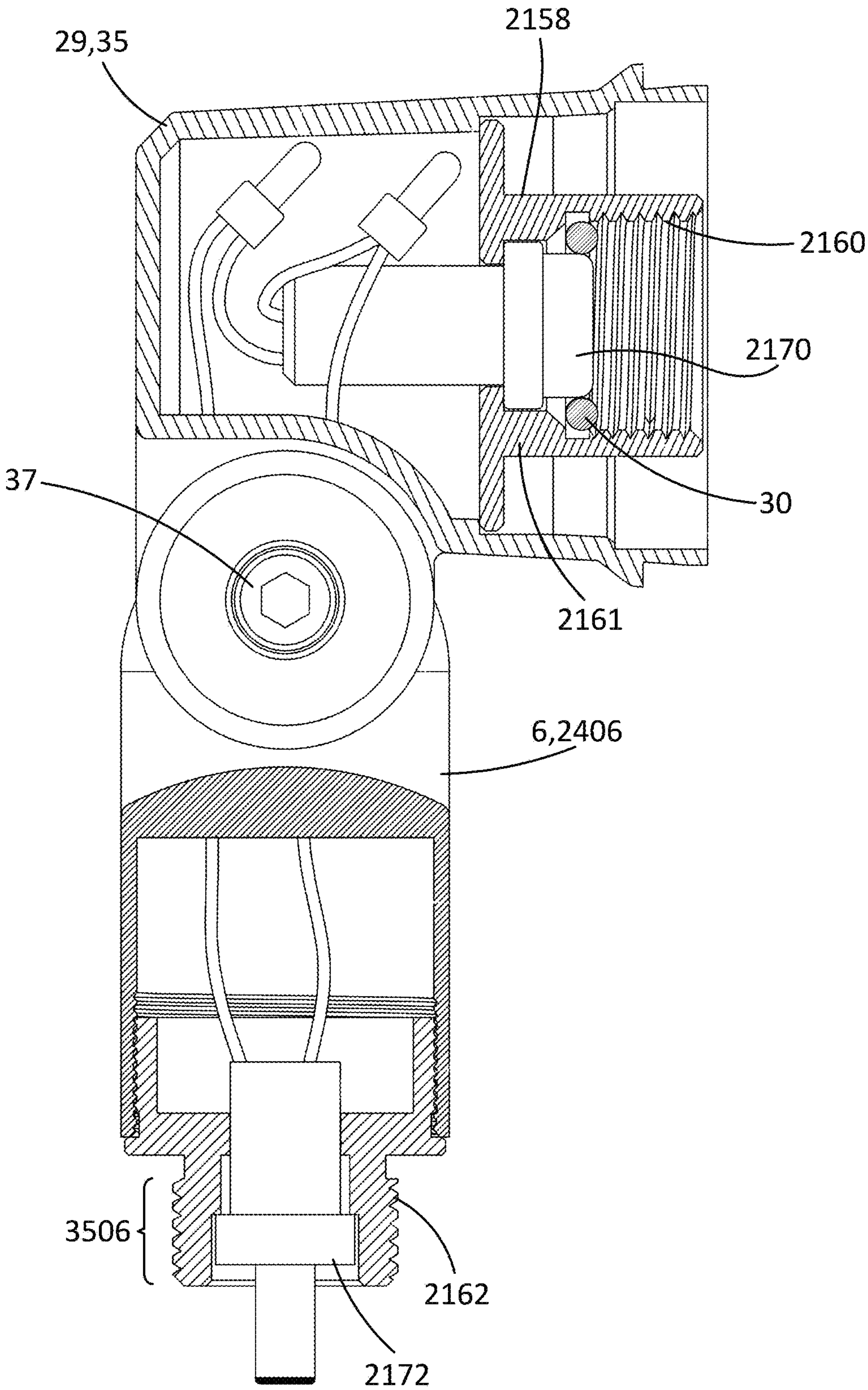
FIG. 35A is a partially cutaway view of a second housing with another aspect of a shaft in accordance with another aspect of the present disclosure.
Figure 35B:
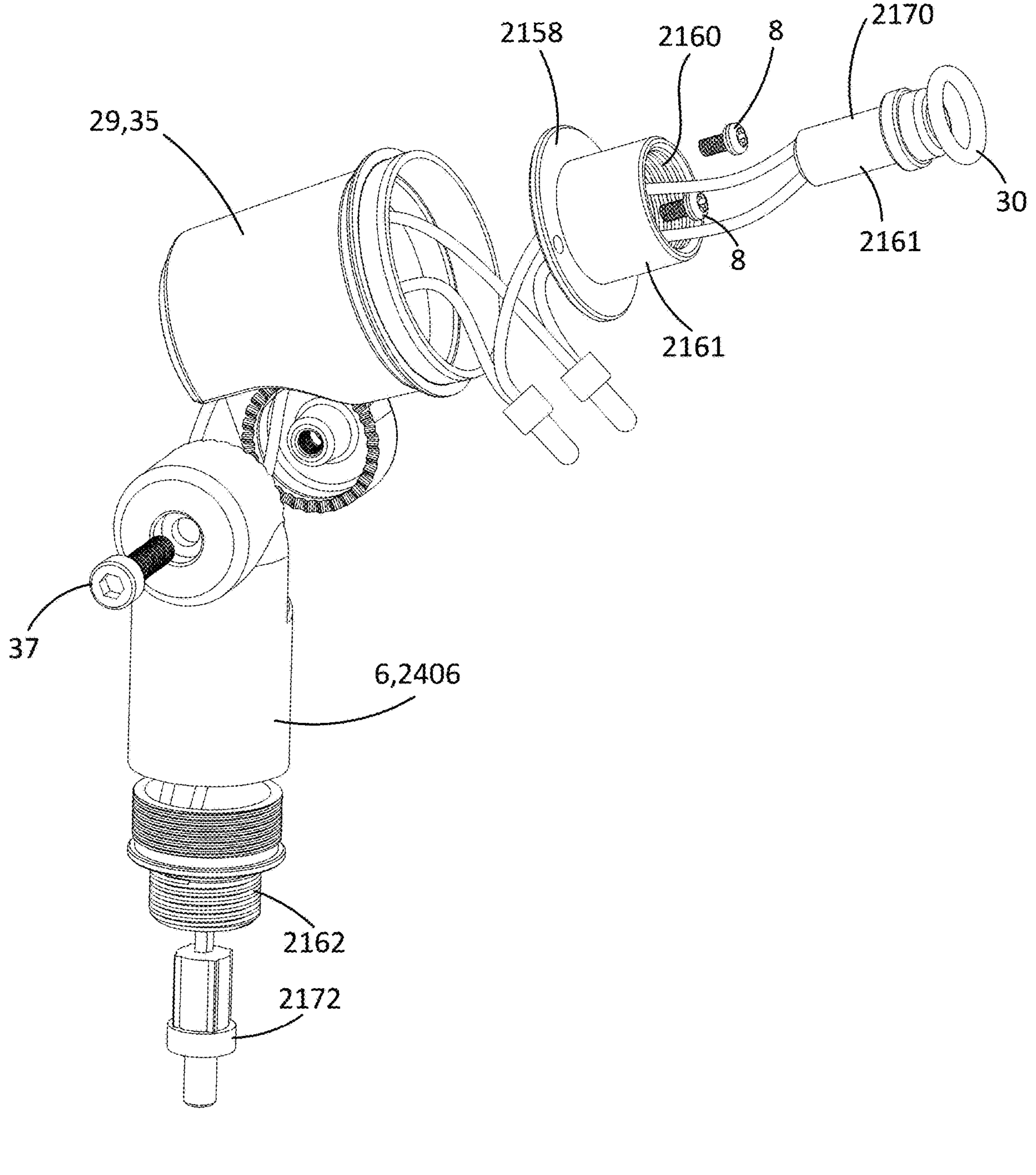
FIG. 35B is an exploded view of the second housing and the shaft of FIG. 35A.

FIGS. 35A-B depict various aspects of the present invention, which can comprise another aspect of the shaft 6 in accordance with another aspect of the disclosure. The shaft 6 can be utilized with the second housing 29, which can be similar to or the same as the second housing 29 of FIGS. 24A-C in some aspects. In some aspects, the shaft 6 can be utilized with other aspects of the second housing 29.

In the aspects shown in FIGS. 35A-B, the second housing 29 can be the lamp holder 35. The lamp holder 35 can receive the top threaded insert 2158, which can in turn receive the first concentric accessory terminal 2170 in the threaded bore 2160 to form the power receptacle 2161. The power receptable 2161 can be configured to receive and energize an electronic module, such as the lamp module 101 (shown in FIGS. 1, 2, 5-7, 15-21B, 22A, 23A-24A, 24C-27, 36A-B) or the speaker module 3101 (shown in FIGS. 31-32 and 38A-E), for example and without limitation. The top threaded insert 2158 can be secured by a pair of fasteners 8 (shown in FIG. 35B). The sealing ring 30 can be positioned within the power receptacle 2161.

In the aspect shown, the fixing rod 37 can secure the lamp holder 35 to the shaft 6, and the shaft 6 can be the tiltable shaft 2406. The tiltable shaft 2406 can be adjusted for angle relative to the lamp holder 35. In some aspects, the shaft 6 may be rigidly fixed to the lamp holder 35 and may not be adjustable for angle.

Rather than receiving the power cable 1810 and the cable insert 2416 (each shown in FIG. 24A), this aspect of the shaft 6 can receive an electrical connector. For example and without limitation, the electrical connector can be the second concentric accessory terminal 2172. The shaft 6 and the second concentric accessory terminal 2172 can be compatible with power receptacles similar to the power receptacle 2161. In various aspects, the electrical connector can be another type of electrical connector, such as any of those shown in FIGS. 3, 4, 14, 28-30, for example and without limitation.

In some aspects, the bottom threaded insert 2162 can be installed in the bottom of the shaft 6. For example and without limitation, the bottom threaded insert 2162 can threadedly engage female threads within the shaft 6. The electrical connector can be positioned at least partially within the bottom threaded insert 2162. In some aspects, the shaft 6 can integrally define a threaded portion 3506, and the electrical connector can be at positioned at least partially within the threaded portion 3506. In some aspects, the threaded portion 3506 can be defined by the bottom threaded insert 2162. The threading can be engaged with another housing and complimentary electrical connector to energize the power receptacle 2161.

Figure 36A:
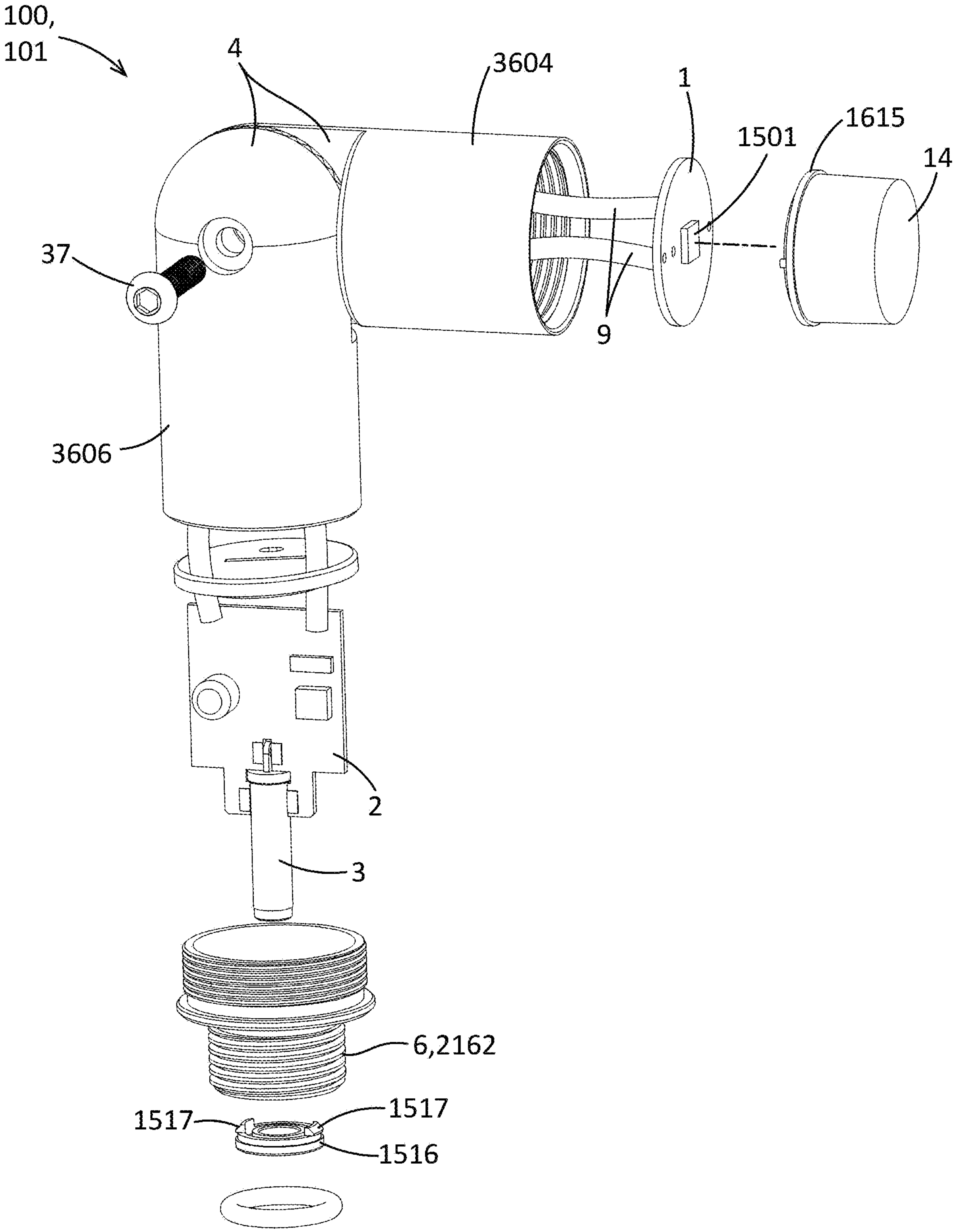
FIG. 36A is a partially exploded view of another aspect of the lamp module of the electronic group in accordance with another aspect of the present disclosure.
Figure 36B:
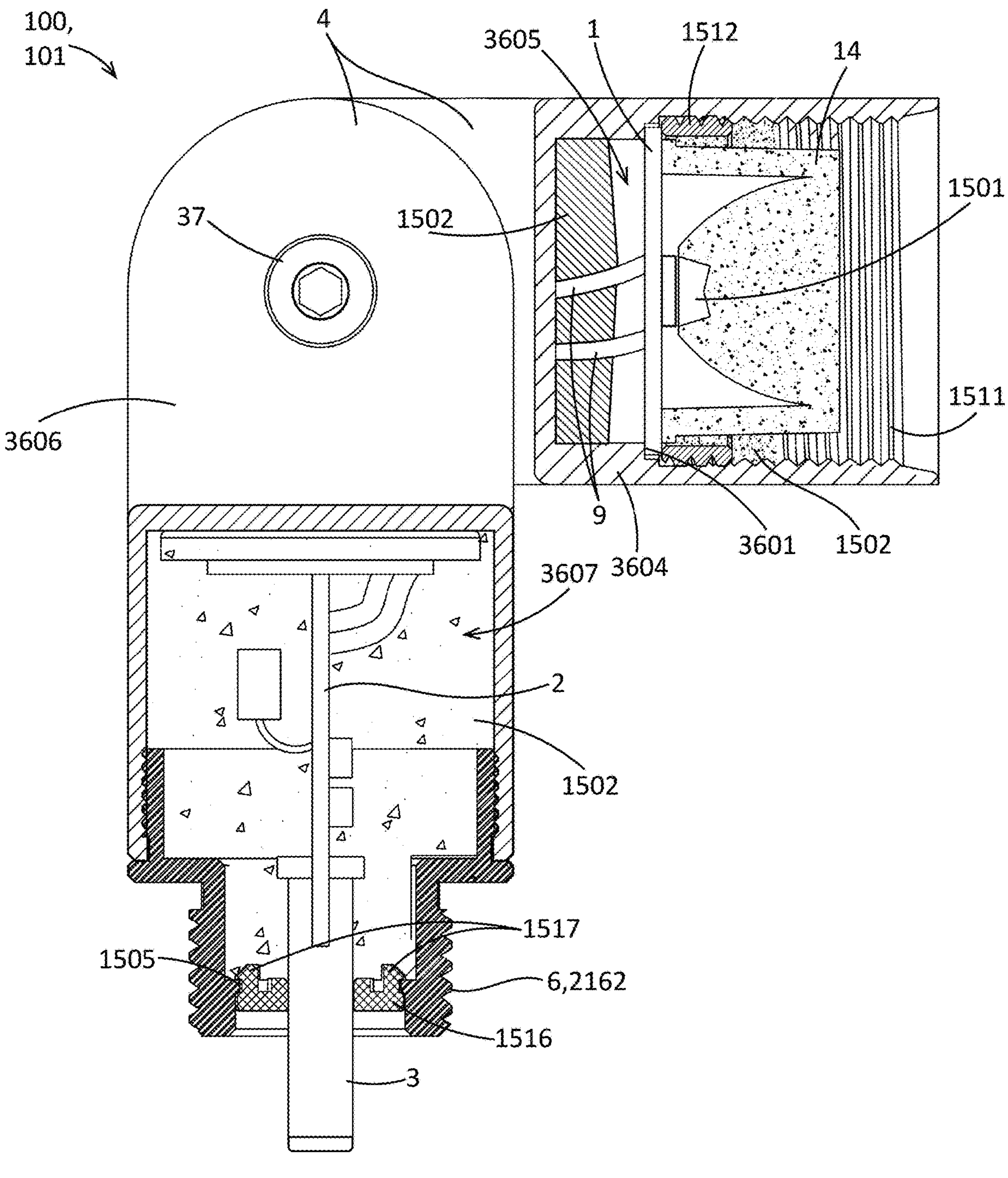
FIG. 36B is a partially cutaway view of the lamp module of FIG. 36A.

FIGS. 36A and 36B depict another aspect of the lamp module 101 of the electronic module group 100 in accordance with another aspect of the present disclosure. The lamp module 101 can comprise the LED lamp board 1, the power supply driving module 2, the first concentric terminal 3, the first housing 4, the lens 14, the first retention insert 1512 (shown in FIGS. 36B), and the second retention insert 1516.

In the present aspect, the first housing 4 can comprise an upper light holder portion 3604, a lower shaft portion 3606, and the fixing rod 37. The terms "upper" and "lower" are used with respect to the depicted orientation and should not be viewed as limiting. The lamp module 101 of FIGS. 36A-C can be used in any orientation and/or configuration.

The upper light holder portion 3604 can be configured to tilt relative to the lower shaft portion 3606 about the fixing rod 37, such as when the fixing rod 37 is loose for example and without limitation. The fixing rod 37 can be used to secure the angle of the upper light holder portion 3604 relative to the lower shaft portion 3606, such as when the fixing rod 37 is tightened for example and without limitation. In some aspects, the fixing rod 37 can define threading. For example and without limitation, the fixing rod 37 can be a threaded rod, stud, bolt, screw, nut, or another type of threaded fastener. In some aspects, the fixing rod 37 can cooperate with another fastener, such as the fixing nut 2437 (shown in FIG. 24C) for example and without limitation.

As shown in FIG. 36B, the upper light holder portion 3604 can define an upper housing cavity 3605, and the lower shaft portion 3606 can define a lower housing cavity 3607. The LED lamp board 1 can be positioned in the upper housing cavity 3605.

The upper housing cavity 3605 can define internal threading 1511. The first retention insert 1512 can threadedly engage the internal threading 1511 and secure the LED lamp board 1 against a shoulder 3601 of the upper light holder portion 3604. For example and without limitation, the first retention insert 1512 can be screwed into the internal threading 1511 to press the LED lamp board 1 against the shoulder 3601. In some aspects, the first retention insert 1512 can also secure the lens 14 to the LED lamp board 1. In some aspects, the first retention insert 1512 can engage with a lens flange 1615 (shown in FIG. 36A) of the lens 14 to secure the lens 14 to the LED lamp board 1.

In some aspects, the lens 14, itself, and/or the lens 14 and first retention insert 1512 can form a seal around the LED 1501 and the wires 9, such as to protect them from exposure to moisture, dust, or other elements. In some aspects, the seal can be formed with a glue, caulk, epoxy, or other suitable material. For example and without limitation, a potting, glue, or other filler 1502 can be positioned around the lens 14 and the first retention insert 1512 to provide additional sealing. The lamp module 101 can be waterproof. For example, in the present aspect, the lamp module 101 can be IP65 rated, IP68 rated, or better, under IEC standard 60529.

In the present aspect, the power supply driving module 2 can be positioned in the lower housing cavity 3607. The first concentric terminal 3 can be directly mounted to the power supply driving module 2, as shown, or connected by wires (not shown).

The lower shaft portion 3606 can define the threaded shaft 6. In the aspect shown, the bottom threaded insert 2162 can be installed in the bottom of the lower shaft portion 3606 of the first housing 4. For example and without limitation, the bottom threaded insert 2162 can threadedly engage female threads within the lower shaft portion 3606. The first concentric terminal 3 can be positioned at least partially within the bottom threaded insert 2162 as shown in FIG. 36B. In some aspects, the shaft 6 can be integrally formed as part of the lower shaft portion 3606. The threading can be engaged with another housing and complimentary electrical connector to energize the power supply driving module 2.

The bottom threaded insert 2162 can define the shaft inner rib 1505, as shown in FIG. 36B. The second retention insert 1516 can comprise one or more hooks 1517. The hooks 1517 can be sized to snap over the shaft inner rib 1505, thereby retaining the second retention insert 1516 within the bottom threaded insert 2162. The second retention insert 1516 can engage with the first concentric terminal 3 to secure the first concentric terminal 3 within the shaft 6. In some aspects, the second retention insert 1516 can also provide a seal with the bottom threaded insert 2162, which can prevent, water, dust, dirt, or other elements from reaching the lower housing cavity 3607.

In the present aspect, the upper housing cavity 3605 and the lower housing cavity 3707 can each be at least partially filled with a potting, glue, or other filler 1502. Potting can be used to protect each of the LED lamp board 1 and the power supply driving module 2 from exposure to moisture, and to electrically isolate the electronics from the first housing 4. Certain glues can be used for the same purpose, as well as to shunt heat away from the LED lamp board 1 and the power supply driving module 2 to the first housing 4. Such glues can comprise additives configured to enhance thermal conductivity. The first housing 4 can comprise a thermally conductive material, such as a metal for example and without limitation. The first housing 4 can act as a heat sink and aid in dissipation of heat, which can lower the operating temperatures of the lamp module group 100 and extend the service life of the electronics therein.

Figure 36C:
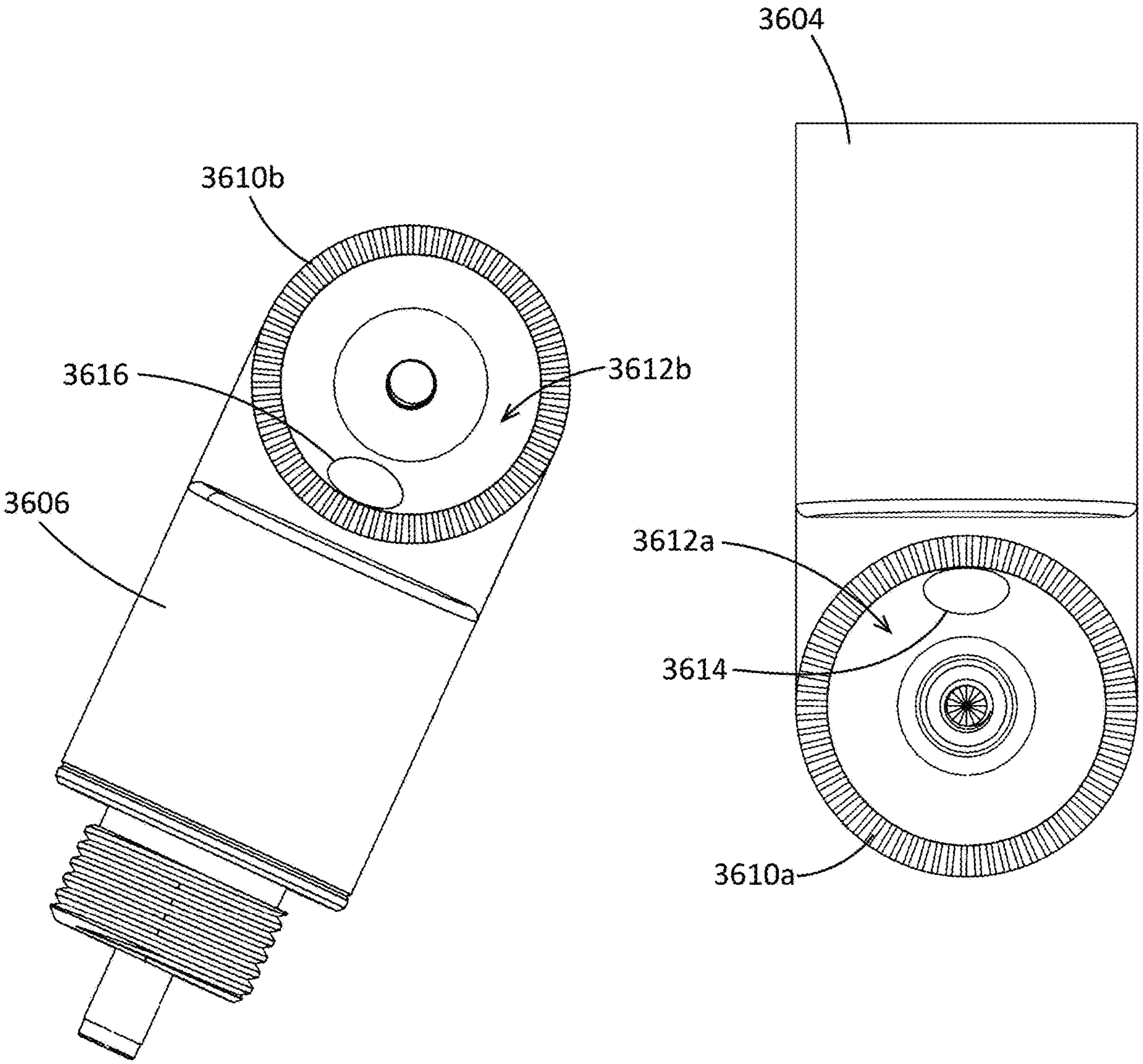
FIG. 36C is a perspective view of the lamp module of FIG. 36A in a partially disassembled state.

FIG. 36C shows the upper light holder portion 3604 and the lower shaft portion 3606 separated from one another in a partially disassembled state. As shown, the upper light holder portion 3604 and the lower shaft portion 3606 can each define a complimentary toothed ring 3610*a,b* surrounding a joint opening 3612*a,b*. The upper light holder portion 3604 can define an upper wire opening 3614, which can be in communication with both the joint opening 3612*a* and the upper housing cavity 3605 (shown in FIG. 36B). The lower shaft portion 3606 can define a lower wire opening 3616, which can be in communication with both the joint opening 3612*b* and the lower housing cavity 3607 (shown in FIG. 36B).

When the light module of FIGS. 36A-C is assembled, the fixing rod 37 (shown in FIGS. 36A-B) can place the complimentary toothed rings 3610*a,b* (shown in FIG. 36C) in engagement with the joint opening 3612*a,b* (shown in FIG. 36C) aligned and in communication with one another. The wires 9 (shown in FIGS. 36A-B) can extend from the upper housing cavity 3605 (shown in FIG. 36B), through the upper wire opening 3614 (shown in FIG. 36C), through both joint openings 3612*a,b* (shown in FIG. 36C), through the lower wire opening 3616 (shown in FIG. 36C), and into the lower housing cavity 3607 (shown in FIG. 36B). The LED lamp board 1 can be connected in electrical communication with the power supply driving module 2 by the wires 9.

Figure 37:
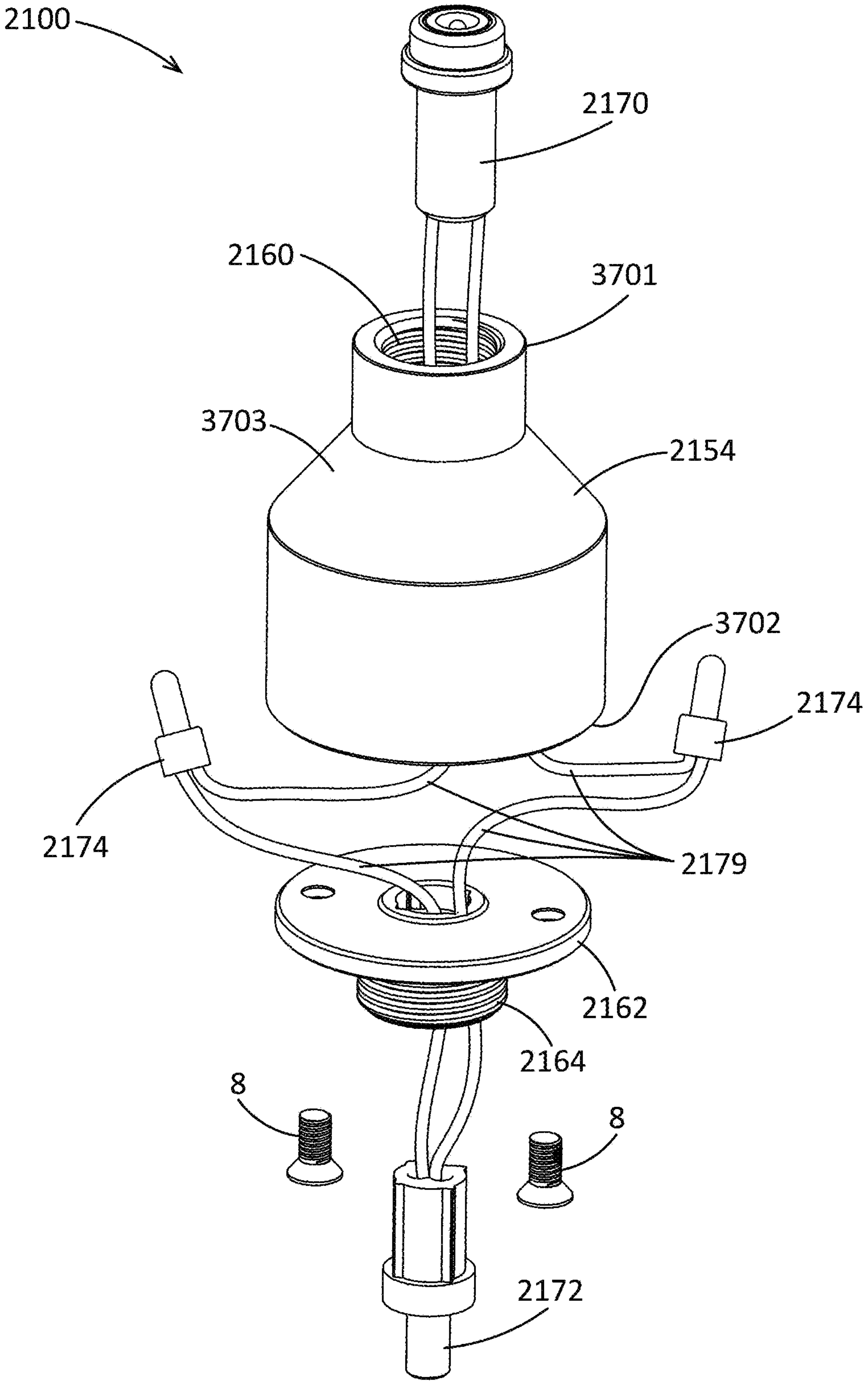
FIG. 37 is an exploded view of another aspect of a post in accordance with another aspect of the present disclosure.

FIG. 37 shows another aspect of the post 2100 comprising another aspect of the accessory housing 2154 in accordance with another aspect of the present disclosure. In the aspect shown, the accessory housing 2154 can define a tapered portion 3703 such that the top end 3701 is smaller in diameter than the bottom end 3702. The terms "top" and "bottom" are used with respect to the depicted orientation and should not be viewed as limiting as the post 2100 can be used in any orientation and/or configuration.

The top threaded bore 2160 can be defined at the top end 3701 by the accessory housing 2154. In some aspects, the top threaded bore 2160 can be defined by the top threaded insert 2158 (shown in FIG. 21A). The post 2100 can include the bottom threaded insert 2162 defining an accessory shaft 2164 at the bottom end 3702. In the present aspect, the bottom threaded insert 2162 can be secured to the accessory housing 2154 by the fasteners 8; however, in some aspects, the bottom threaded insert 2162 can be secured to the accessory housing 2154 through a different means, such as a threaded connection, weld, adhesive, snap fit, friction fit, or other suitable means for example and without limitation.

The post 2100 can comprise the first concentric accessory terminal 2170 and a second concentric accessory terminal 2172. The first concentric accessory terminal 2170 can be received and secured within the threaded bore 2160 to form a power receptacle. The first concentric accessory terminal 2170 can be connected in electrical communication with the second concentric accessory terminal 2172 by a plurality of accessory wires 2179, which in turn can be connected together by electrical connectors 2174, such as wire nuts for example and without limitation. The first concentric accessory terminal 2170 can be a female concentric terminal. The second concentric accessory terminal 2172 can be secured within the accessory shaft 2164. The second concentric accessory terminal 2172 can be a male concentric terminal.

FIGS. 38A-E show another aspect of the speaker module 3101 of the electronic module group 100 in accordance with another aspect of the present disclosure.

Figure 38A:
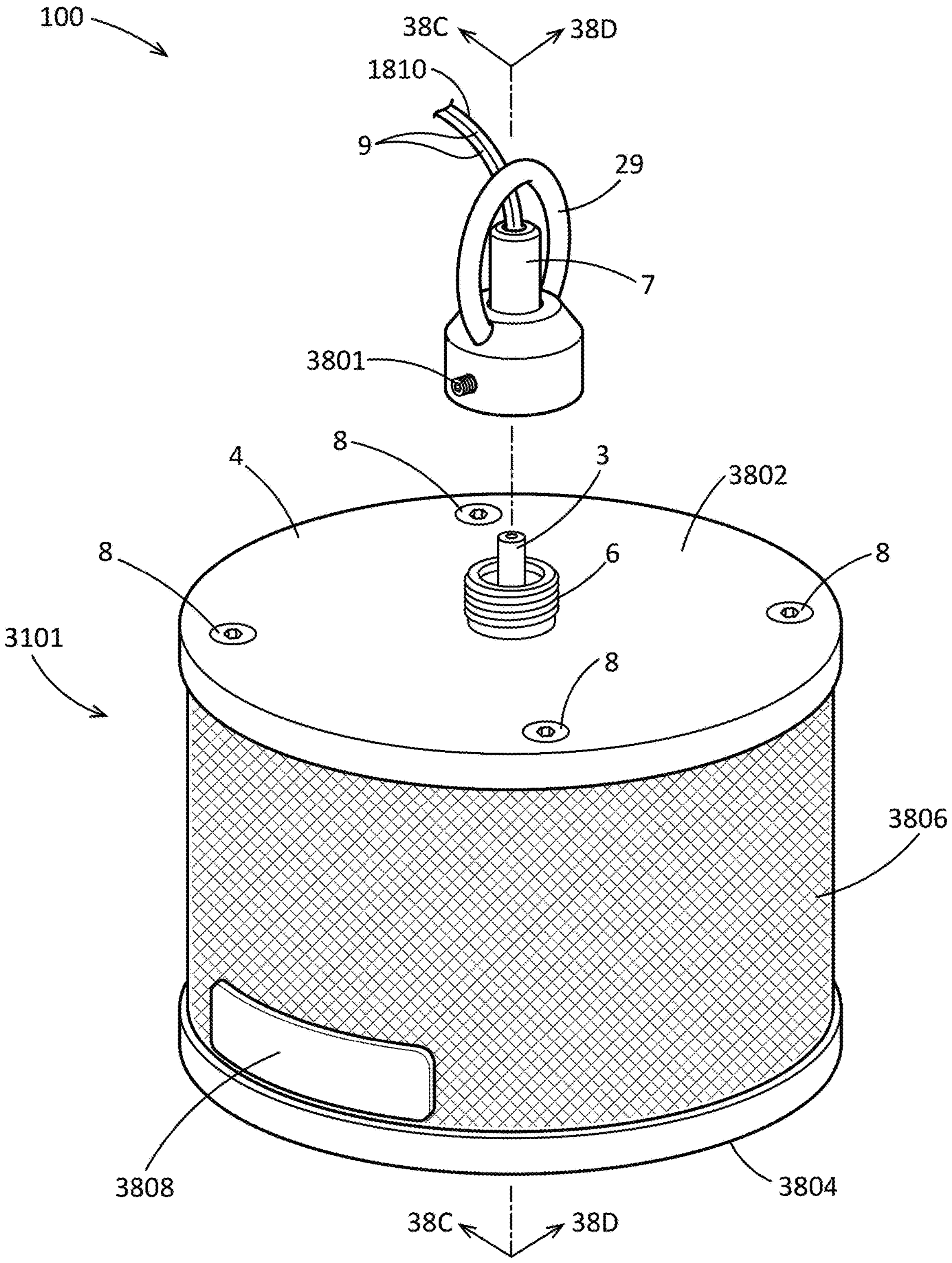
FIG. 38A is a perspective view of another aspect of the speaker module of the electronic module group in accordance with another aspect of the present disclosure.

As shown in FIG. 38A, the speaker module 3101 can comprise the first housing 4. The first housing 4 can comprise a top plate 3802, a bottom plate 3804, and a cover 3806. The cover 3806 can by substantially cylindrical. The top plate 3802 and the bottom plate 3804 can be substantially circular. In some aspects, the top plate 3802, bottom plate 3804, and cover 3806 can define different shapes. For example and without limitation, the first housing 4 could be substantially shaped as a cube, rectangular prism, sphere, pyramid, cone, or any other suitable shape.

The cover 3806 can extend between the top plate 3802 and the bottom plate 3804. The top plate 3802 can be secured to the bottom plate 3804 by fasteners 8. The first housing 4 can further comprise one or more badges 3808, which can display graphics, indicia, or combinations thereof. For example and without limitation, a logo, identifying text, brand name, product name, instructions, specifications, or any other information may be displayed on the one or more badges 3808. In some aspects, the one or more badges 3808 can be illuminated. For example and without limitation, the one or more badges 3808 can comprise a light source, such as one or more LEDs.

The top plate 3802 of the first housing 4 can define the shaft 6, which can be threaded. In some aspects, the shaft 6 can be integrally formed with the top plate 3802. In some aspects, the shaft 6 can be coupled to the top plate 3802. The first concentric terminal 3 can be at least partially positioned within the shaft 6.

The power cable 1810 can comprise the second housing 29, one or more wires 9, and the second concentric terminal 7. The power cable 1810 can be coupled to the shaft 6 to provide power to the speaker module 3101. For example and without limitation, the second concentric terminal 7 can be electrically connected to the first concentric terminal 3 to transmit power through the concentric terminals 3,7. In some aspects, the second housing 29 can be threadedly engaged with the shaft 6. In the present aspect, the second housing 29 can also comprise a set screw 3801, which can thread into the second housing 29 and engage with the shaft 6 when the second housing 29 is mounted on the shaft 6. Engagement between the set screw 3801 and the shaft 6 can resist or prevent removal of the second housing 29 from the shaft 6 without first unscrewing the set screw 3801.

Figure 38B:
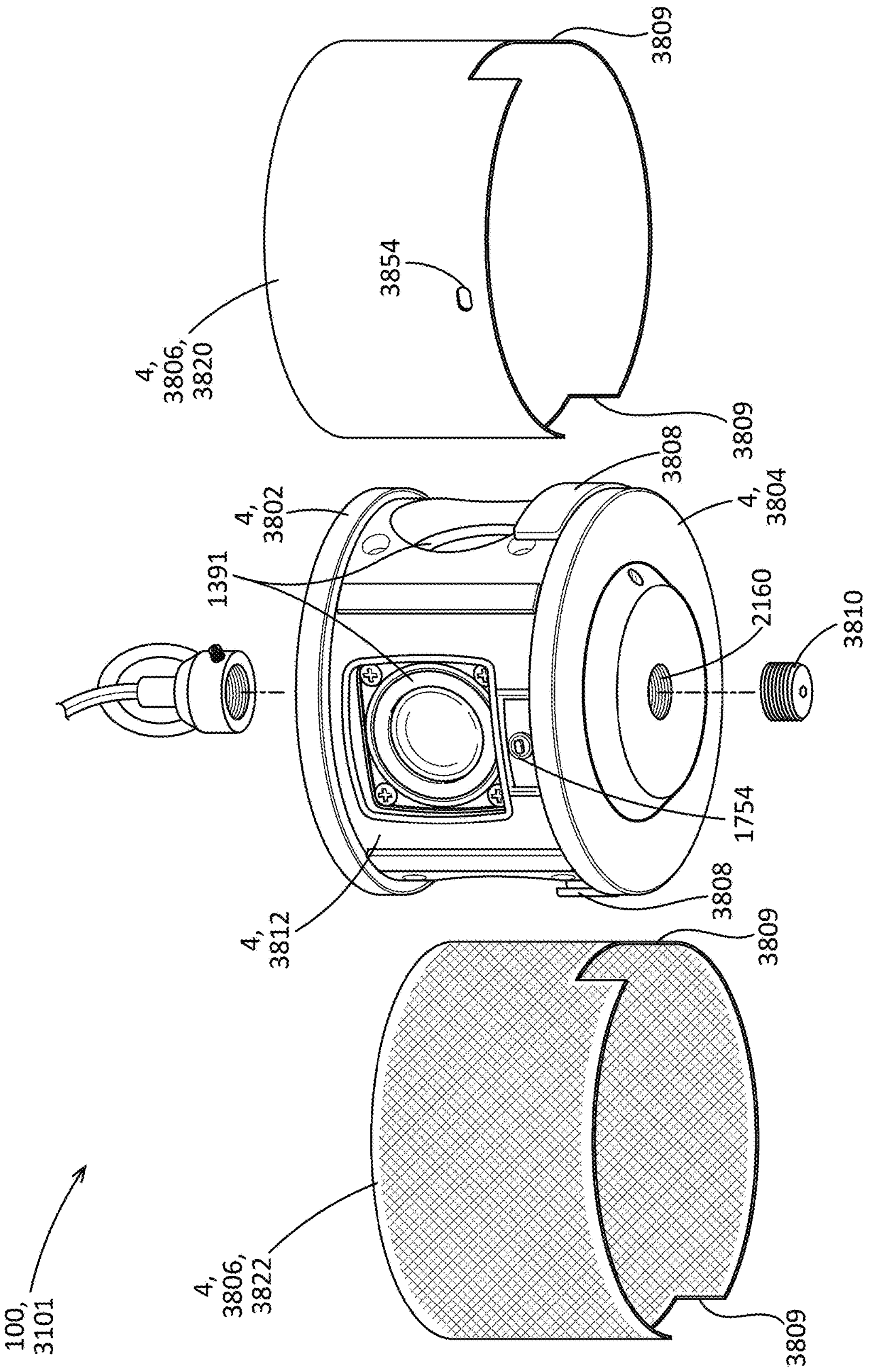
FIG. 38B is a partially exploded view of the speaker module of FIG. 38A.

FIG. 38B shows the speaker module 3101 of the electronic module group 100 in a partially exploded state with the cover 3806 removed and a bottom plug 3810 removed from the threaded bore 2160 of the bottom plate 3804.

As shown, the cover 3806 can comprise an inner layer 3820 and an outer layer 3822. The outer layer 3822 can comprise a mesh material. The inner layer 3820 can comprise the same or a different material as the outer layer 3822. In some aspects, the outer layer 3822 can comprise a courser mesh, and the inner layer 3820 can comprise a finer mesh. In some aspects, the inner layer 3820 can comprise a solid material, such as a sheet, film, or other suitable material. The layers 3820,3822 can each define one or more badge cutouts 3809, which can be shaped complimentary to the size and location of the one or more badges 3808.

The first housing 4 can further comprise an inner casing 3812. The inner casing 3812 can be positioned between the top plate 3802 and the bottom plate 3804. In some aspects, the inner casing 3812 can provide structural support for the top plate 3802 and the bottom plate 3804. For example and without limitation, either or both plates 3802,3804 can be coupled to the inner casing 3812.

With the cover 3806 removed, one or more speakers 1391 can be exposed. In the present aspect, the one or more speakers 1391 can be mounted within openings defined by the inner casing 3812. In some aspects, the speaker module 3101 can comprise four speakers 1391 spaced at 90-degree intervals around the speaker module 3101. In some aspects, the speaker module 3101 can comprise greater or fewer than four speakers 1391. In aspects with multiple speakers 1391, the speakers 1391 can be spaced or positioned in any desired placement on the speaker module 3101. In some aspects, either or both of the plates 3802,3804 can be fitted with a speaker 1391.

The speaker module 3101 can also comprise a control 1754. The control 1754 can adjust one or more aspects of the speaker module's 3101 performance and/or operation. For example and without limitation, the control 1754 can adjust volume, tuning, input source, light color, light intensity, or any other relevant parameter, setting, or functionality. In some aspects, the control 1754 can turn the speaker module 3101 on and off.

The cover 3806 can provide one or more access holes 3854 positioned to align with the control 1754 when the cover 3806 is installed on the speaker module 3101. In some aspects, the control 1754 can be a manual control, which can be adjusted by physical manipulation of the control 1754. For example and without limitation, the control 1754 can comprise one or more switches, one or more potentiometers, or other suitable electronic components. In some aspects, the control 1754 can be controlled by receiving signals, such as through Bluetooth, cellular frequency, WiFi, radio, infrared, or any other suitable type of wireless communication signal. The controller 1754 can receive these signals, which can encode commands for the speaker module 3101. In some aspects, the control 1754 can be both manually and wirelessly adjustable.

Figure 38C:
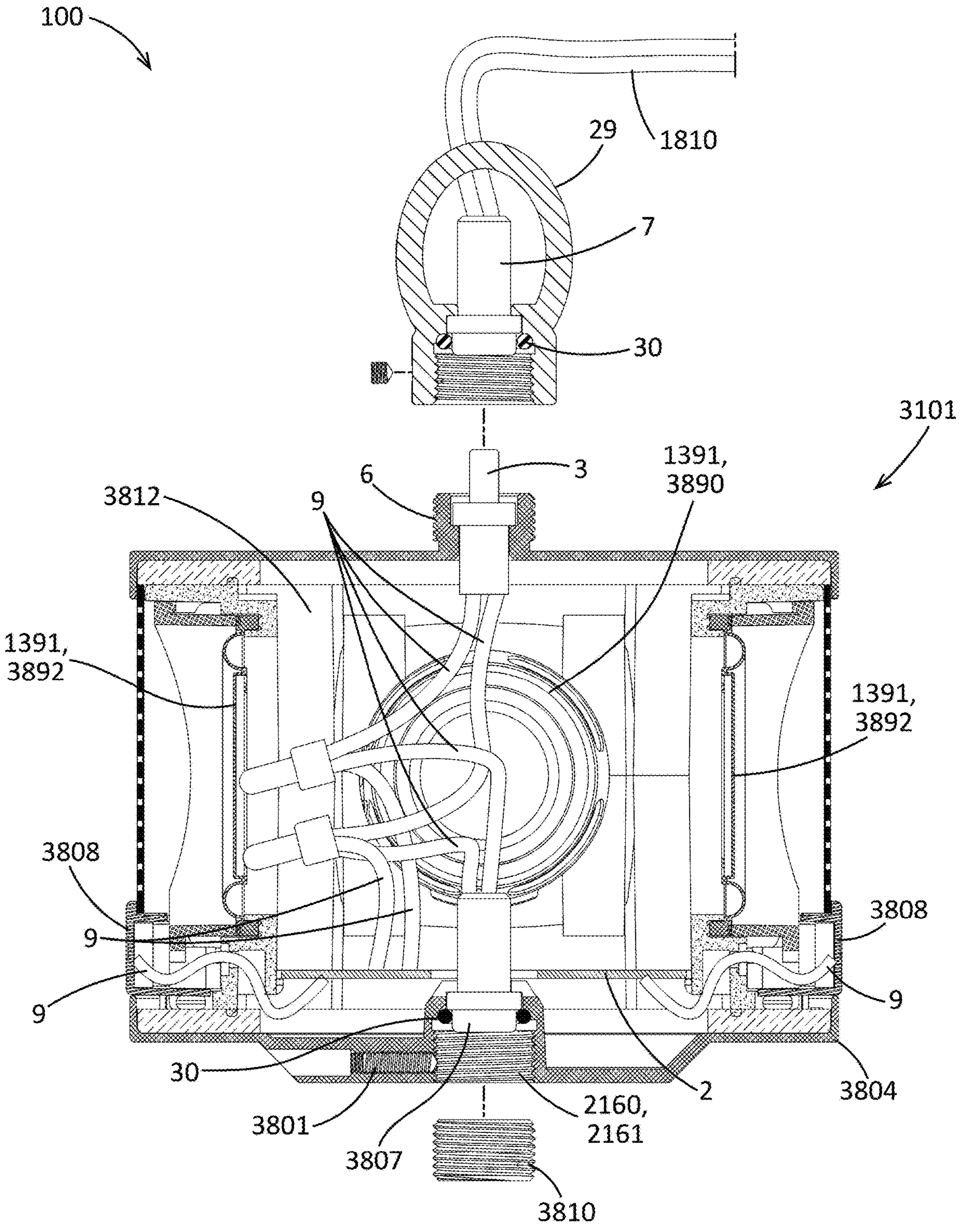
FIG. 38C is a cross-sectional view of the speaker module of FIG. 38A taken along Line 38C-38C shown in FIG. 38A.

FIG. 38C is a cross-sectional view of the speaker module 3101 of the electronic module group 100 of FIG. 38A, taken along Line 38C-38C shown in FIG. 38A.

An auxiliary concentric terminal 3807 can be positioned within the threaded bore 2160 of the bottom plate 3804. A sealing ring 30 can also be positioned within the threaded bore 2160 around auxiliary concentric terminal 3807, which can be similar to the sealing ring 30 positioned in the second housing 29 of the power cable 1810. The threaded bore 2160 and the auxiliary concentric terminal 3807 can function as a power receptacle 2161. For example and without limitation, another electronic module group 100 can be screwed into and powered by the power receptacle 2161. As shown, the bottom plate 3804 can include a set screw 3801, which can be used to secure the bottom plug 3810 or a portion of an accessory or electronic module group 100, such as a shaft 6 of another electronic module group 100, within the power receptacle 2161.

In the present aspect, the auxiliary concentric terminal 3807 can be substantially the same as the second concentric terminal 7. In some aspects, the auxiliary concentric terminal 3807 can be substantially the same as the first concentric terminal 3. In some aspects, any or all of the concentric terminals 3,7,3807 can be a different type of electrical connector, such as one of those shown in FIGS. 3, 4, 14, 28-30, for example and without limitation.

As shown, a series of wires 9 can connect the auxiliary concentric terminal 3807 in electrical communication with the first concentric terminal 3 as well as a power supply driving module 2. The power supply driving module 2 can be mounted within the inner casing 3812. The power supply driving module 2 can be connected in electrical communication with the badges 3808 by wires 9. For example and without limitation, the badges 3808 can be illuminated. The power supply driving module 2 can be connected by wires 9 to some or all of the one or more speakers 1391, as shown and described in greater detail with respect to FIG. 38D.

In the present aspect, the one or more speakers 1391 can comprise multiple types of speakers. In some aspects, the one or more speakers 1391 can comprise various combinations of one or more active loudspeakers 3890 and one or more passive radiators 3892. In some aspects, all of the one or more speakers 1391 can be active loudspeakers. In some aspects, the one or more speakers 1391 can comprise various combinations of tweeters, mid-range drivers, woofers, subwoofers, or any other type of speaker.

Figure 38D:
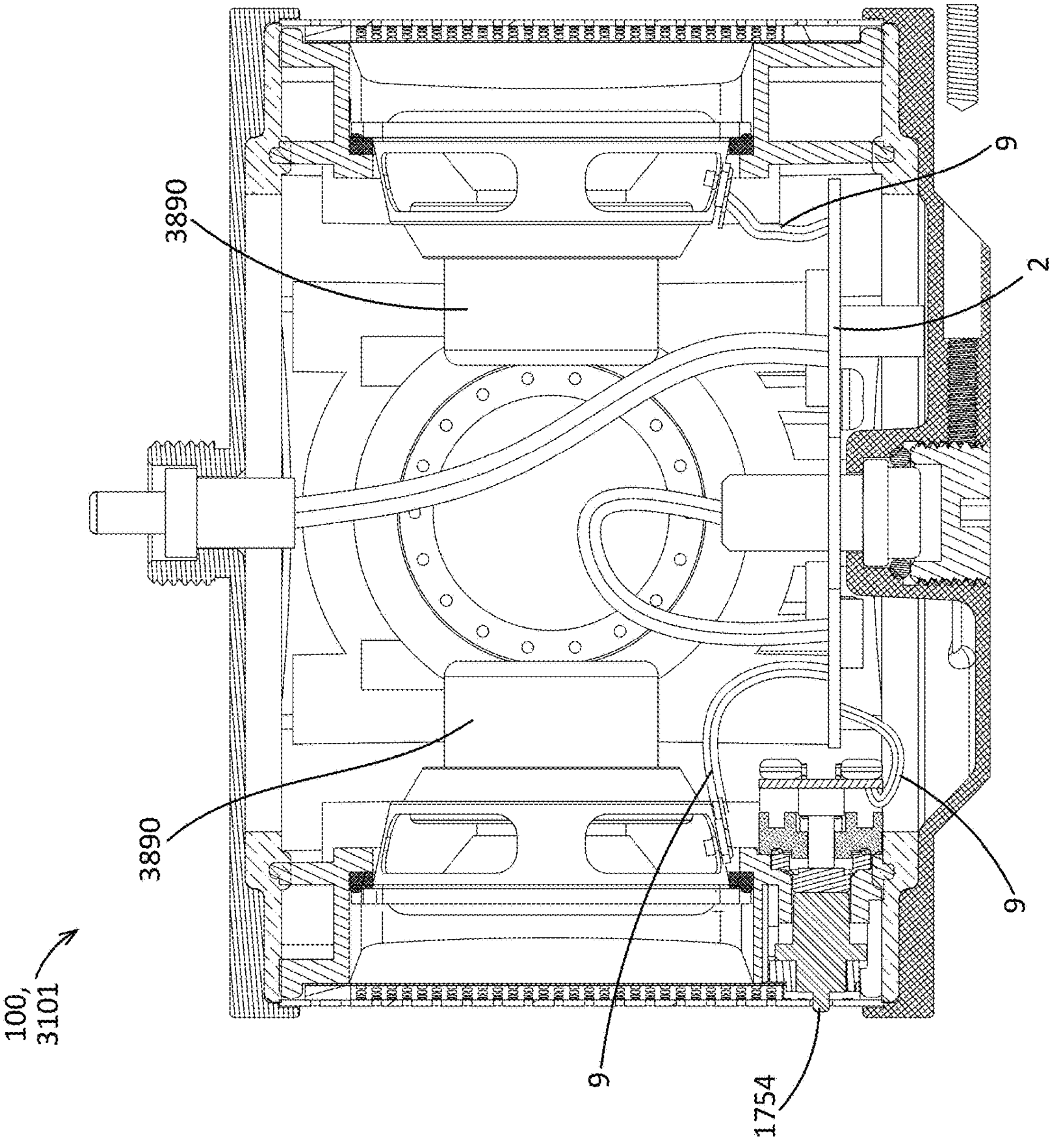
FIG. 38D is a cross-sectional view of the speaker module of FIG. 38A taken along Line 38D-38D shown in FIG. 38A.

FIG. 38D is a cross-sectional view of the speaker module 3101 of the electronic module group 100 of FIG. 38A, taken along Line 38D-38D shown in FIG. 38A.

The power supply driving module 2 can be connected in electrical communication with the control 1754 by one or more wires 9, and the power supply driving module 2 can be connected in electrical communication with the active loudspeakers 3890 by one or more wires 9.

Figure 38E:
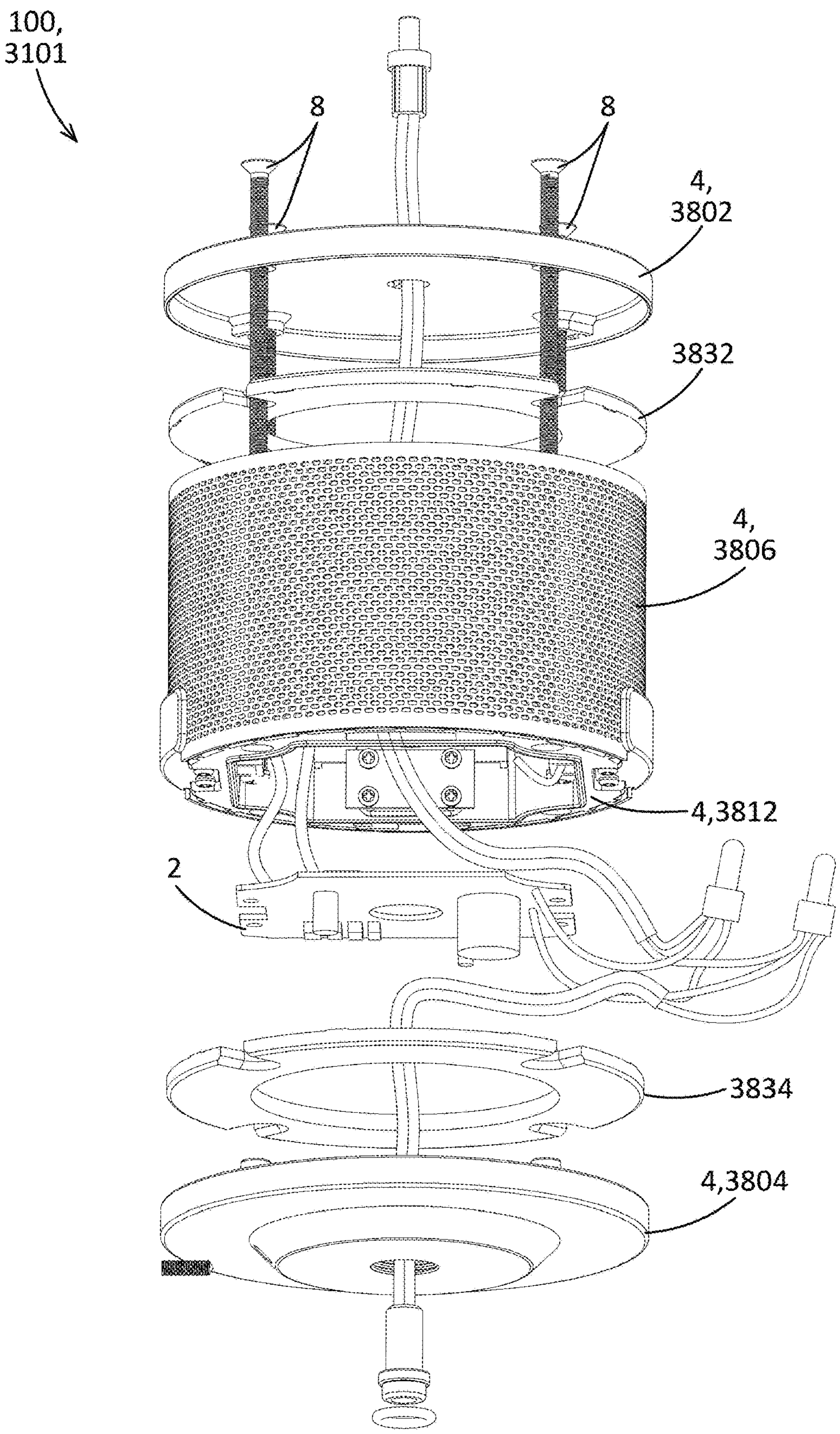
FIG. 38E is an exploded view of the speaker module of FIG. 38A.

FIG. 38E shows the speaker module 3101 of the electronic module group 100 of FIG. 38A in a partially exploded state. The speaker module 3101 can further comprise a top seal 3832 and a bottom seal 3834. The top seal 3832 can be positioned between the top plate 3802 and the inner casing 3812. The bottom seal 3834 can be positioned between the bottom plate 3804 and the inner casing 3812. The fasteners 8 can extend through the top plate 3802 and inner casing 3812 and thread into the bottom plate 3804. When the fasteners 8 are tightened, the seals 3832,3834 can be compressed by the top plate 3802, the bottom plate 3804, the cover 3806, and the inner casing 3812. Accordingly, the first housing 4 can provide a water resistant or water proof seal, which can protect the electronics, such as the power supply driving module 2. For example and without limitation, in the present aspect, the speaker module 3101 can be IP65 rated, IP68 rated, or better, under IEC standard 60529.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

What is claimed is:

1. A lamp module comprising:

a housing comprising a light holder portion and a shaft portion, the light holder portion configured to tilt relative to the shaft portion;

an LED lamp board positioned within the light holder portion;

a power supply driving module connected in electrical communication with the LED lamp board; and a first concentric terminal positioned at least partially within the shaft portion, the first concentric terminal connected in electrical communication with the power supply driving module, the first concentric terminal configured to rotatably connect in electrical communication with a second concentric terminal to supply power to the power supply driving module, the concentric terminal comprising an inner conductive sleeve and an outer conductive sleeve, the inner conductive sleeve configured to receive a conductive post of the second concentric terminal to establish a first electrical connection, the outer conductive sleeve configured to contact a conductive spring of the second concentric terminal to establish a second electrical connection, the first concentric terminal configured to maintain the first electrical connection and the second electrical connection regardless of a rotational orientation of the first concentric terminal relative to the second concentric terminal.

2. The lamp module of claim 1, wherein:

the light holder portion defines a first housing cavity;

the light holder portion defines a first wire opening that is in communication with the first housing cavity;

the shaft portion defines a second housing cavity;

the shaft portion defines a second wire opening that is in communication with the second housing cavity;

the lamp module further comprises at least one wire connected in electrical communication with at least one of the LED lamp board, the power supply driving module, and the first concentric terminal; and the at least one wire extends from the first housing cavity to the second housing cavity through the first wire opening and the second wire opening.

3. The lamp module of claim 2, wherein the first housing cavity is at least partially filled with a filler material, and wherein the filler material forms a seal around the at least one wire.

4. The lamp module of claim 2, wherein the at least one wire connects the LED lamp board in electrical communication with the power supply driving module.

5. The lamp module of claim 2, wherein:

the light holder portion defines a first toothed ring surrounding a first joint opening;

the first wire opening is in communication with the first joint opening;

the shaft portion defines a second toothed ring surrounding a second joint opening;

the second wire opening is in communication with the second joint opening; and the first toothed ring is configured to engage with the second toothed ring to secure an angle of the light holder portion relative to the shaft portion.

6. The lamp module of claim 2, wherein:

the light holder portion defines a first end and a second end;

the first end is connected to the shaft portion;

the second end defines internal threading within the first housing cavity;

the lamp module further comprises a retention insert;

the retention insert is engaged with the internal threading; and the LED lamp board is secured within the first housing cavity by the retention insert.

7. The lamp module of claim 6, further comprising a lens positioned over an LED of the LED lamp board, and wherein the retention insert encircles the lens.

8. The lamp module of claim 6, further comprising a lens positioned over an LED of the LED lamp board, and wherein the retention insert engages a lens flange of the lens.

9. The lamp module of claim 6, wherein the retention insert secures the LED lamp board against a shoulder of the light holder portion.

10. The lamp module of claim 1, wherein the shaft portion defines internal threading.

11. The lamp module of claim 1, wherein:
the shaft portion comprises a bottom insert;
the first concentric terminal is positioned at least partially within the bottom insert; and
the bottom insert defines a threaded shaft.

12. A lamp module comprising:
a first housing comprising a light holder portion, a shaft portion, and a fixing rod, the shaft portion configured to tilt relative to the light holder portion about the fixing rod, the light holder portion defining a first housing cavity, the shaft portion defining a second housing cavity, the shaft portion defining a threaded shaft;
an LED lamp board positioned within the first housing cavity, the LED lamp board configured to emit light through a bore of the light holder portion;
a power supply driving module positioned within the second housing cavity; and
a first concentric terminal connected in electrical communication with the power supply driving module, the first concentric terminal positioned at least partially within the shaft portion, the first concentric terminal configured to rotatably connect in electrical communication with a second concentric terminal, the concentric terminal comprising an inner conductive sleeve and an outer conductive sleeve, the inner conductive sleeve configured to receive a conductive post of the second concentric terminal to establish a first electrical connection, the outer conductive sleeve configured to contact a conductive spring of the second concentric terminal to establish a second electrical connection, the first concentric terminal configured to maintain the first electrical connection and the second electrical connection regardless of a rotational orientation of the first concentric terminal relative to the second concentric terminal.

13. The lamp module of claim 12, wherein the bore is at least partially threaded.

14. The lamp module of claim 13, wherein a threaded retention insert engages the bore and secures the LED lamp board against a shoulder defined within the first housing cavity.

15. The lamp module of claim 13, wherein a threaded retention insert engages the bore and secures a lens over the LED lamp board.

16. The lamp module of claim 12, wherein the first concentric terminal is directly mounted to the power supply driving module.

17. The lamp module of claim 12, wherein:
a first end of the shaft portion is coupled to the light holder portion;
the threaded shaft is defined at a second end of the shaft portion opposite from the first end; and
the power supply driving module extends lengthwise through the second housing cavity from the first end to the second end.

18. A lamp module comprising:
a housing comprising a light holder portion and a shaft portion, the light holder portion configured to tilt relative to the shaft portion, the light holder portion defining a first housing cavity, the light holder portion defining a first wire opening that is in communication with the first housing cavity, the first housing cavity being at least partially filled with a filler material, the shaft portion defining a second housing cavity, the shaft portion defining a second wire opening that is in communication with the second housing cavity, the light holder portion defining a first end and a second end, the first end connected to the shaft portion, the second end defining internal threading within the first housing cavity;
an LED lamp board positioned within the light holder portion;
a retention insert engaging the internal threading within the first housing cavity, the retention insert securing the LED lamp board within the first housing cavity;
a lens positioned over an LED of the LED lamp board, the lens at least partially encircled by the retention insert;
a power supply driving module connected in electrical communication with the LED lamp board;
a first concentric terminal positioned at least partially within the shaft portion, the first concentric terminal connected in electrical communication with the power supply driving module, the first concentric terminal configured to rotatably connect in electrical communication with a second concentric terminal to supply power to the power supply driving module, the first concentric terminal comprises an inner conductive sleeve and an outer conductive sleeve, the inner conductive sleeve configured to receive a conductive post of the second concentric terminal to establish a first electrical connection, the outer conductive sleeve configured to contact a conductive spring of the second concentric terminal to establish a second electrical connection, the first concentric terminal configured to maintain the first electrical connection and the second electrical connection regardless of a rotational orientation of the first concentric terminal relative to the second concentric terminal; and
at least one wire connected in electrical communication with at least one of the LED lamp board, the power supply driving module, and the first concentric terminal, the at least one wire extending from the first housing cavity to the second housing cavity through the first wire opening and the second wire opening, the filler material forming a seal around the at least one wire.

19. The lamp module of claim 18, wherein the shaft portion defines internal threading.

20. The lamp module of claim 18, wherein:
the shaft portion comprises a bottom insert;
the first concentric terminal is positioned at least partially within the bottom insert; and
the bottom insert defines a threaded shaft.

* * * * *